United States Patent
Fürsich et al.

(10) Patent No.: US 11,572,017 B2
(45) Date of Patent: *Feb. 7, 2023

(54) VEHICULAR VISION SYSTEM

(71) Applicant: MAGNA ELECTRONICS INC., Auburn Hills, MI (US)

(72) Inventors: Manfred Fürsich, Oberhaching (DE); Thomas Wierich, Butzbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,882

(22) Filed: Feb. 14, 2022

(65) Prior Publication Data
US 2022/0161720 A1 May 26, 2022

Related U.S. Application Data

(63) Continuation of application No. 17/249,687, filed on Mar. 10, 2021, now Pat. No. 11,247,609, which is a (Continued)

(51) Int. Cl.
*B60R 1/00* (2022.01)
*G03B 37/00* (2021.01)
(Continued)

(52) U.S. Cl.
CPC ............... *B60R 1/00* (2013.01); *G03B 37/00* (2013.01); *H04N 5/23238* (2013.01);
(Continued)

(58) Field of Classification Search
CPC . B60R 1/00; B60R 2300/105; B60R 2300/20; B60R 2300/205;
(Continued)

(56) References Cited

U.S. PATENT DOCUMENTS 5,550,677 A  8/1996 Schofield et al.
5,670,935 A * 9/1997 Schofield .......... B60R 21/01538
                                              348/E7.086
(Continued)

FOREIGN PATENT DOCUMENTS

WO  2011155878 A1  12/2011
WO  2012103193 A1   8/2012
(Continued)

OTHER PUBLICATIONS

Hicks et al., "Panoramic Electronic Rear Vision for Automotive Applications", SAE Technical Paper Series, International Congress and Exposition, Detroit, MI, Mar. 1-4, 1999.
(Continued)

*Primary Examiner* — Kyle M Lotfi
(74) *Attorney, Agent, or Firm* — Honigman LLP

(57) ABSTRACT

A vehicular vision system includes a camera disposed at a side of a body of a vehicle equipped and having a field of view exterior and at least rearward of the vehicle. The camera includes a lens and a two-dimensional imaging array sensor. The lens of the camera has a center axis region and a peripheral region around the center axis region. The center axis of the lens is laterally offset from the center of the array of the imaging array sensor. A video display displays video images derived from image data captured by the camera, the displayed video images having (i) less distortion at displayed image portions representative of a region laterally closer to the side of the body of the vehicle and (ii) greater distortion at displayed image portions representative of a region further laterally outboard from the side of the body of the vehicle.

36 Claims, 57 Drawing Sheets

Related U.S. Application Data continuation of application No. 14/898,493, filed as application No. PCT/US2014/042229 on Jun. 13, 2014, now Pat. No. 10,946,798.

(60) Provisional application No. 61/981,937, filed on Apr. 21, 2014, provisional application No. 61/977,928, filed on Apr. 10, 2014, provisional application No. 61/950,260, filed on Mar. 10, 2014, provisional application No. 61/935,057, filed on Feb. 3, 2014, provisional application No. 61/911,665, filed on Dec. 4, 2013, provisional application No. 61/895,609, filed on Oct. 25, 2013, provisional application No. 61/879,835, filed on Sep. 19, 2013, provisional application No. 61/856,843, filed on Jul. 22, 2013, provisional application No. 61/844,630, filed on Jul. 10, 2013, provisional application No. 61/837,955, filed on Jun. 21, 2013.

(51) Int. Cl.
*H04N 5/232* (2006.01)
*H04N 7/18* (2006.01)
*H04N 13/239* (2018.01)

(52) U.S. Cl.
CPC ......... *H04N 7/181* (2013.01); *H04N 13/239* (2018.05); *B60R 2300/105* (2013.01); *B60R 2300/20* (2013.01); *B60R 2300/205* (2013.01); *B60R 2300/8046* (2013.01); *G03B 2217/002* (2013.01)

(58) Field of Classification Search
CPC .......... B60R 2300/8046; H04N 13/239; H04N 5/23238; H04N 7/181; G03B 37/00
See application file for complete search history.

(56) References Cited

U.S. PATENT DOCUMENTS

| | | |
|---|---|---|
| 5,949,331 A | 9/1999 | Schofield et al. |
| 6,424,272 B1 | 7/2002 | Gutta et al. |
| 6,509,832 B1 | 1/2003 | Bauer et al. |
| 6,717,610 B1 | 4/2004 | Bos et al. |
| 7,005,974 B2 | 2/2006 | McMahon et al. |
| 7,914,187 B2 | 3/2011 | Higgins-Luthman et al. |
| 8,421,865 B2 | 4/2013 | Euler et al. |
| 8,462,209 B2 | 6/2013 | Sun |
| 8,798,451 B1 | 8/2014 | Kweon |
| 9,085,261 B2 | 7/2015 | Lu et al. |
| 9,146,898 B2 | 9/2015 | Ihlenburg et al. |
| 9,150,155 B2 | 10/2015 | Vico et al. |
| 9,280,202 B2 | 3/2016 | Gieseke et al. |
| 10,946,798 B2 | 3/2021 | Fürsich et al. |
| 11,247,609 B2 | 2/2022 | Fürsich et al. |
| 2004/0008407 A1 | 1/2004 | Wallerstein et al. |
| 2009/0005961 A1 | 1/2009 | Grabowski et al. |
| 2010/0020170 A1 | 1/2010 | Higgins-Luthman et al. |
| 2010/0265048 A1 | 10/2010 | Lu et al. |
| 2010/0328499 A1* | 12/2010 | Sun ............ H04N 5/23238 348/E5.051 |
| 2011/0291918 A1 | 12/2011 | Surber et al. |
| 2012/0242882 A1 | 9/2012 | Sutton et al. |
| 2012/0257060 A1 | 10/2012 | Bos et al. |
| 2012/0265416 A1 | 10/2012 | Lu et al. |
| 2014/0063197 A1 | 3/2014 | Yamamoto et al. |
| 2014/0067206 A1 | 3/2014 | Pflug |
| 2014/0085472 A1 | 3/2014 | Lu et al. |
| 2014/0160276 A1 | 6/2014 | Pliefke et al. |
| 2014/0168415 A1 | 6/2014 | Ihlenburg et al. |
| 2014/0247352 A1 | 9/2014 | Rathi et al. |
| 2014/0309884 A1 | 10/2014 | Wolf |
| 2014/0336876 A1 | 11/2014 | Gieseke et al. |
| 2014/0362209 A1 | 12/2014 | Ziegenspeck et al. |
| 2014/0368654 A1 | 12/2014 | Wierich |
| 2015/0002670 A1 | 1/2015 | Bajpai |
| 2015/0009010 A1 | 1/2015 | Biemer |
| 2015/0015710 A1 | 1/2015 | Tiryaki |
| 2015/0042808 A1 | 2/2015 | Pflug |
| 2015/0217693 A1 | 8/2015 | Pliefke et al. |
| 2015/0222798 A1 | 8/2015 | Fuchikami |
| 2015/0232030 A1 | 8/2015 | Bongwald |
| 2015/0294169 A1 | 10/2015 | Zhou et al. |
| 2015/0296135 A1 | 10/2015 | Wacquant et al. |

FOREIGN PATENT DOCUMENTS

| | | |
|---|---|---|
| WO | 2012145501 A1 | 10/2012 |
| WO | 2012145822 A1 | 11/2012 |
| WO | 2012158167 A1 | 11/2012 |
| WO | 2013067082 A1 | 5/2013 |
| WO | 2013067083 A1 | 5/2013 |
| WO | 2013074604 A2 | 5/2013 |
| WO | 2013086249 A2 | 6/2013 |
| WO | 2013109869 A1 | 7/2013 |

OTHER PUBLICATIONS

International Search Report and Written Opinion dated Oct. 15, 2014 from corresponding PCT Application No. PCT/US2014/042229.

* cited by examiner

VEHICULAR VISION SYSTEM

CROSS REFERENCE TO RELATED APPLICATIONS

The present application is a continuation of U.S. patent application Ser. No. 17/249,687, filed Mar. 10, 2021, now U.S. Pat. No. 11,247,609, which is a continuation of U.S. patent application Ser. No. 14/898,493, filed Dec. 15, 2015, now U.S. Pat. No. 10,946,798, which is a 371 national phase filing of PCT Application No. PCT/US2014/042229, filed Jun. 13, 2014, which claims the filing benefits of U.S. provisional applications, Ser. No. 61/981,937, filed Apr. 21, 2014, Ser. No. 61/977,928, filed Apr. 10, 2014, Ser. No. 61/950,260, filed Mar. 10, 2014, Ser. No. 61/935,057, filed Feb. 3, 2014, Ser. No. 61/911,665, filed Dec. 4, 2013, Ser. No. 61/895,609, filed Oct. 25, 2013, Ser. No. 61/879,835, filed Sep. 19, 2013, Ser. No. 61/856,843, filed Jul. 22, 2013, Ser. No. 61/844,630, filed Jul. 10, 2013, and Ser. No. 61/837,955, filed Jun. 21, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at one or more display screens that are viewable by the driver of the vehicle. The vision system allows the driver to survey or monitor or view the area rearward of the vehicle and may act as an addition, ideally as a replacement of conventional rearview mirrors, so as to provide the driver with a rearward field of view when the vehicle is standing still or driving forward or driving rearward.

According to an aspect of the present invention, a vision system of a vehicle includes a camera disposed at a side of a vehicle and having a field of view exterior of the vehicle and at least rearward of the vehicle. The camera captures image data and comprises a lens and a two dimensional imaging array sensor having a plurality of photosensor elements arranged in rows and columns. The imaging array sensor has a center region. The lens is configured to focus light at the imaging array sensor, and the lens has a center axis. The lens is disposed at the imaging array sensor with the center axis of the lens laterally offset from the center region of the imaging array sensor. A video display is disposed in the vehicle and is viewable by a driver of the vehicle when the driver is normally operating the vehicle. The video display is operable to display video images derived from image data captured by the camera.

The center axis of the lens (which may comprise a wide angle, high distortion lens) is offset relative to the center of the imaging array sensor to provide the center axis of the lens (where there is less distortion) at a portion or region of the imaging array sensor where it is desirable to have less distortion in the captured image data and displayed images. For example, for a driver side mounted sideward and rearward viewing camera, the center axis of the lens may be offset laterally inboard towards the side of the vehicle, so as to provide enhanced or less distortion of the displayed images at the regions of the displayed images sideward from the vehicle and along the side of the vehicle so as to provide enhanced display of the blind spot region at the side of the vehicle.

Thus, the camera is designed in such a way that images of the legally required image area (as legally required for exterior rearview mirrors) are captured with a high resolution, such as by having a greater density of photosensing elements or pixels at those regions of the imaging array sensor and a lower density of photosensing elements or pixels at other regions of the imaging array sensor. Preferably, the lens is disposed at the camera so that the center axis of the lens is generally at or aligned with the greater pixel density portion of the imaging array sensor. Additionally, the camera and system are operable to capture high field angles to get image information of a blind spot area at the side and/or rearward of the vehicle.

The present invention also provides a system that determines the location of the driver's head and eyes (and optionally a gaze direction of the driver's eyes) and provides one or more displays of images captured by one or more exterior mounted cameras at the side or sides of the vehicle to display a rearward view to the driver of the vehicle. In response to a determined movement or change in position of the driver's head or gaze, the system adjusts the displayed images in accordance with the determined movement. For example, a sideward or lateral movement of the driver's head may result in a change in the displayed image that generally corresponds to a change in the rearward field of view to a driver making a similar movement when viewing a conventional side-mounted exterior rearview mirror of the vehicle. Likewise, a forward or rearward movement of the driver's head may result in a change in the displayed image to zoom in/roll in or zoom out/roll out in accordance with the determined amount of movement of the driver's head.

Thus, the present invention provides a camera where the imaging area that has a higher resolution is not at the center of the imaging array sensor. If a high distortion lens is placed at the imaging array sensor with its central axis at the center of the imaging array sensor, and with the camera viewing rearward, about ⅓rd of the sensor's pixels will encompass or view or image a portion of the vehicle itself, which is information that is not helpful to the driver viewing the displayed images. Thus, in order to utilize the pixels better, the system of the present invention reduces this portion. This is achieved by shifting or offsetting the lens optics to be off the center of the imaging array sensor.

These and other objects, advantages, purposes and features of the present invention will become apparent upon review of the following specification in conjunction with the drawings.

LEGEND

Figure 1:
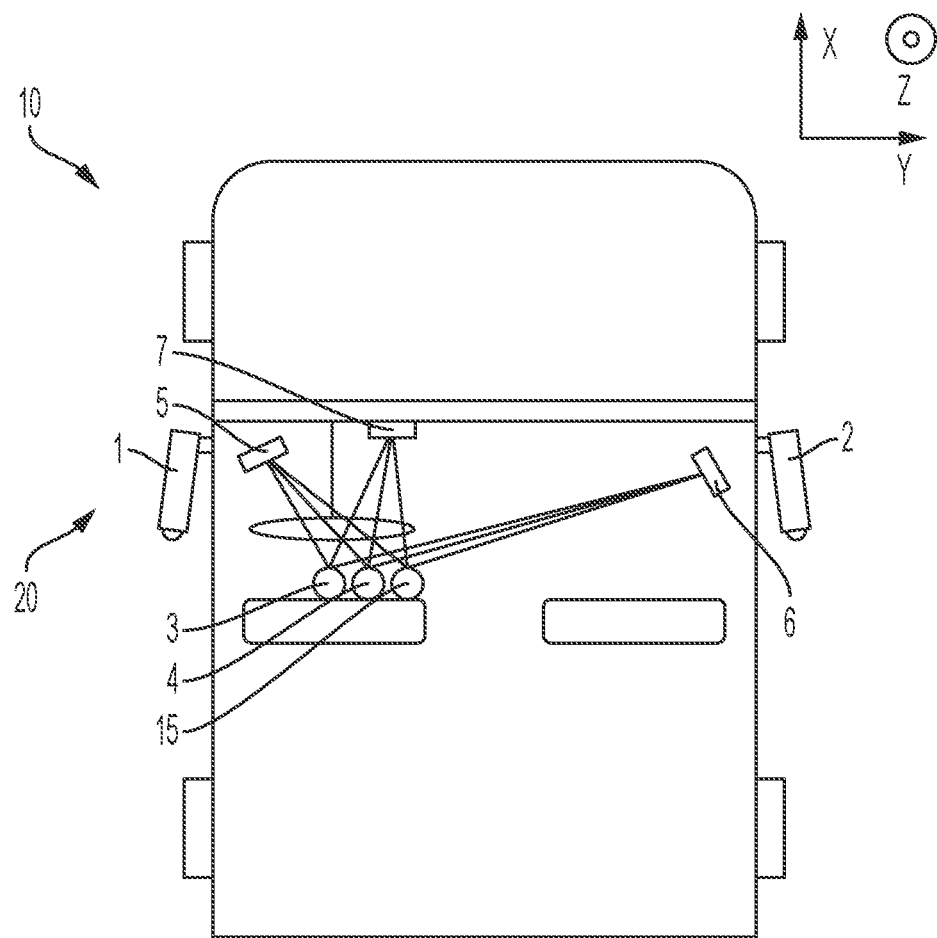
FIG. 1 is a plan view of a vehicle with a vision system that incorporates cameras in accordance with the present invention.

1 Camera at driver side as side mirror replacement
2 Camera at passenger side as side mirror replacement
3 Head of driver in normal position
4 Head of driver in moderately shifted position in the y direction
5 Display mounted in cabin at the driver side A-pillar region
6 Display mounted in cabin at the passenger side A-pillar region
7 Head position monitoring system
8 Vehicle inside
9 To be replaced rear view side mirror
10 (subject or equipped) Vehicle
11 Normal horizontal viewing range via side mirror
12 Viewing range as result of head shifting in the y direction
13 Normal horizontal viewing range via camera
14 Viewing range as result of head shifting in the y direction via camera
15 Head of driver shifted strongly (triggering modified view)
16 Modified (increased) viewing range covering blind spot area 17 Blind spot area
18 Viewing area covered by aspherical mirror portion
19 Aspherical mirror portion
20 Vision system
21 Steering column
22 Low distortion lens with limited viewing angle
23 Lens with a middle high distortion (f-theta lens often used for scanners)
24 High distortion lens with increased viewing angle
25 Area of an imager
26 Center of the imager
27 Center of the optical axis of a lens
28 Legally required vision area
29 Captured image of the blind spot area 17 displayed in exceptional situations (modified view)
30 Foreign vehicle in the left side blind spot area
31 Own vehicle B-Pillar
32 Visible are in direct view (not via mirror)
33 Additional viewing range won by using a high distortion lens
34 Additional viewing range 33 after distortion correction
35 Stray light masked area
36 Long side of the imager (case: combination surround view system (SVS)+mirror replacement camera)
37 Angle between optical axis and horizon
38 Angle between optical axis and maximal forward viewing angle
39 Long side of the imager in the camera (case combination blind spot camera+mirror replacement camera)
40 Legally required viewing angle with high resolution
41 Left camera image
42 Right camera image
43 Rear camera image
44 Cluster display
45 Central column integrated display
46 Dashboard Display
47 Heads up display (at the lower region of the windshield)
48 Transparency switchable display (at the lower region of the windshield)
49 Windshield
50 Rear camera pointing substantially to the rear with offset between center of the imager 26 and the optical axis 27 of the lens in accordance with the present and such as shown in FIGS. 8A, 8B, 8C and 8D
112 imaging system or vision system
114a rearwardly facing imaging sensor or camera
114b forwardly facing imaging sensor or camera
114c & 114d sidewardly facing imaging sensor or camera
116 display device
118 control or electronic control unit (ECU) or processor that is operable to process image data captured by the cameras
120 interior rearview mirror assembly
121 Area the optic projects light on
122 Area outside of the area optic projects light on (dark area)

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near or far to the vehicle and in the predicted path of the vehicle, such as to assist a driver of the vehicle, such as when the vehicle is not moving or standing still, or driving forward, or to survey the rear area and when driving rearward in maneuvering the vehicle in a rearward direction, or to survey the sideward area and when driving forward and maneuvering the vehicle in a forward direction and/or changing lanes. The vision system includes an image processor or image processing system that is operable to receive image data from one or more cameras and provide an output to a display device for displaying images representative of the captured image data.

Referring now to the drawings and the illustrative embodiments depicted therein, a vehicle 10 includes an imaging system or vision system 20. As shown in FIG. 1, the system includes a camera 1 which replaces the driver side rear view outer mirror and/or a camera 2 which replaces the passenger side rear view outer mirror. Optionally, the system may also include a camera as an interior rearview mirror replacement. The images of the cameras are displayed on one or several monitors (5 and 6). Optionally, the images may be stitched to one seamless rearview image. When the driver keeps his or her head in a normal position, the head is located at position 3. By shifting the head to the side into the position 4 or 15, the driver indicates to the system that he or she wants to see a modified viewing regime. The vision system 20 may include a control or electronic control unit (ECU) or processor that is operable to process image data captured by the cameras and may provide displayed images at the display devices 5 and 6 for viewing by the driver of the vehicle. Optionally, and alternatively, these images may be displayed on one display monitor or at a display screen of or incorporated in the interior rearview mirror assembly. Optionally, all of the image processing may be done in the single camera or monitor without using an additional ECU. The data transfer or signal communication from the camera to the ECU may comprise any suitable data or communication link, such as a vehicle network bus or the like of the equipped vehicle. Optionally, the camera supply and or data transfer may happen via analog carrier waves such as described in U.S. patent application Ser. No. 14/297,663, filed Jun. 6, 2014, now U.S. Pat. No. 10,567,705, which is hereby incorporated herein by reference in its entirety. Optionally, the mirror cameras are connected by a weather tight pig tail connector equipped with a tolerance compensating connector such as described in U.S. provisional application Ser. No. 61/350,056, filed Feb. 3, 2014, which is hereby incorporated herein by reference in its entirety.

The system of the present invention includes a head monitoring system 7, such as a camera and image processor (such as described in U.S. provisional application Ser. No. 61/977,940, filed Apr. 10, 2014, which is hereby incorporated herein by reference in its entirety) or laser monitoring system or capacitive sensing system or any suitable system for determining the position of the driver's head and optionally a gaze direction of the driver's eyes, such as described in U.S. provisional application Ser. No. 61/977,941, filed Apr. 10, 2014, which is hereby incorporated herein by reference in its entirety, and for determining a movement and amount of movement of the driver's head (and optionally a change in gaze direction) when the driver is sitting in the driver seat and driving or normally operating the vehicle. The system is operable to display the images captured by the side-mounted rearward viewing camera or cameras to provide a side and rearward field of view to the driver that is representative of a typical rearward field of view provided by known side mounted rearview mirrors. The system is operable to adjust the displayed images responsive to a determination of a movement or change in position or viewing direction of the driver's head (and optionally a change in the driver's gaze direction) to provide a display system that adjusts the displayed images in a manner that simulates how the driver's field of view would change with similar movements when viewing a typical side-mounted exterior rearview mirror, as discussed below.

Typically, vehicles include exterior rearview mirrors that allow the driver to monitor the rear and side area of a vehicle. These mirrors are required to get the homologation (Zulassung) of a vehicle. There are considerations to replace mirrors with camera-monitor-systems (CMS). See UN Regulation No. 46, ECE homologation proposal, which is hereby incorporated herein by reference in its entirety.

The ISO standard 16505 (see ISO_DIS_16505_(E), draft in status 40 of the ISO Standard ISO 16505, published May 2013, which is hereby incorporated herein by reference in its entirety, and for which the final revision is expected in 2014) will be the basis for future homologations of camera monitor systems in different nations. The presently available ADAS camera systems provide additional assistance for the driver but are not mirror replacements. In the UN Regulation No. 46 and the ISO Standard 16505, the following aspects of mirrors and camera-monitor-systems are described:

Several mirror classes are defined for different purposes.

Minimal field-of-view requirements are defined for each mirror class.

Minimal magnification values are defined for each mirror class.

Minimal resolution values are defined.

When replacing a mirror by a CMS, the CMS must fulfill at least the requirements of the mirror with respect to field-of-view, magnification and resolution.

In ISO 16505, a default view is defined. The portion of the image which contains the default view must fulfill all the legal requirements mentioned above.

With known mirrors, the driver has the possibility to move his or her head to the side and thereby improving the desired view in special driving situations, but this is not done with a CMS.

Therefore in ISO 16505, a modified view is described with a changed field of view. The driver can adjust temporarily the field of view by any means to better see the street in special driving situations (for example, when entering a freeway or autobahn, switching lanes on a freeway or autobahn, driving in a traffic circle or roundabout). In this case the requirements of the default view may not be fulfilled.

Head tracking systems exist, such as for interactive video games (such as, for example, the Sony Wii video game). The movement of the user's head is monitored and put into the display of the video game. By moving the head, the game player gets a pseudo 3D impression.

A system has been proposed where the head of a driver is tracked via a laser system (see, for example, International Publication No. WO 2013/109869, which is hereby incorporated herein by reference in its entirety). This information is used to create a 3D impression by parallax motion scrolling for the driver with respect to a surround view system (SVS) system.

The present invention is applicable to any of the different mirror classes. The following example refers to right side traffic and left (driver side) exterior mirror of a passenger vehicle (referred to as a Class III mirror). The exterior mirror is added by or preferably replaced by a camera-monitor-system or CMS. The camera is mounted outside the vehicle and eventually integrated to a mirror housing when a mirror is still present or at about the position that side mirrors are usually mounted to meet the ISO 16505. In future applications, the mounting position may be alternatively at or in the front top corner of the front door, the B-pillar of the vehicle, the blinker assembly, or otherwise hidden at the vehicle. As described in U.S. patent application Ser. No. 14/098,817, filed Dec. 6, 2013 (which is hereby incorporated herein by reference in its entirety), there are many possible locations at which cameras may be placed at a vehicle. U.S. patent application Ser. No. 14/098,817 describes a multi camera Stanford light field camera arrangement. Such a light field may optionally serve as an image source and depths information for the CMS, hereinafter discussed are systems with a mono CMS camera on each side of the vehicle.

Figure 13A:
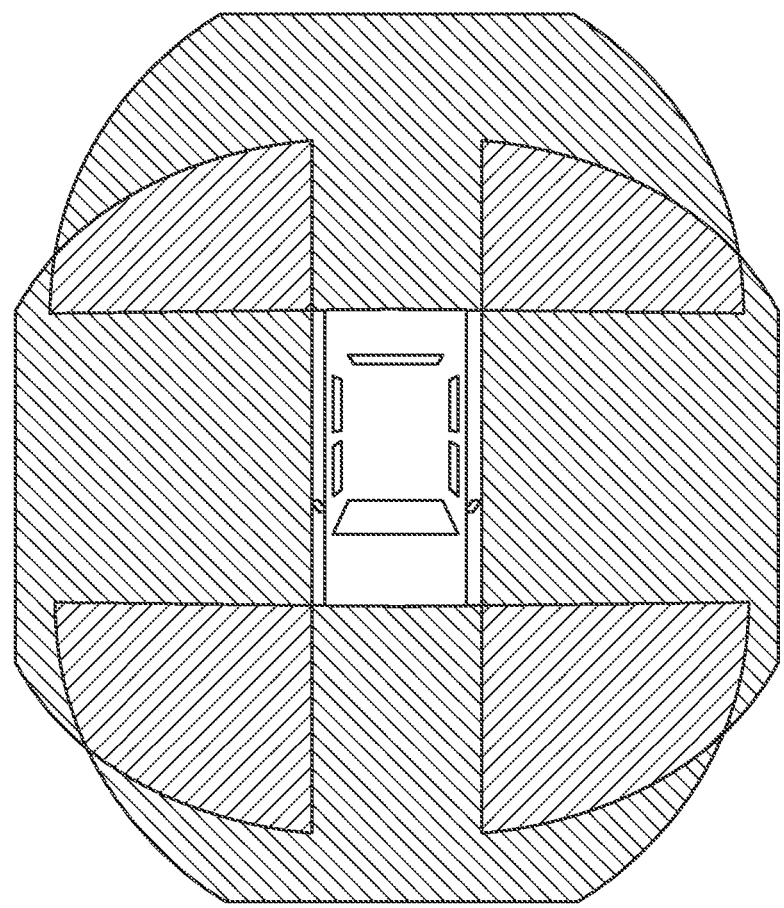
FIG. 13A is a schematic showing a vehicle from over top having front and rear cameras and side mirror housing integrated side cameras with fish eye angle lenses, shown with highlighting of the camera viewed areas that are used for generating surround vision images, using a setup such as shown in FIG. 31A.
Figure 13B:
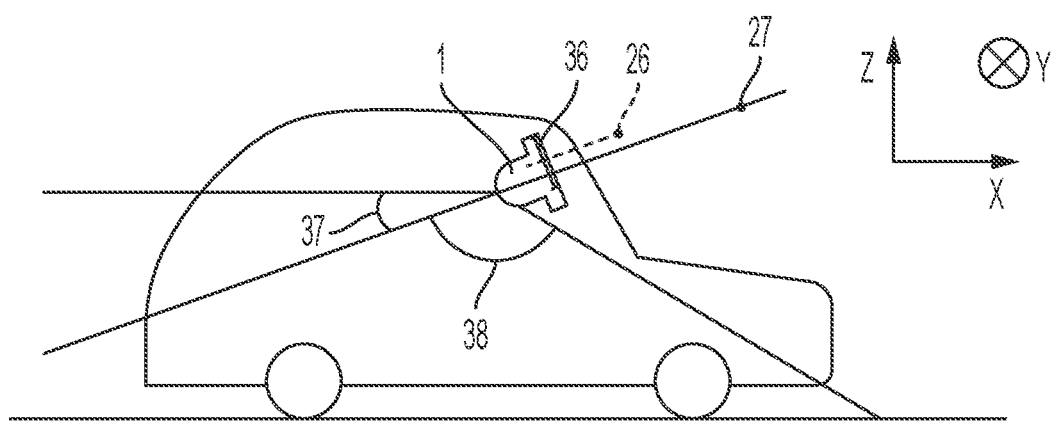
FIG. 13B is a schematic showing a vehicle side camera with a wide angle lens, shown with highlighting the angles of the areas of view which may be used for generating twice surround vision images and rearward and sideward images as side mirror replacement.
Figure 13C:
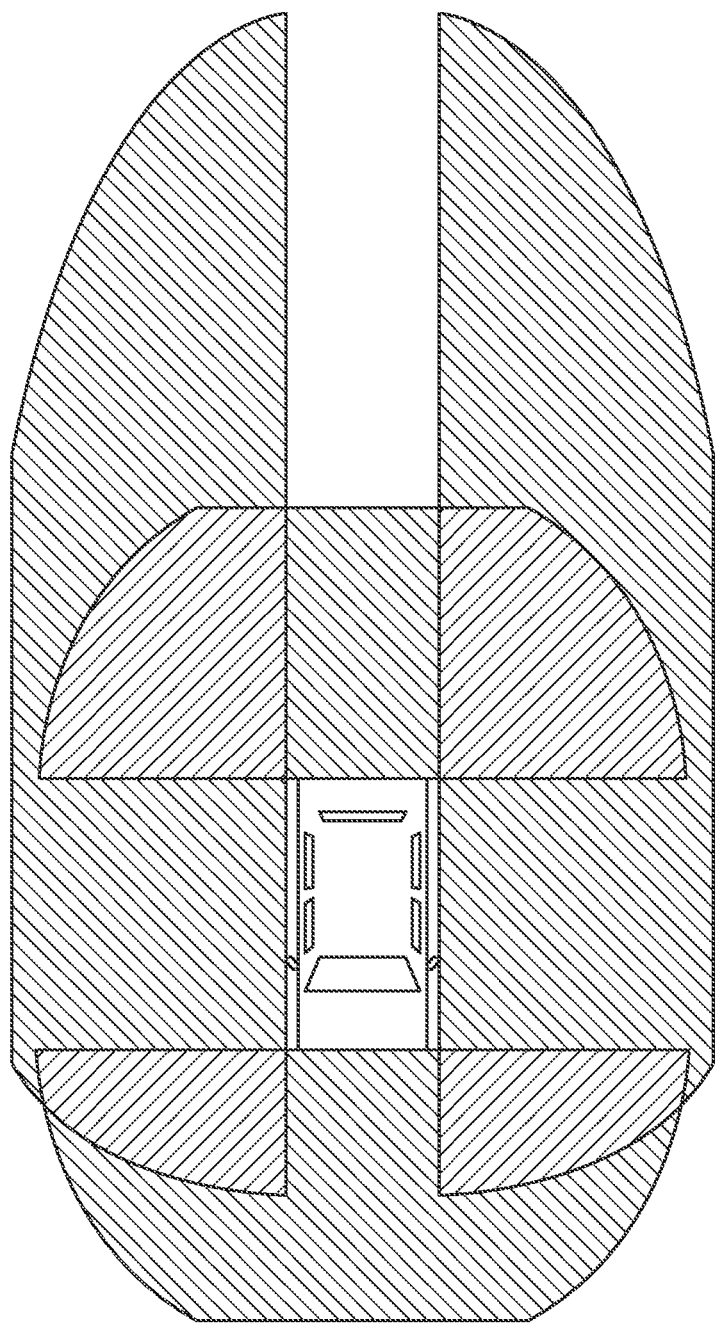
FIG. 13C is a schematic showing a vehicle from over top having front and rear cameras and side mirror housing integrated side cameras with wide angle or fisheye lenses, using a setup such as shown in FIG. 31D, shown with highlighting the angles of the areas of view that are used for generating twice surround vision images and rearward, shown with the side cameras pitched slightly towards the rear of the vehicle.
Figure 13D:
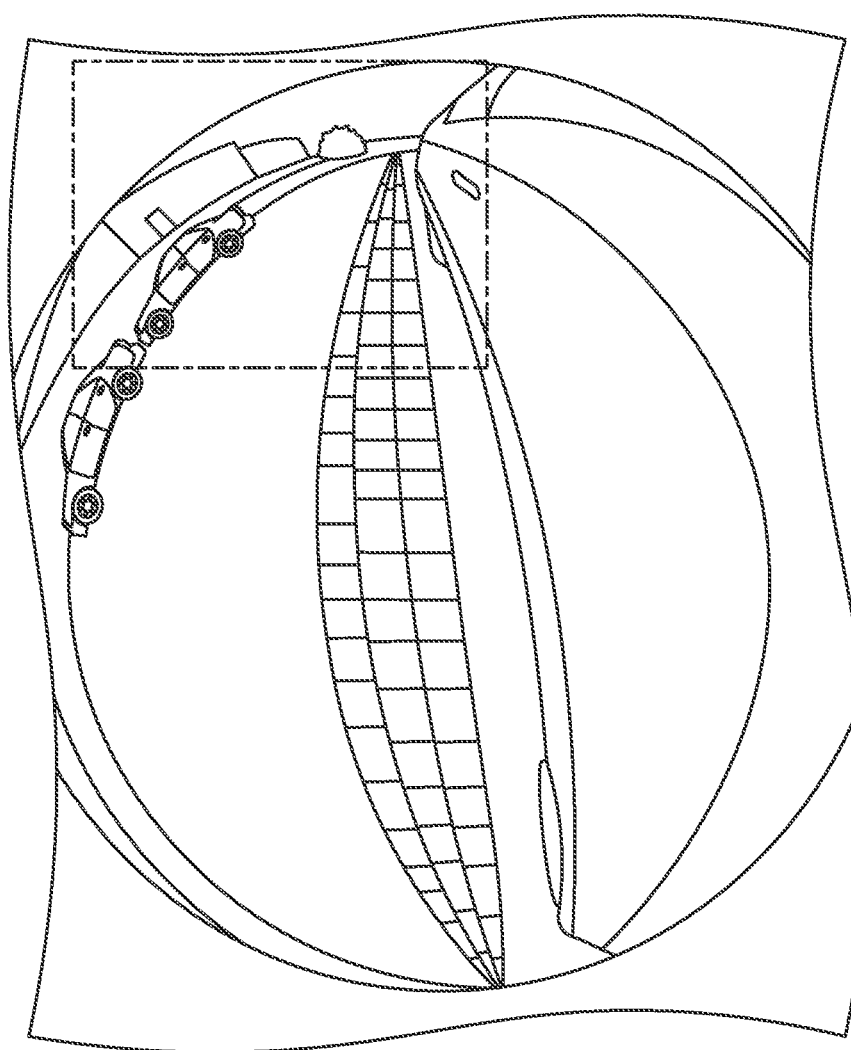
FIG. 13D is an image taken by a right side fisheye camera which is slightly pitched toward the rear of the vehicle such as shown in the schematic of FIG. 13C, with the dotted box indicating a region of interest that may be used for generating a rear view such as shown in FIG. 13F.
Figure 13E:
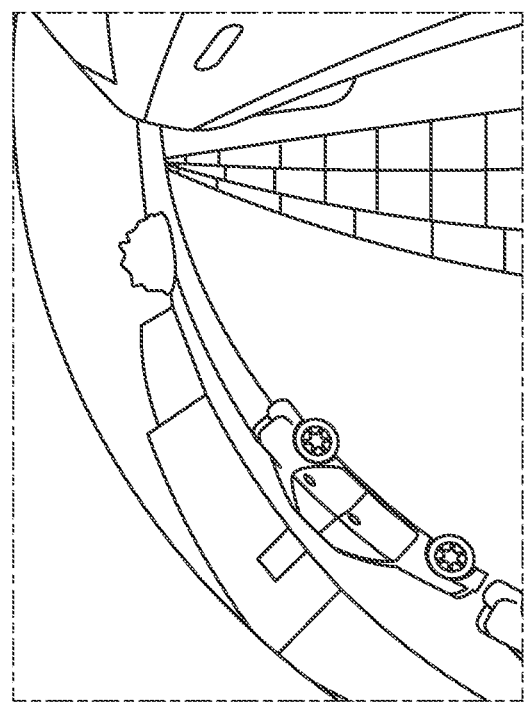
FIG. 13E is an enlarged view of the dotted box area in FIG. 13D, indicating a region of interest which may be used for generating a rear view such as shown in FIG. 13F.
Figure 13F:
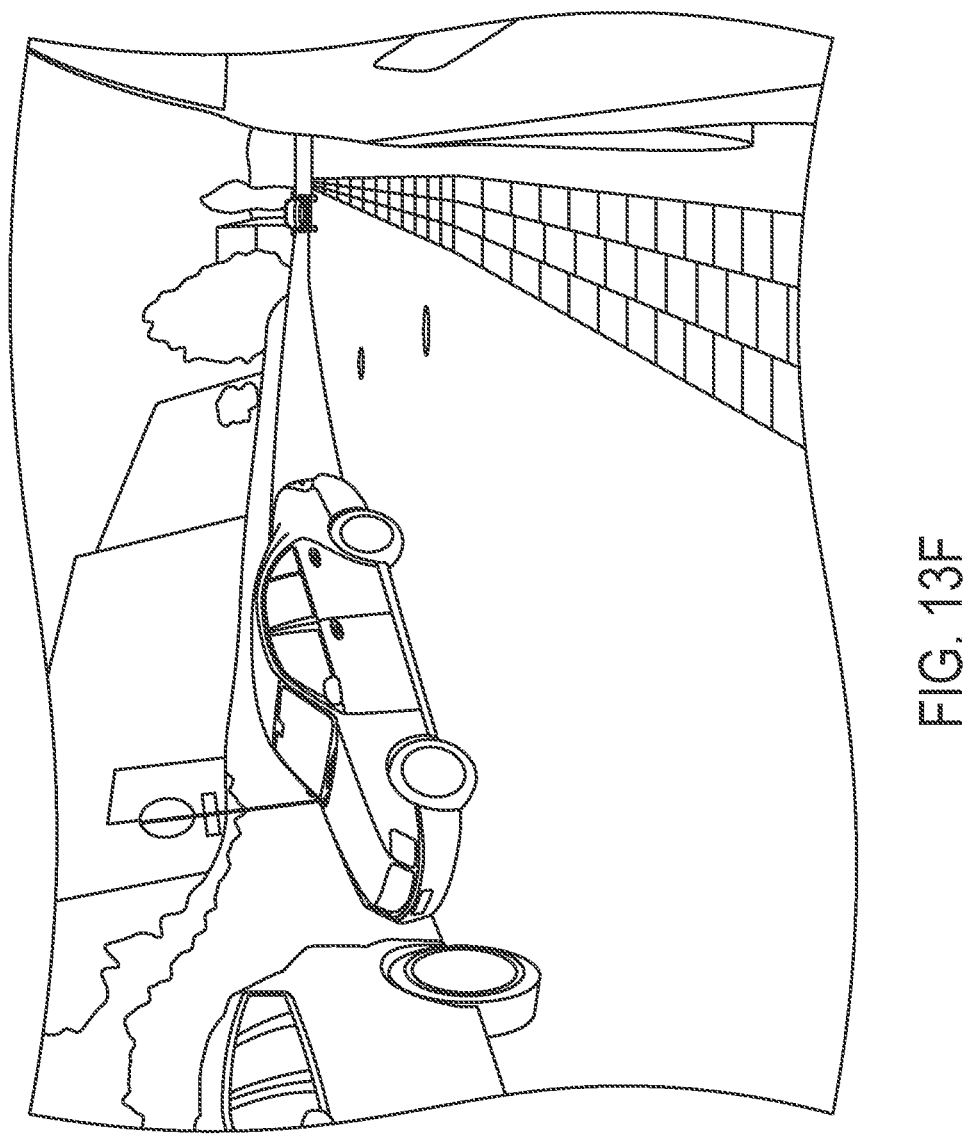
FIG. 13F is an undistorted image of the image of FIG. 13E for generating an undistorted rear view image.
Figure 14:
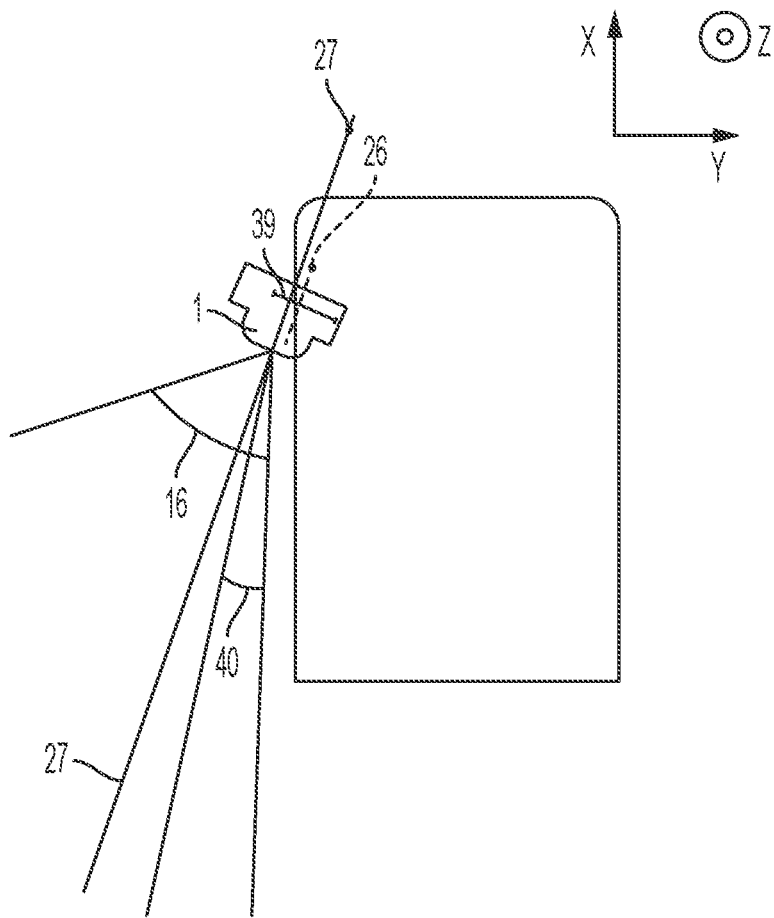
FIG. 14 is a schematic showing the imager orientation of a camera which simultaneously captures the legally required regime (as required by a rearview mirror) as well as the blind spot regime.

When using single side cameras, the side camera either is viewing rearward, and views partially rearward of the vehicle along the side of the vehicle at which the camera is mounted (such as shown in FIG. 14), or the vision system generates a rearward view (such as shown in FIG. 13F) out of or derived from a rearward area of a wide angle (such as a fish eye) view (FIG. 13D) from a camera that has a field of view that covers or encompasses areas from the front to the rear and sideward from the vehicle when pointing substantially downward as shown in FIG. 13A. By using a side camera slightly pitched to the rear as shown in FIG. 13C, the covered area or viewed area is still sufficient for generating a SVS image, and by demorphing the area of FIG. 13E a rearward view with comparably low resolution can be generated as like shown in FIG. 13F. To increase the image resolution, there is always the option to use imagers with a higher amount of pixels, such as a two mega pixel (2 MP) imager or higher. SVS cameras typically comprise an imager having about one mega pixels.

Optionally, and desirably, the camera may be adjusted to cover the legally required field-of-view which may be close or identically to ISO 16505. This adjustment can be done manually mechanically, and optionally such as by software using targets or as automatically calibration (such as by utilizing aspects of the systems described in U.S. Pat. Nos. 7,914,187 and/or 8,421,865, and/or U.S. patent application Ser. No. 13/521,872, filed Jul. 12, 2012, now U.S. Pat. No. 9,150,155, and/or International Publication Nos. WO 2012/145822; WO 2012/158167; WO 2013/074604 and/or WO 2013/086249, which are all hereby incorporated herein by reference in their entireties).

The head of the driver is measured by a head tracking system that may, for example, use a laser or an infrared (IR) camera system eventually in combination with IR illumination or by any other system. The x, y, z position of the driver's eyes are monitored and eventually also the eye gaze. The gaze may serve as input for the scrolling control and optionally for controlling adjustable or switchable mirrors or displays as discussed below.

An average sitting position (see 3 in FIGS. 1 and 5) of the driver is evaluated and stored as a reference position. The legally required default view (see 13 in FIG. 5) is displayed when the driver keeps in this reference position.

In accordance with the present invention, the system detects movement or change of position of the driver's head, whereby movement of the driver's head to the left or the right (the y direction) effects a modified displayed field-of-view (see 14 in FIG. 5) on the display in order to simulate the vision into a mirror (as well in 2D else in 3D). By moving or change of position of the driver's head towards the display (the x direction), the image may zoom in or roll toward and by moving the driver's head backward or away from the display, the image may zoom out or roll backward accordingly. Alternatively, the image scaling may work in an opposite way, such as, for example, by moving or change of position of the driver's head towards the display (the x direction), the image may zoom out or roll away, and by moving the driver's head backward or away from the display, the image may zoom in or roll toward accordingly. Optionally, the system of the present invention may provide zooming or rolling that may be implemented in a linear, non-linear, exponential, sinusoidal, synodic shaped, logarithmic or in a polynomial behavior or discontinuously (stepwise may be prior known by ISO 16505) or the like.

A standard solution is the usage of one camera with 2D-information which is displayed on the monitor such as implemented by Magna Electronics Europe GmbH & Co. KG® on the project CULT™. An advanced solution is the usage of 3D information. There are different possibilities to get such information:
- stereo cameras;
- 3 D information from motion;
- 3 D information from object classification/segmentation and back projection;
- 3 D from a depth sensor of any kind (such as, for example, LASER, time of flight (TOF), structured light, RADAR and/or the like); and/or
- object distance estimation from plausible size comparison any combination of all or a plurality of these.

By shifting near objects stronger than distant objects on the monitor, a pseudo 3D effect (pseudo parallax) may be provided to the driver. This effect does not require 3D capable displays, but is also from use when using 3D displays. In automotive applications, 3D displays that do not require the viewer to wear extra glasses or shutters are preferred due to the inconvenience of such use of glasses or the like. A possible display which may enhance the depth perception of the driver may be a 'multi layer Display™' MLD® such as offered from PUREDEPTH®.

As another aspect of the present invention, for small head movements only small field-of-view changes may be applied (preferably linear). However, in cases where the vehicle is entering a freeway or autobahn or changing to the left lane, the driver may want to know whether there is a vehicle in the critical blind spot area 17. By moving the head stronger (more of changing in position) to the right he or she may indicate his or her wish, and the system, responsive to a determination of such a head movement, may shift (in 2D) or roll (in 3D or pseudo parallax) the field-of-view stronger for increasing the covering of the blind-spot-area. The shifting/rolling may be linear, non-linear, exponential, sinusoidal, synodic shaped, logarithmic or may have or change or increase in a polynomial or discontinuous manner or behavior.

As another aspect of the present invention, the scaling of the scene displayed may be decreased on the far end (−Y) of the head movement of the driver to open a wider field of view. The scaling may increase in a linear, non-linear, exponential, sinusoidal, synodic shaped, logarithmic or polynomial or discontinuous manner or behavior.

Figure 2A:
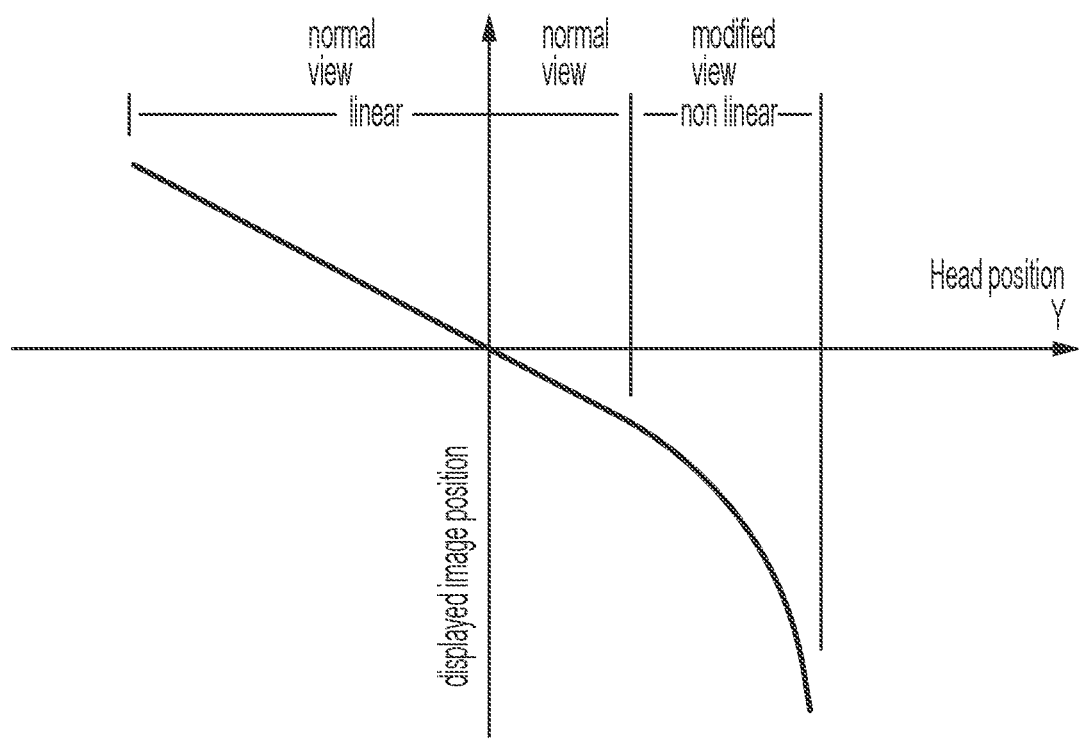
FIG. 2A is a graph showing the amount of shifting or rolling that the system of the present invention may make in the displayed image responsive to a determined amount of movement of the driver's head in the y direction.
Figure 4A:
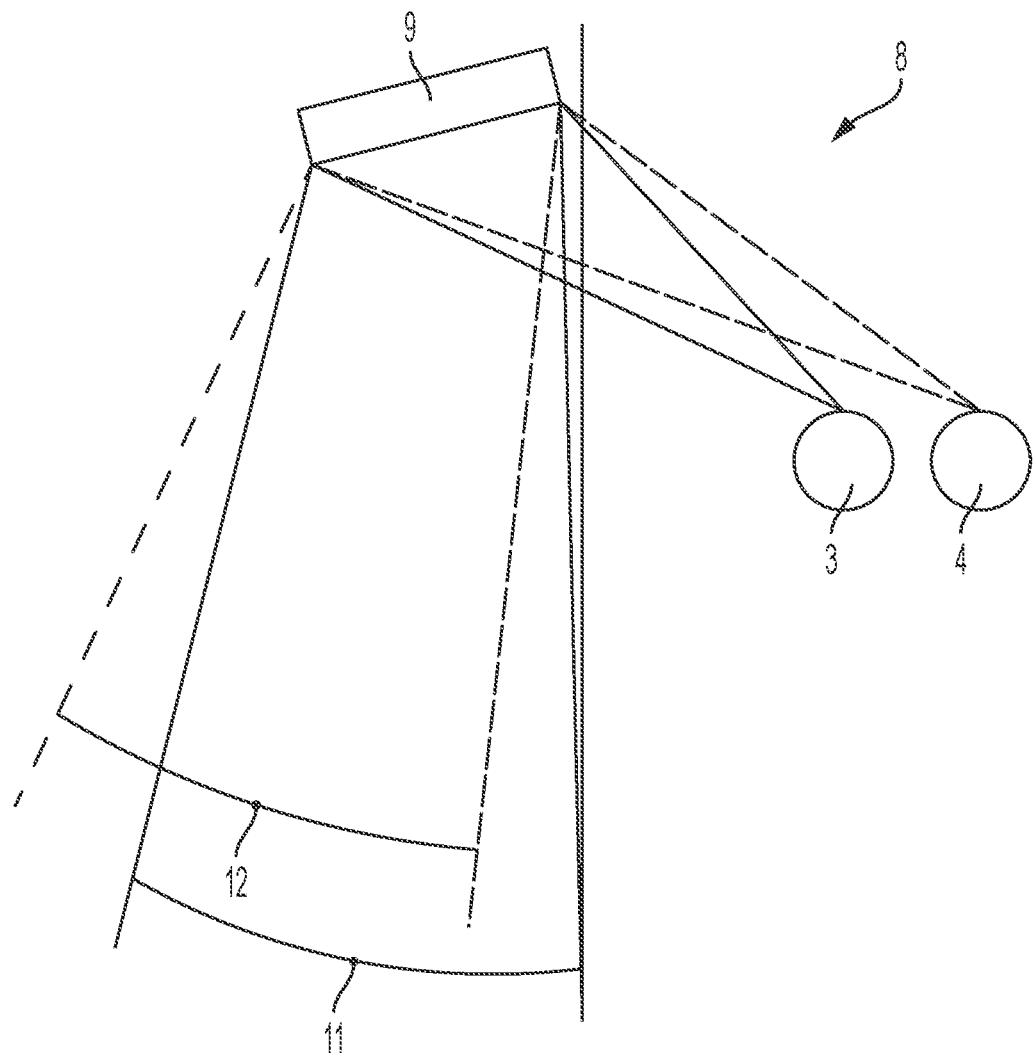
FIG. 4A shows two situations of a driver looking into the left rear view side mirror 9 at a normal head position 3 and at a shifted head position 4, with the resulting viewing ranges 11 close to the vehicle and 12 at a distance to the vehicle, with the inbound angle being naturally identically to the outbound angle.
Figure 4B:
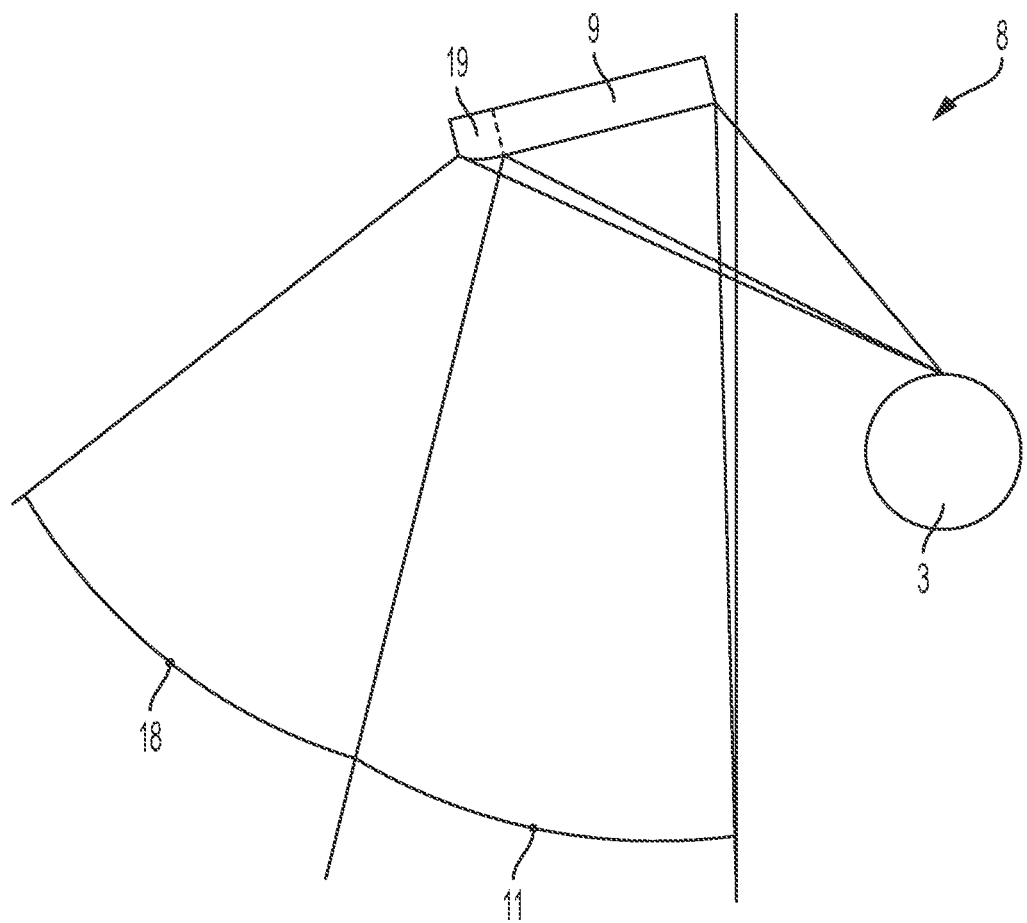
FIG. 4B shows a driver looking into the left rear view side mirror 9 at the normal head position 3 having an extended area of view to the y direction by having an aspherical mirror portion 19 at the far end or outboard region of the mirror reflective element for encompassing the blind spot area.
Figure 5:
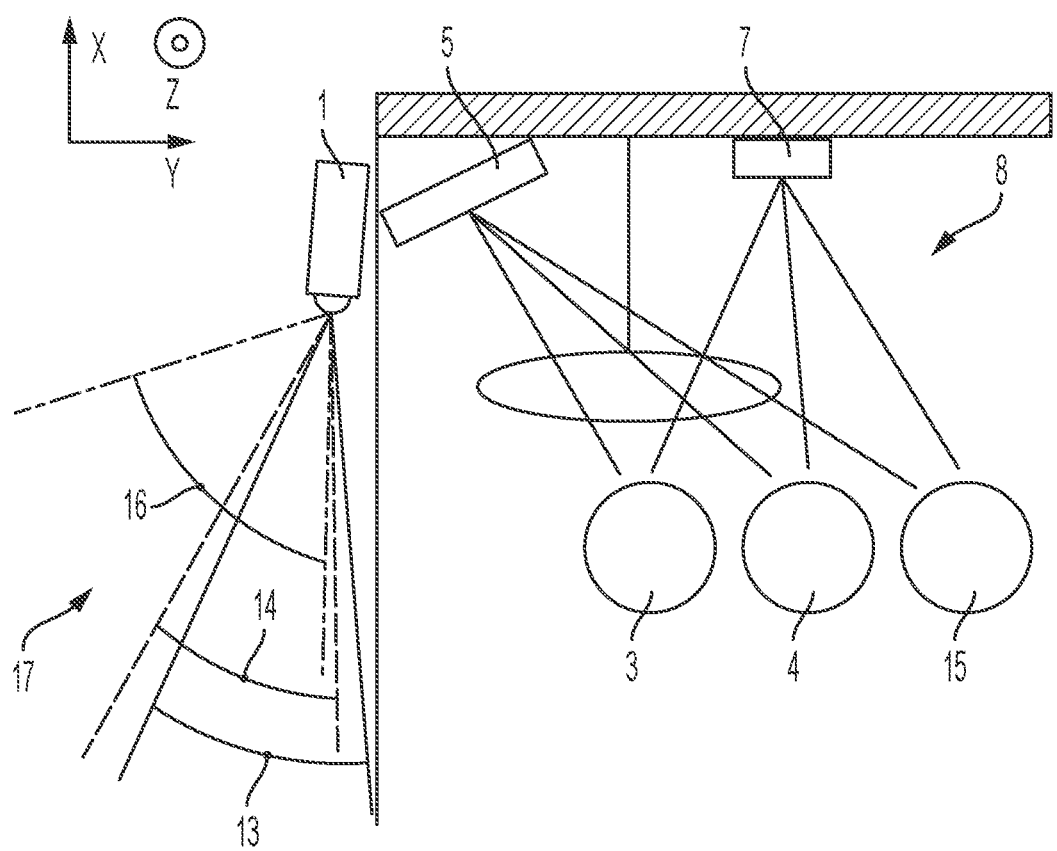
FIG. 5 is a plan view of the system of the present invention, showing three different head positions 3, 4 and 15 and the intended/resulting changes in the viewing area 13, 14 and 16.
Figure 6:
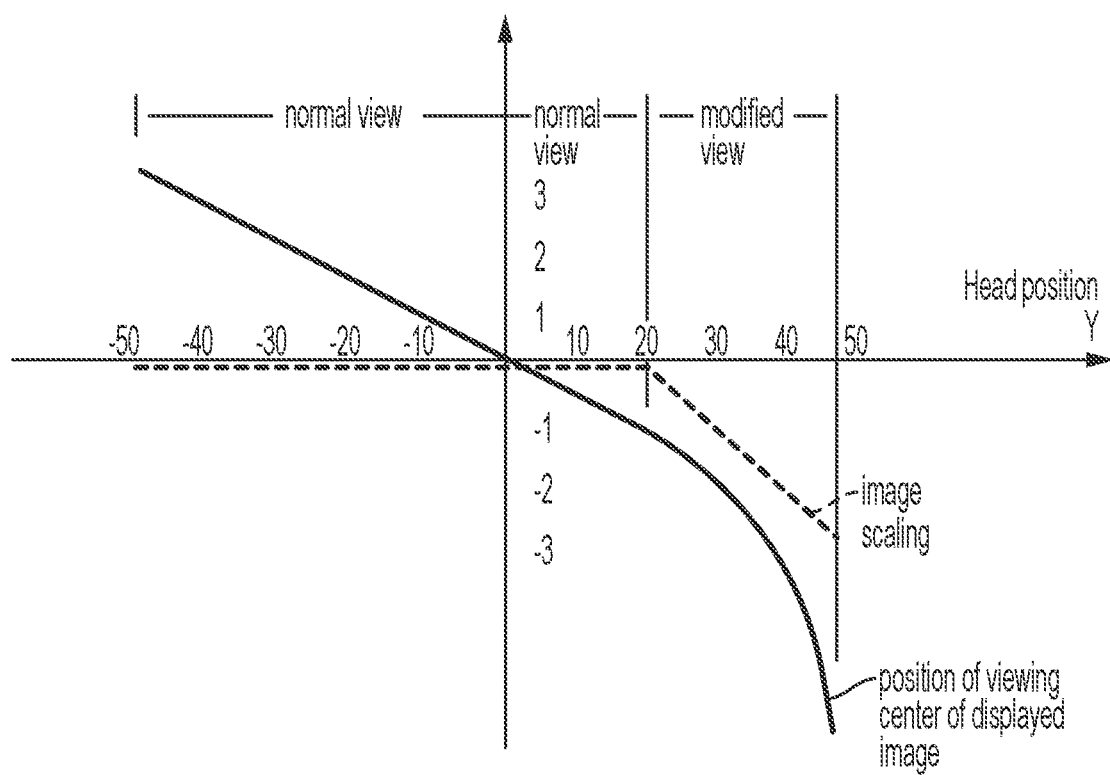
FIG. 6 is a graph showing the amount of combined scaling/magnification change and shifting or rolling that the system of the present invention may make in the displayed image responsive to a determined amount of movement of the driver's head in the y direction according the positions 3, 4 and 15 of FIG. 5.

FIG. 4A shows the effect of a head shift in the case of a classical mirror system. The driver is inside the car 8 and looking at the outer mirror 9. When moving his or her head from position 3 to position 4, the driver's seen viewing regime changes from 11 to 12. So she/he slightly improves the view to the side. FIG. 4B shows an additional area of view 18 in comparison to FIG. 4A, which is achieved by known mirror systems that have an aspherical mirror reflective element portion 19. These typical mirror view properties may be reproduced by the vision system of the present invention, such as seen in FIGS. 2A, 5 and 6. In FIG. 2A, a linear change in the viewing regime with small head movements is indicated corresponding to the regular area of FIG. 6. In FIG. 5, it is shown that a head shift from position 3 to 4 results in the change of the viewing regime from 13 to 14 corresponding to the non-regular area (modified view) of FIG. 6.

In some driving situations, such as when entering a freeway or autobahn or the like, it is very important to view into the blind spot area. Such a blind spot area is known to be outside the field of view of the driver normally operating the vehicle by viewing forwardly through the windshield and down the road being traveled. For example, a known driver side blind spot area exists on vehicles today and is outside the field of view of the driver side exterior rearview mirror. When shifting the head stronger to the side, the driver indicates that he or she wants to see this area. In this case, the viewing range is considerably widened as seen at 17 in FIG. 5.

With a known mirror system (such as like the system shown in FIG. 4A), it is often difficult to see the blind spot area (see 17 in FIG. 5). A squeezed view of a minor part of the blind spot is given by mirrors with an aspherical portion such as like shown in FIG. 4B. A camera based system may be superior in this point, and with it, the vision system may be able to provide a wide view 16 including the blind spot area 17 (FIG. 5).

Figure 2B:
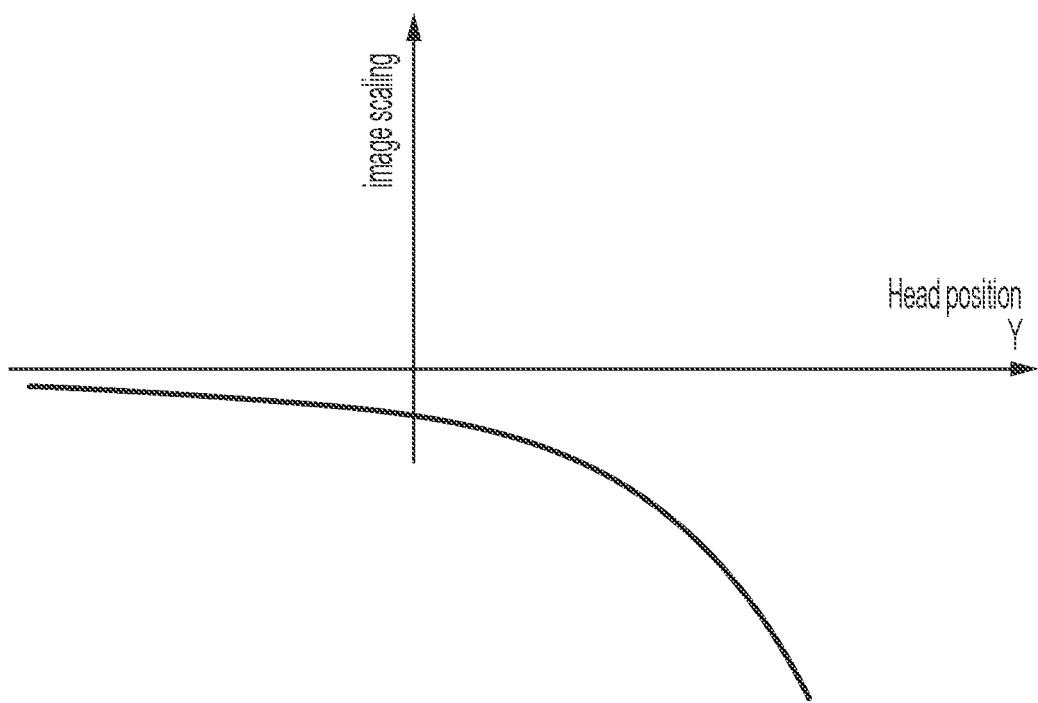
FIG. 2B is a graph showing the amount of non-linear scaling that the system of the present invention may make in the displayed image responsive to a determined amount of movement of the driver's head in the y direction.
Figure 3A:
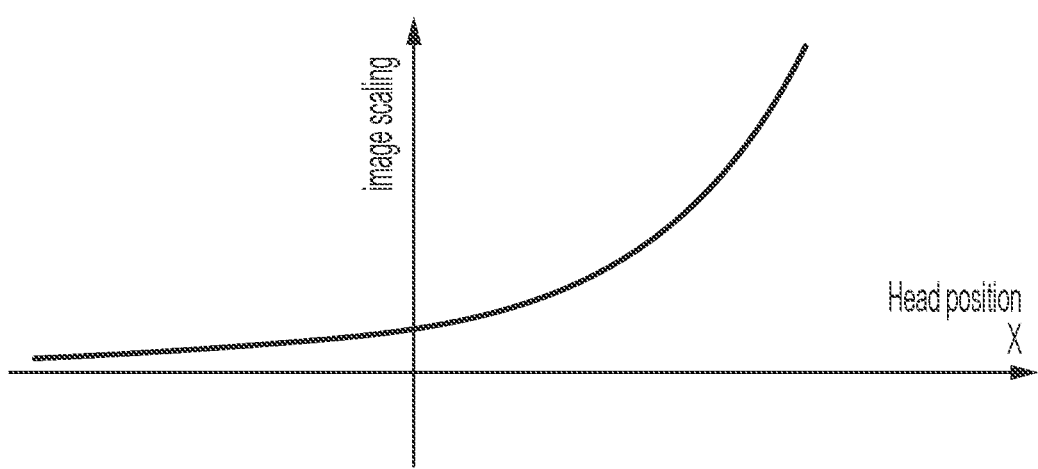
FIG. 3A is a graph showing a first option of the amount of scaling/magnification change in a positive direction that the system of the present invention may make in the displayed image responsive to a determined amount of movement of the driver's head in the x direction.
Figure 3B:
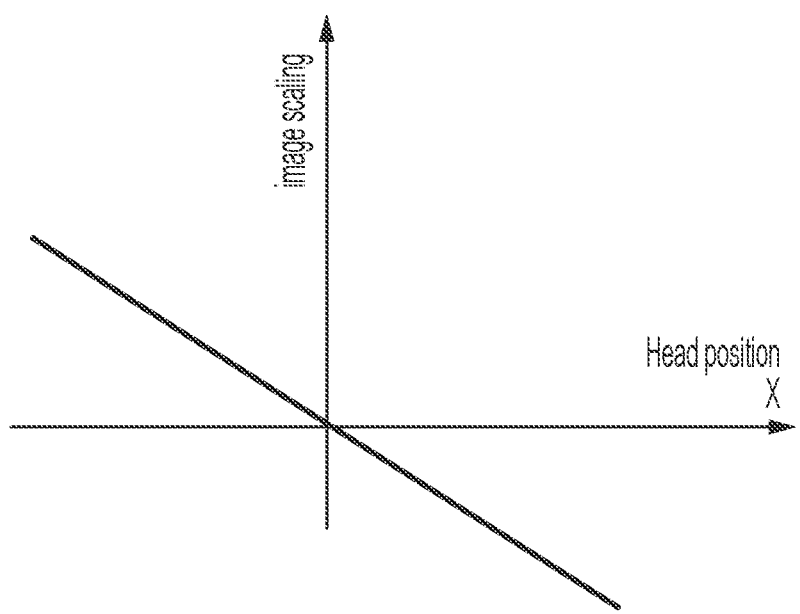
FIG. 3B is another graph showing a second option of the amount of scaling/magnification change in a negative direction that the system of the present invention may make in the displayed image responsive to a determined amount of movement of the driver's head in the x direction.

The increase of the viewing angle is indicated in FIG. 2A. It may be done in a continuous way or stepwise. The magnification may also be done continuously or stepwise, linear or non-linear, in dependency of the head position in the y direction, such as can be seen in FIG. 2B, and in the x direction, such as can be seen in FIGS. 3A and 3B. FIGS. 3A and 3B may be two alternative options of implementation following two different purposes. In FIG. 3A, the magnification/scaling increases when the driver moves his or her face/head towards the display, this may be beneficial to see something in the scene as in close up. In FIG. 3B, the magnification/scaling decreases when the driver moves his or her face/head towards the display, this may be beneficial to adjust the normal display to different drivers. For example, a tall driver may sit at quite a distance to the display, while a smaller or shorter driver may sit comparably closer to the display. By adjusting the magnification counter proportionally, the resulting view may be optimal to both driver types.

In FIG. 6, in the non-regular viewing mode or area the magnification decreases at the same time as the shifting increases (both negatively) with increasing head movement off the normal position (in y direction). By that the scene opens up into the view without downsizing the visible objects within the scene too much.

The camera should fulfill two different conflictive requirements:
- A high resolution and a high magnification of the legally required viewing area of the to-be-replaced mirror is necessary for the normal mode.
- In the modified viewing mode a wide viewing angle must be seen.
- One possible solution may be to use two different cameras, but this adds cost and may be expensive and technically complex.

Figure 10:
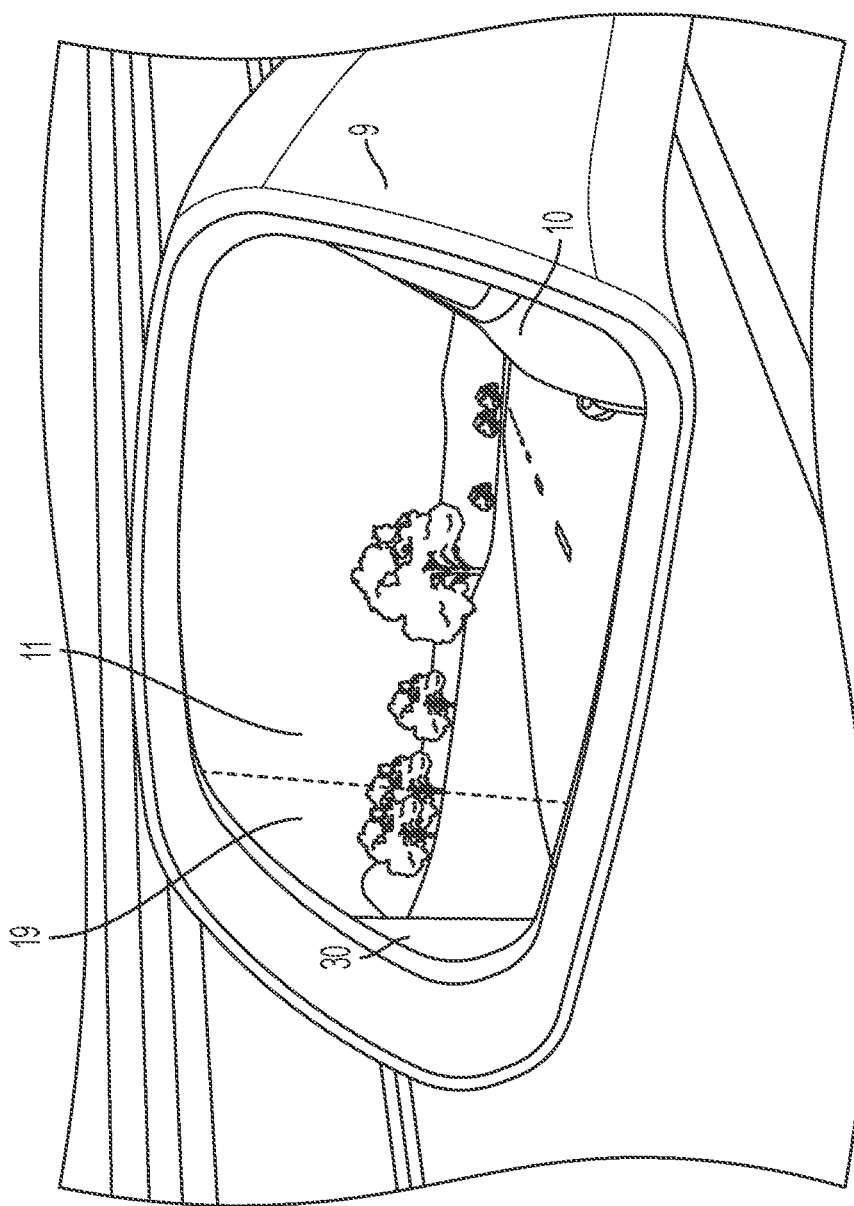
FIG. 10 is the view through the rear view mirror, with the vehicle 30 in the blind spot area being nearly not visible, with 11 being the spherical mirror range and 19 being the aspheric mirror portion.

FIG. 10 shows a driver side rear view mirror with a spherical left side exterior mirror 11 and an aspheric mirror component 19. The CMS covers the range of the spherical side mirror (required). An image captured by a (mirror replacement-) camera will capture the required field of view (regular view) with the necessary magnification (or image scaling) and resolution as like to be seen in FIG. 11A.

Figure 9A:
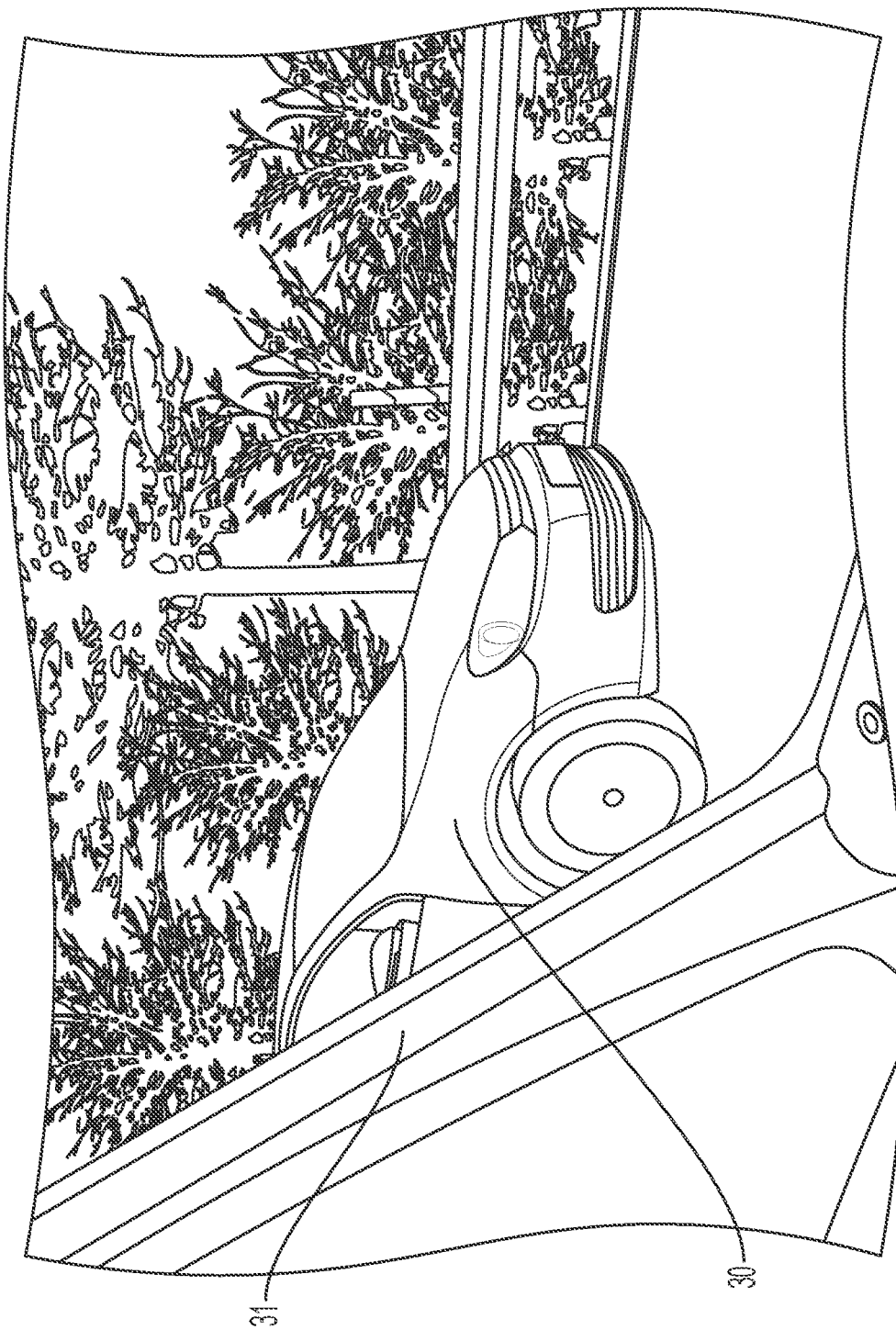
FIGS. 9A and 9B are photos which explain the blind spot situation, wherein a vehicle is in the blind spot area and cannot be seen in the rear view mirror and cannot be seen by the driver in normal head posture, with 30 being a foreign vehicle in the left side blind spot area, 31 being the subject vehicle's B-Pillar, and 32 being visible in direct view (not via mirror)
Figure 9B:
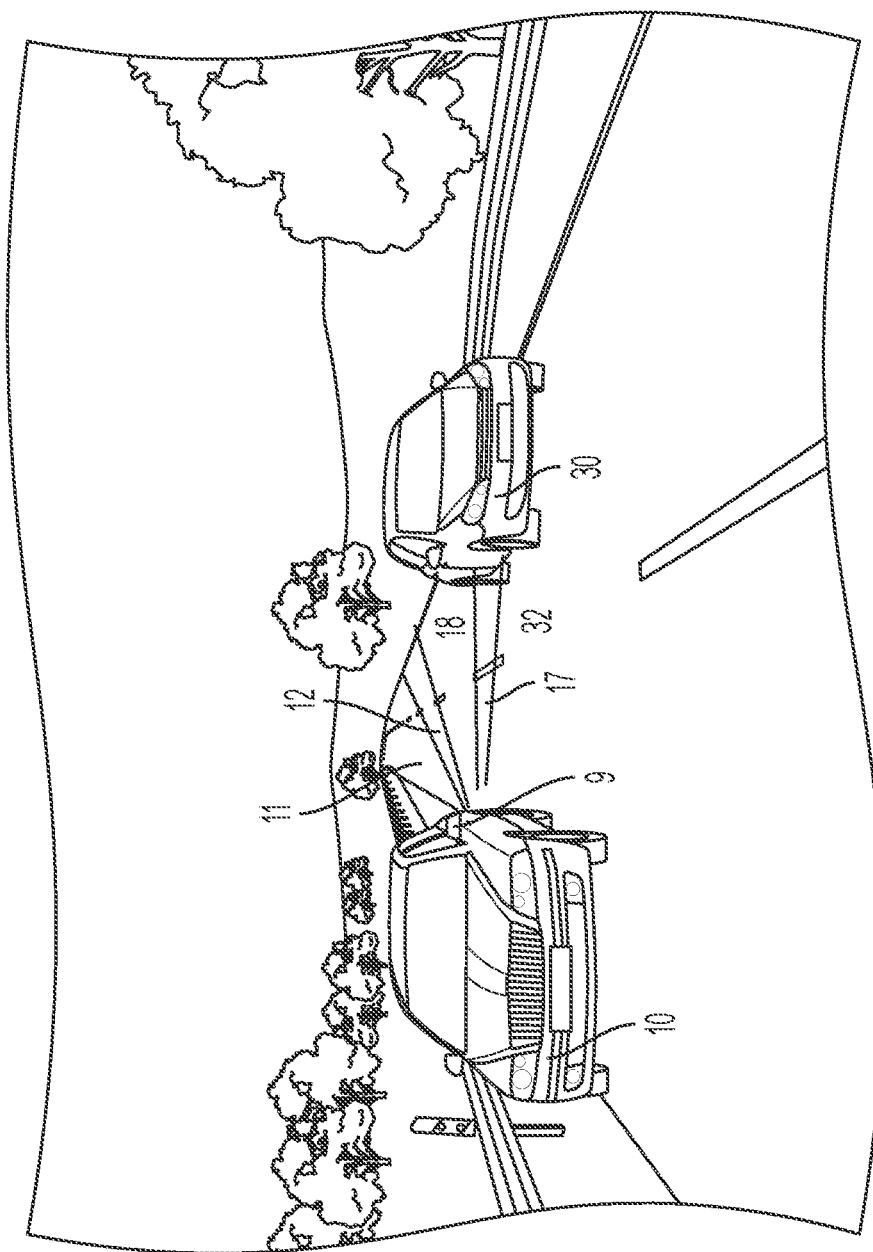

Such a camera does not give view to the blind spot area 17. An example of a blind spot situation is to be seen in FIGS. 9A and 9B. The overtaking car 30 is not visible in the rear view mirror 9 and is not be seen by the driver directly 32 (in other words, is not seen by the driver directly and is not in the driver's peripheral vision when the driver is normally operating the vehicle and looking forward). A wide angle or surround view system camera would give view to the vehicle in the blind spot area, but such a camera yields a poor magnification performance (in other words, the resultant image as viewed by the driver on a video display screen would have elevated magnification and would not be unit magnification, impeding the driver's ability to adequately judge distance using the distorted/magnified displayed image) and a poor resolution (in other words, the resultant image is distorted, impeding the driver's ability to resolve and differentiate featured items in the displayed video images) in the legally required central image area.

Figure 7:
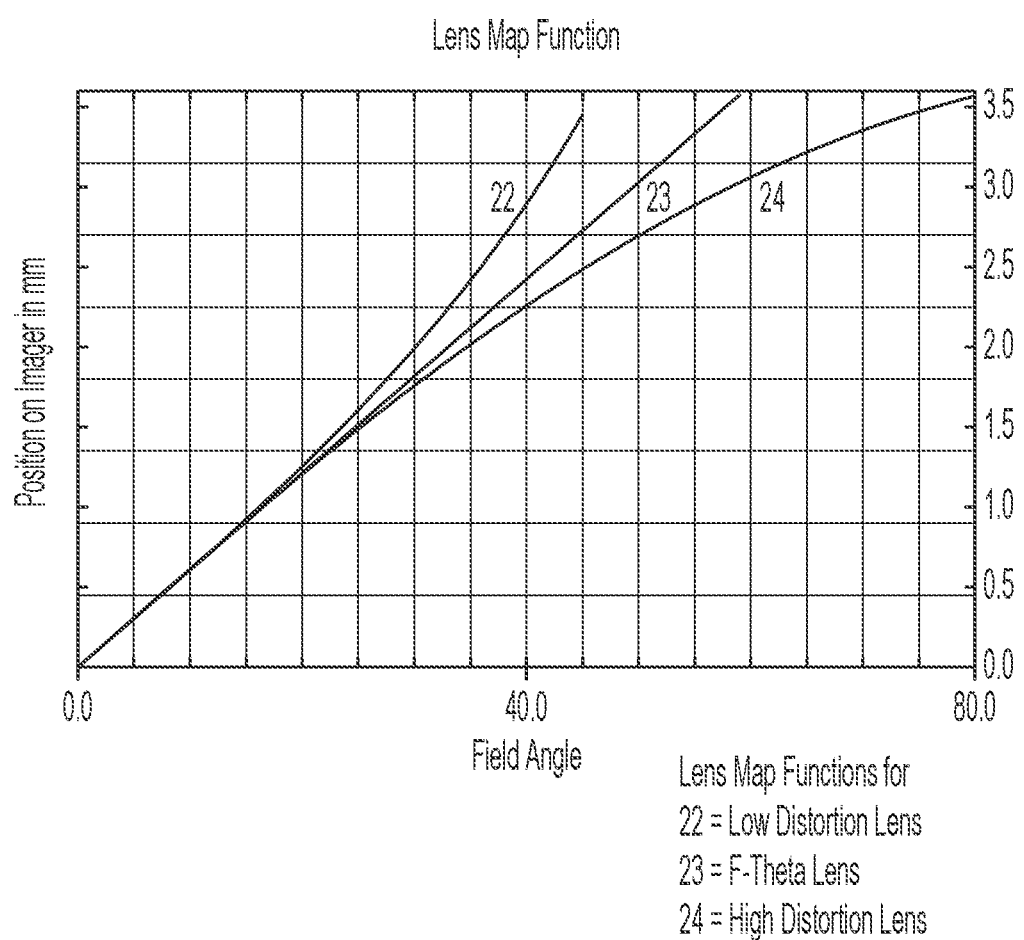
FIG. 7 shows the distortion behavior of three types of lenses, with line 22 representing a low distortion lens with limited viewing angle, line 23 representing a lens with a middle high distortion (f-theta lens often used for scanners), and line 24 representing a high distortion lens with increased viewing angle, and with the magnification at the center being similar in all three cases.
Figure 20:
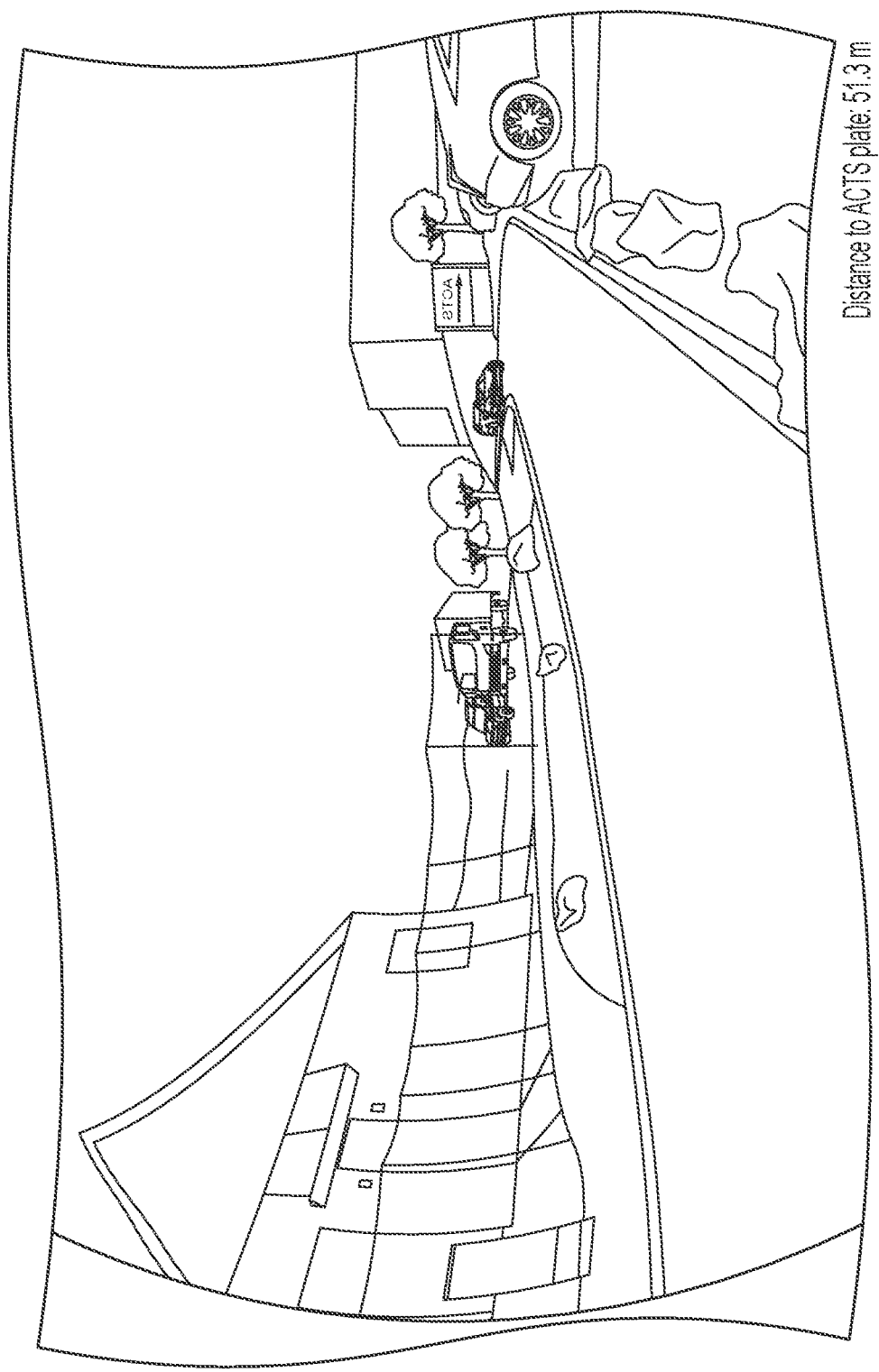
FIG. 20 is an image captured by a rearward facing camera of the vehicle in accordance of the present invention that encompasses the rearward field of view at the exterior rearview mirror of FIG. 19 with an optical setup in accordance to the one shown FIGS. 8A and 11B.
Figure 21:
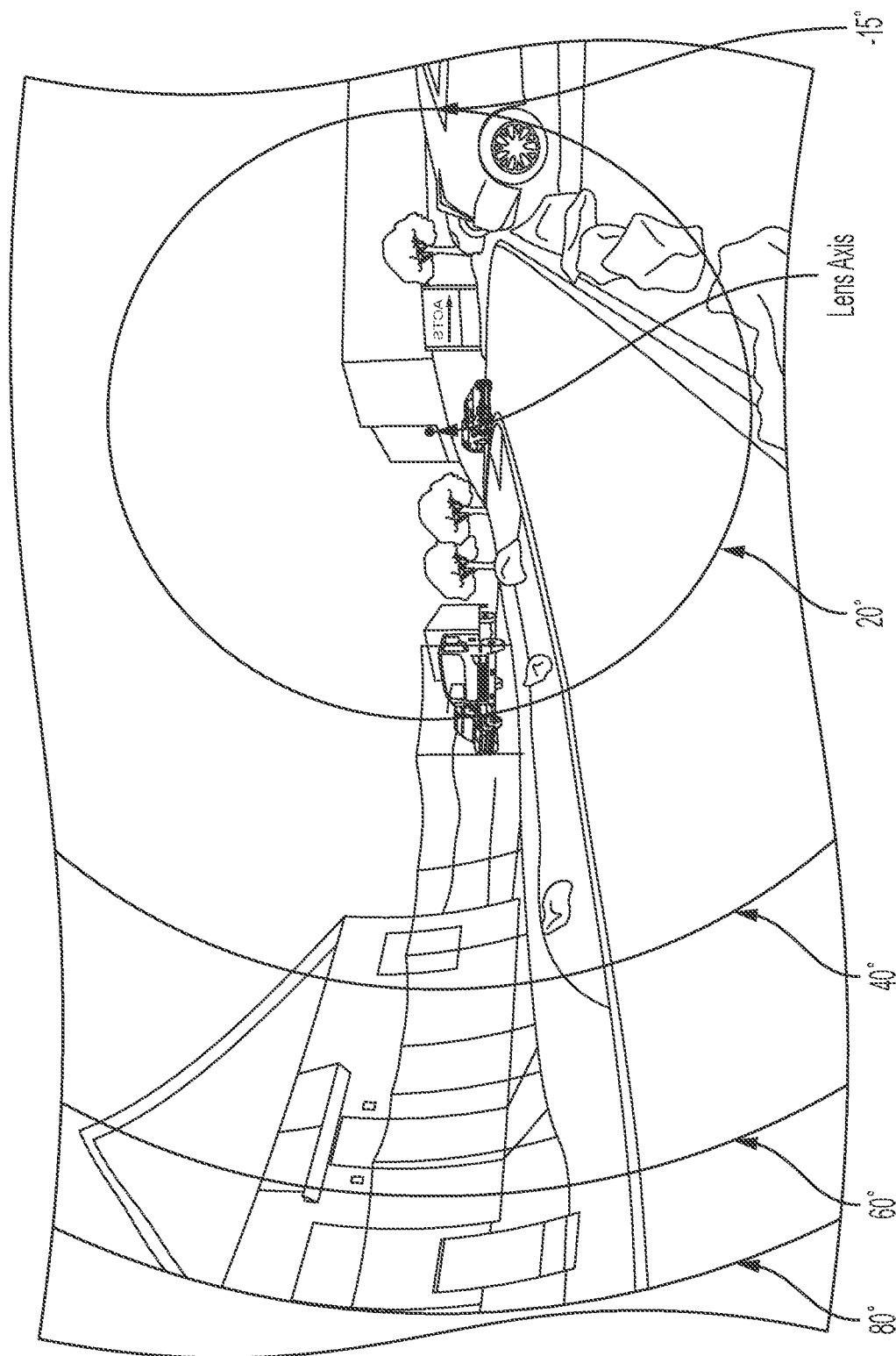
FIG. 21 is an image showing the angles of the fields of view from the principal axis of the lens with the distortion increasing towards the side.
Figure 22:
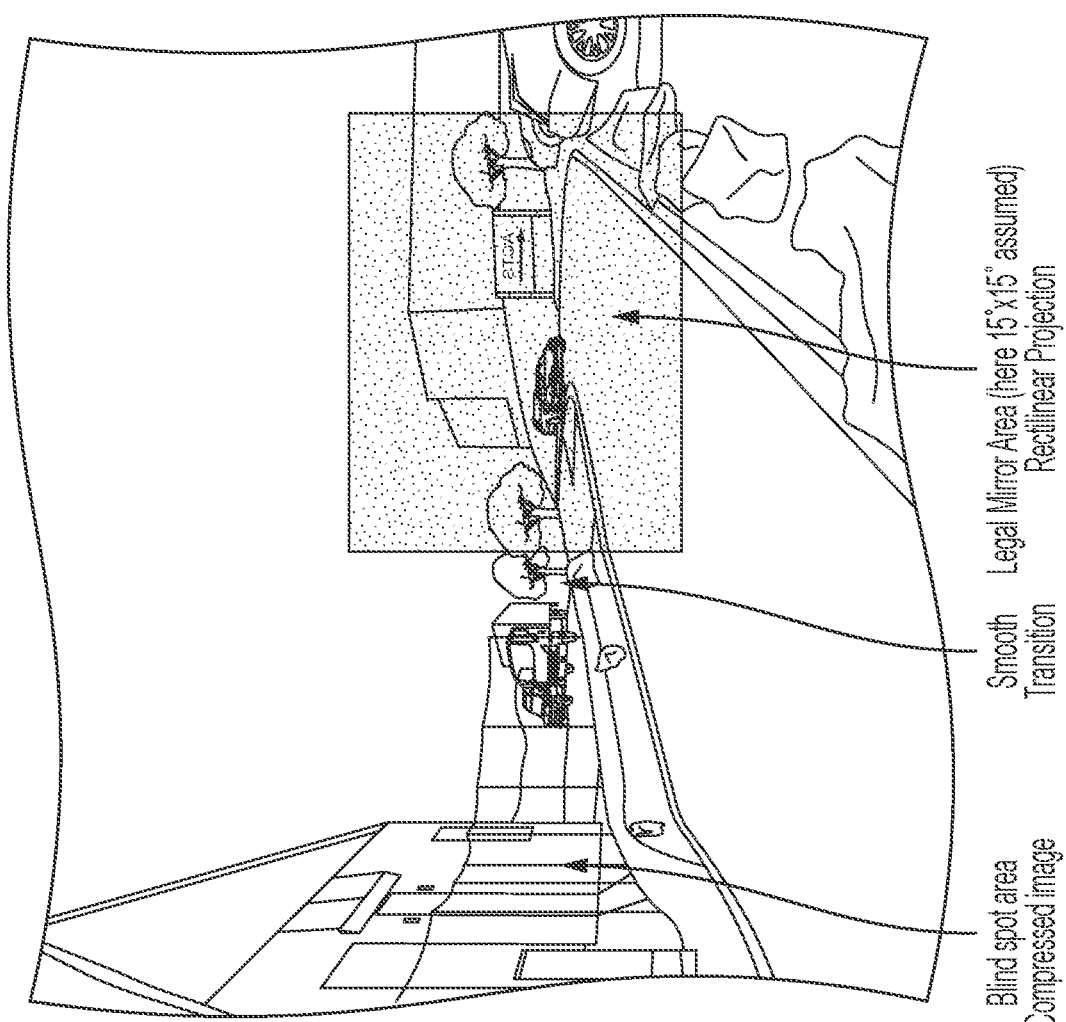
FIG. 22 is an image showing the legal mirror area (darkened box) and a compressed blind spot area, with a transition region between the two areas, with an input image of FIG. 20.
Figure 23:
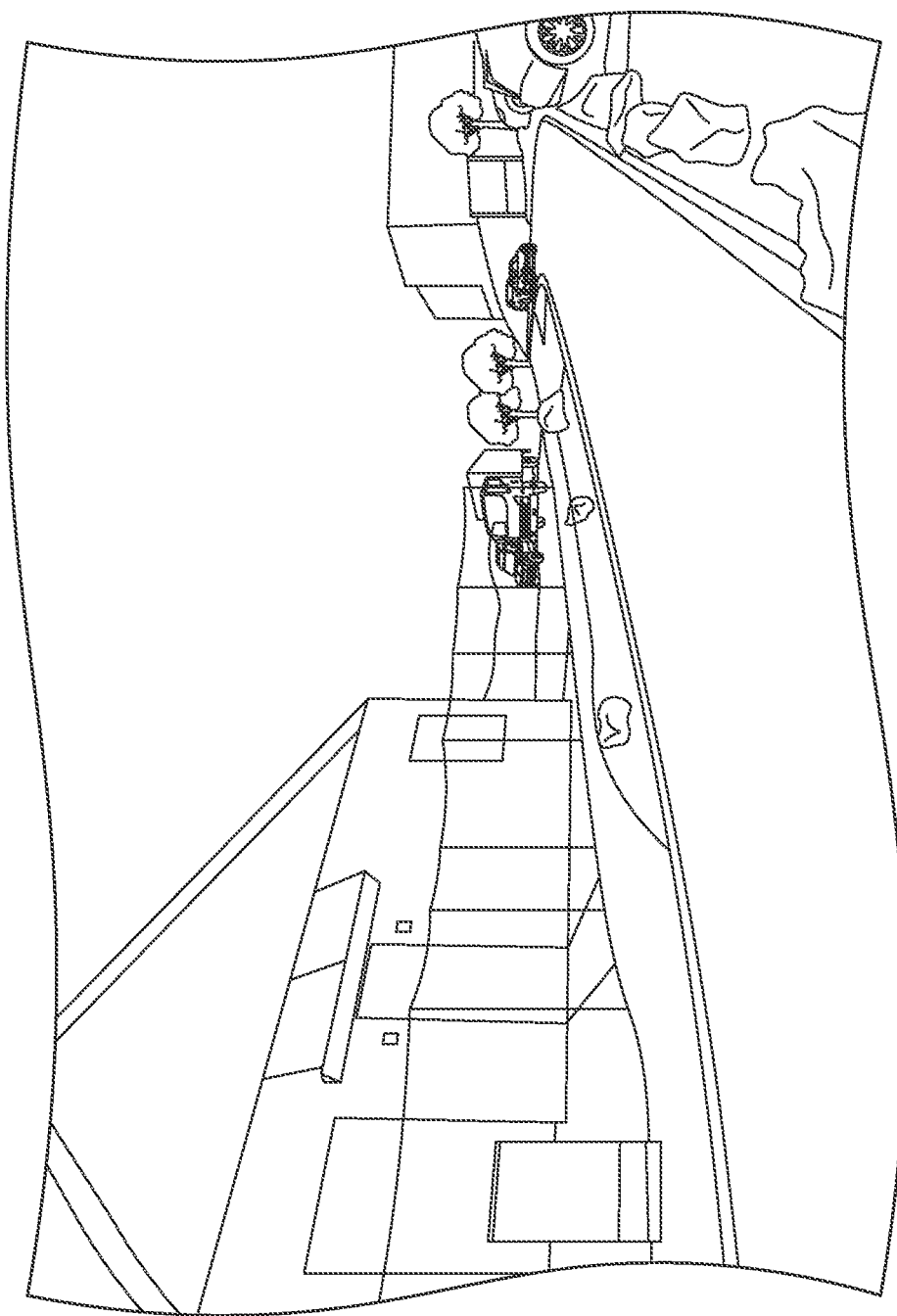
FIG. 23 is an image modified to provide the smooth transition between a principal viewing area and a blind spot region achieved by electronically demorphing of the high distorted area 29 similar to FIG. 11D and in accordance with the present invention, with an input image of FIG. 20.

The situation can be improved by applying the following steps:
1) Use of an offset between center of the imager 26 and optical axis 27 (FIGS. 8A, 8B, 8C, 8D and 14).
2) Use of a high distortion lens 24 (FIG. 7 shows the lens map function of three fisheye lens types, where plot or line 23 is a f-Theta lens with linear behavior; every stronger distortion lens map function than line 23 may be referred herein as a high distortion lens, with plot or line 24 being a possible example of the behavior of such a high distortion lens), such as a wide to very wide angle lens, with high magnification in the center and high field-of-view at the side. An image captured by such a CMS may look as like shown in FIGS. 11C and 20.
3) Applying a mathematical distortion correction to make curved lines straight and to avoid black corners (FIGS. 11C and 20), done in the image processing pipeline before displaying and or in or before machine vision computing (FIGS. 11D and 23 show the resulting images).

Figure 15A:
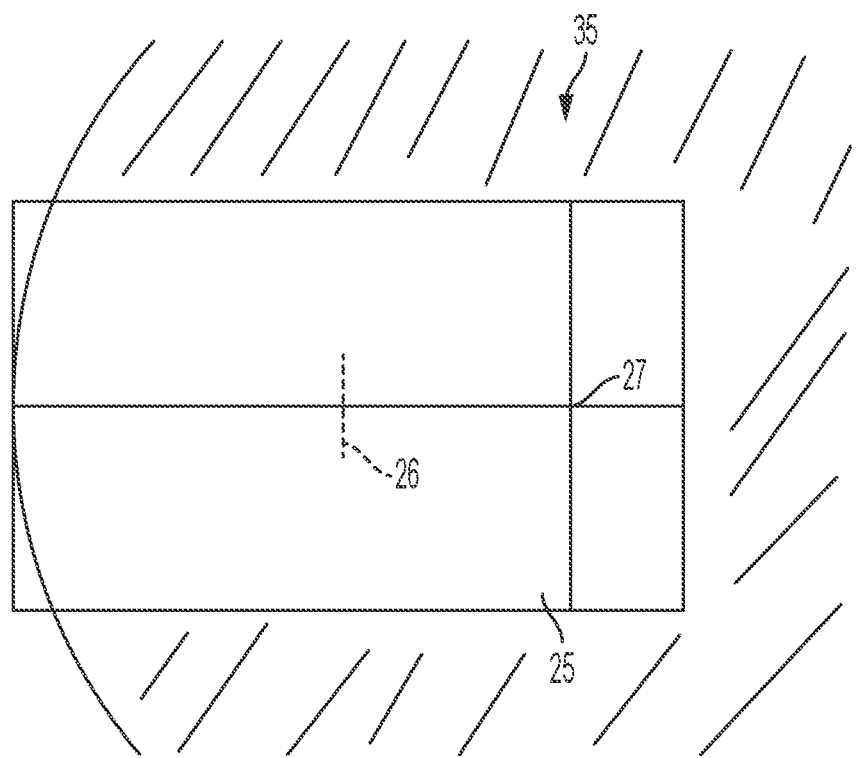
FIG. 15A is a schematic for reducing disturbances due to stray light when using an imager mounted off center to the optical axis of the lens such as shown in FIG. 8B, whereby a stray light mask may be used to cover the area shown.

When using imagers off center the optical axis as suggested above, stray light reduction measures may come into use. These may comprise masking or blackening the unused lens element surfaces or by having diaphragms between neighboring lens elements (see FIG. 15A). These may comprise Mylar foils or bezels. The openings may be designed in such a way that only the light rays which hit the imager can pass therethrough. The bezels may have a half circle or square shape or other suitable shape.

Figure 11A:
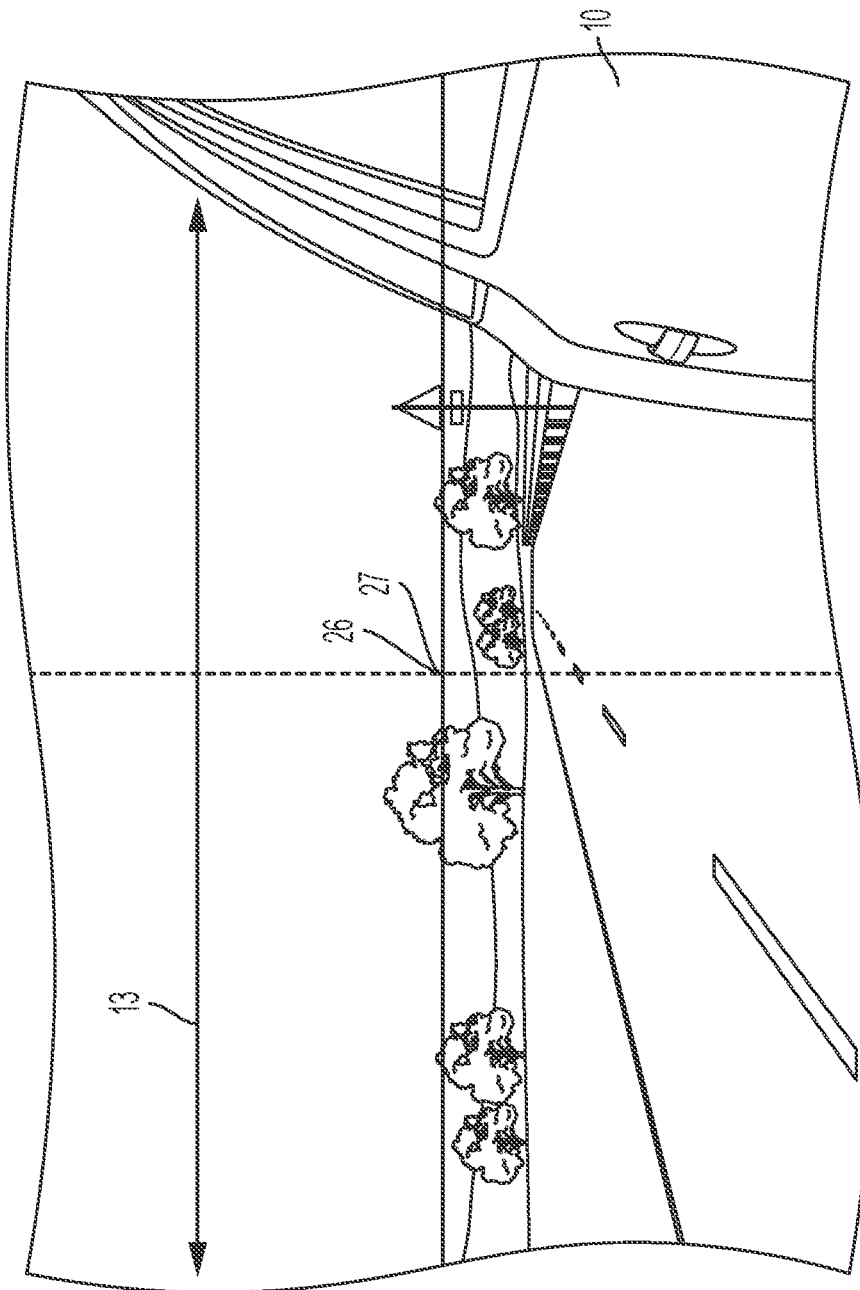
FIG. 11A is a camera image using a low distortion lens 22 with imager and lens on the same axis.
Figure 11B:
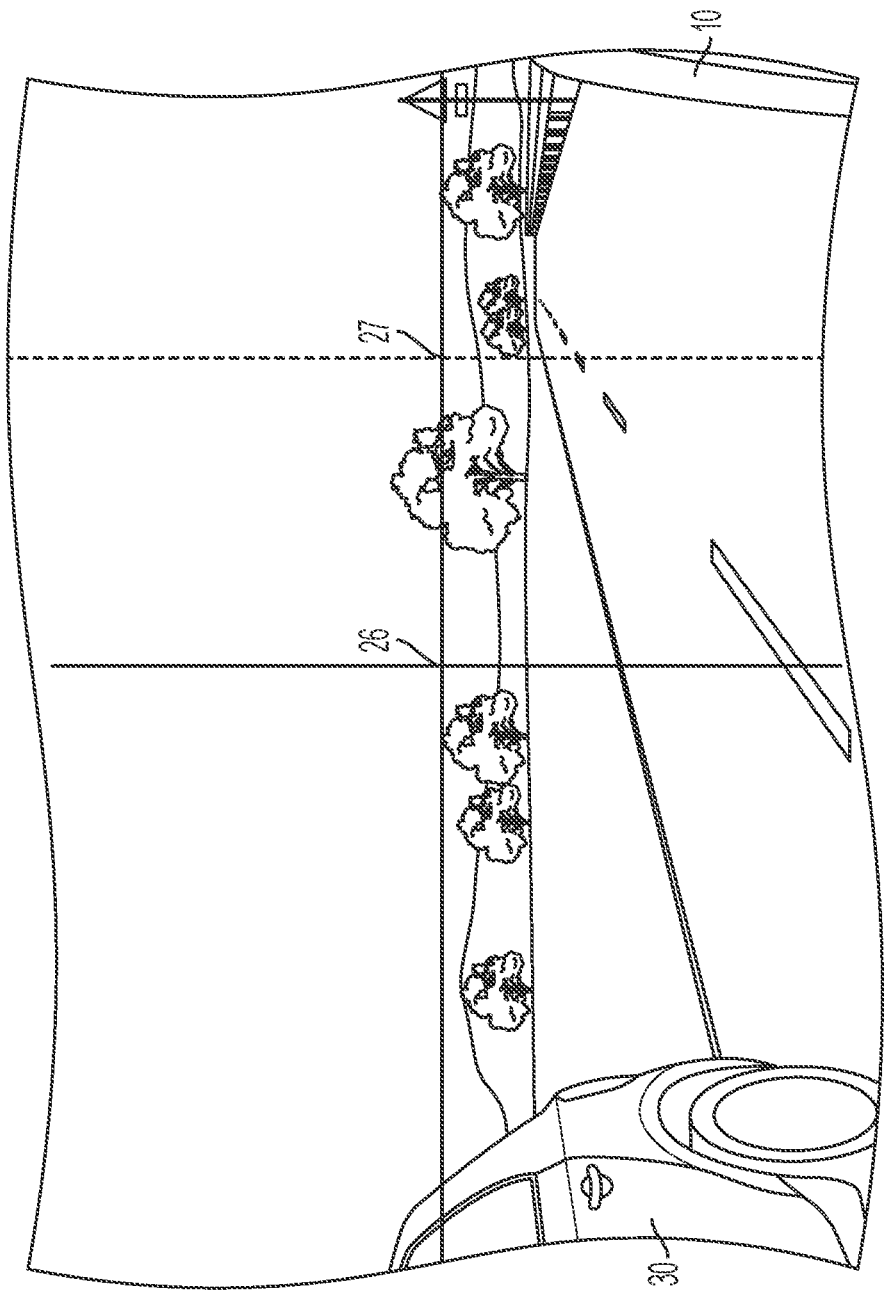
FIG. 11B is a camera image using a low distortion lens 22, with the optical axis of the lens shifted with respect to the center of the imager.
Figure 11C:
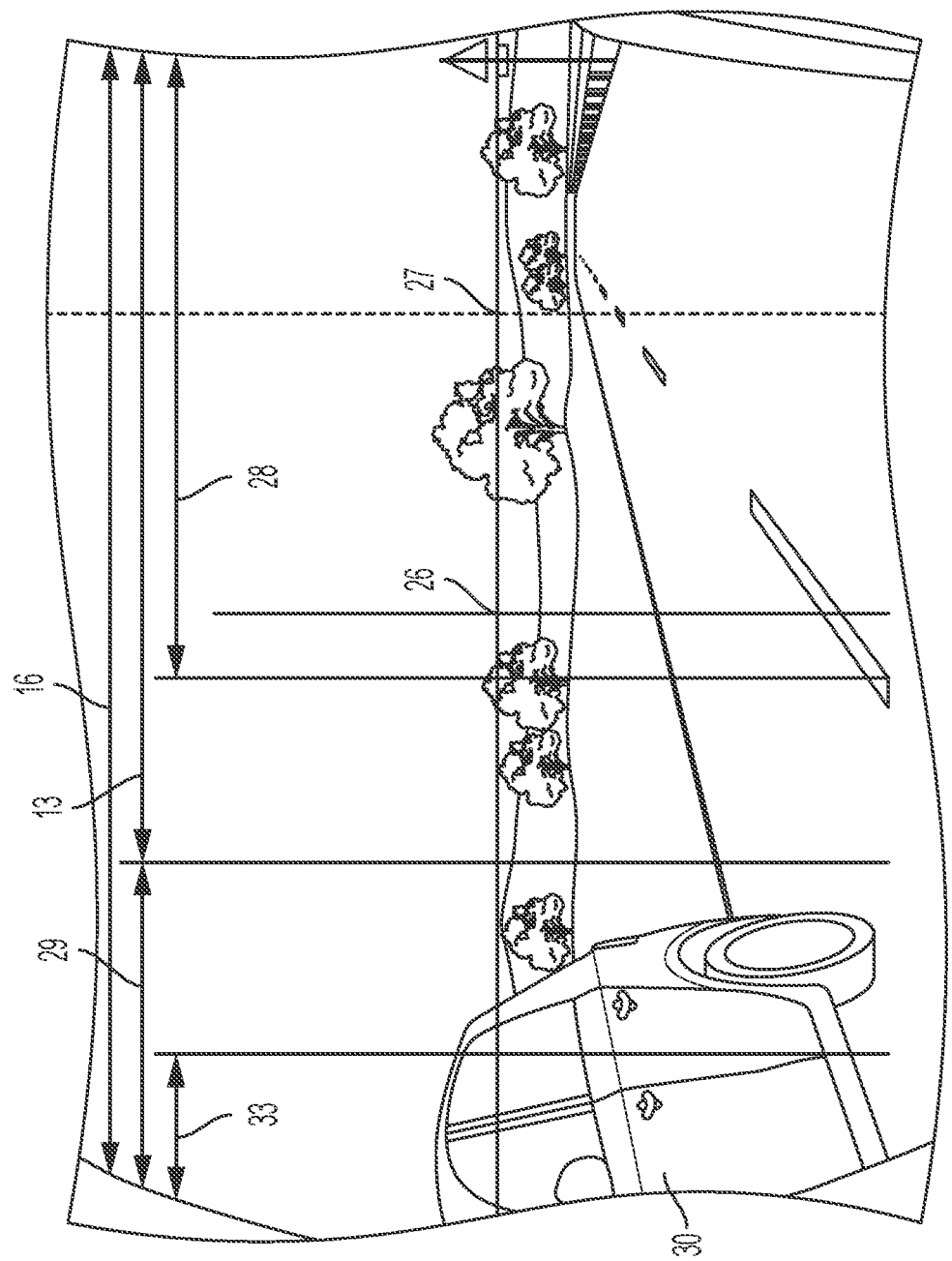
FIG. 11C is a camera image using a high distortion lens 24, with the optical axis 27 of the lens is shifted with respect to the center of the imager 26, and with the lines being curved at the side, and wherein, at the top and bottom edge of the imager, no image information is projected, wherein 33 is the additionally visible viewing portion/angle won by using a high distortion lens (with characteristics as like 24 shown in FIG. 7)
Figure 11D:
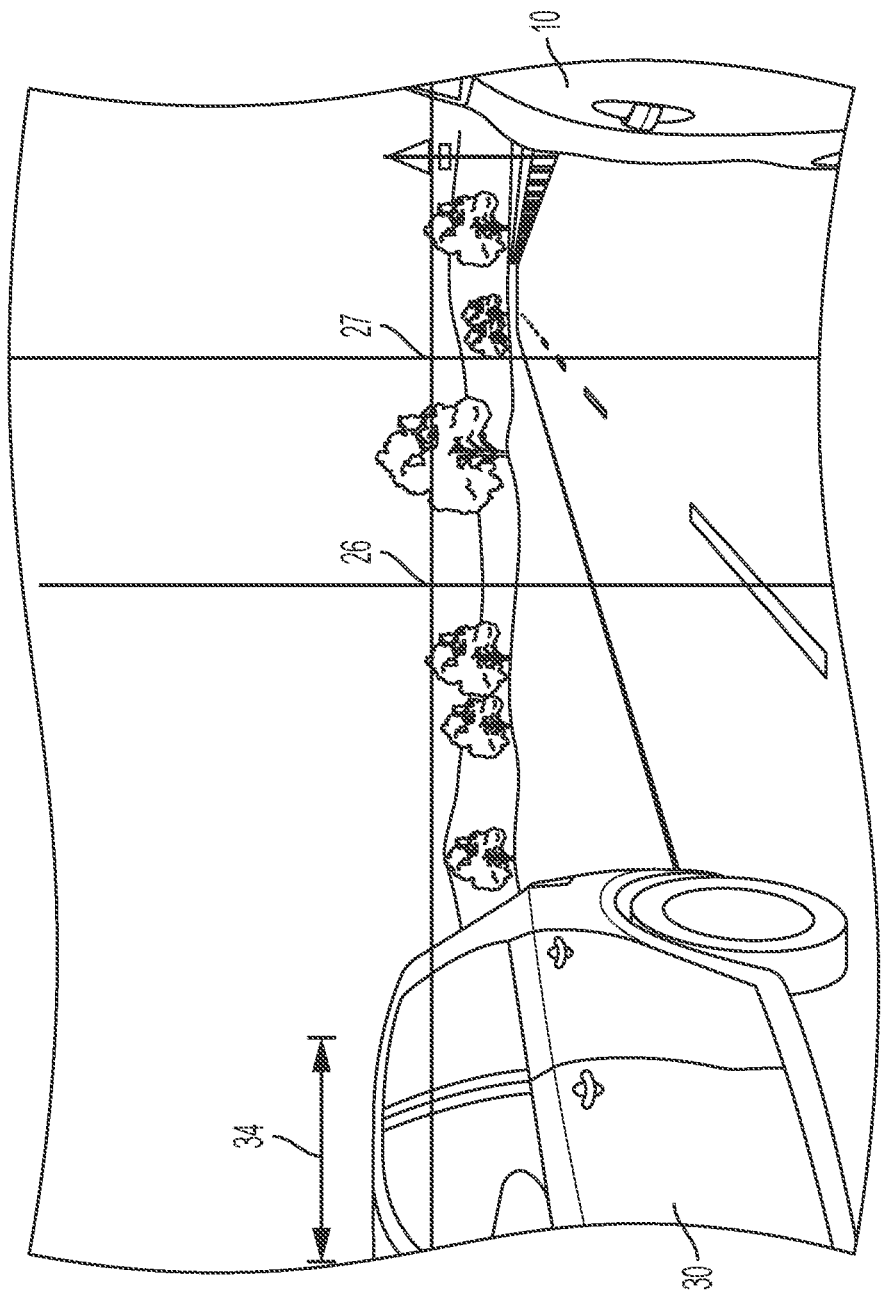
FIG. 11D is a mathematical (real time) distortion correction done with the image of FIG. 11C, in order to get again straight vertical lines, but with a slightly squeezed image, with 34 being the additionally visible viewing portion/angle 33 after applying distortion correction by image processing.

According to the present invention, a view as seen in FIG. 11A or FIG. 11B may be used for normal driving situations. When the driver shifts his or her head to the right, the display may turn to a view as can be seen in FIGS. 11D and 23. Additionally or alternatively, there may be other input devices in place, such as hand gestures, sliders, knobs, touch surfaces and/or the like. The preferred embodiment as input according to the present invention is the head position change or eye gaze control. When using eye gaze detection, the view opening may be triggered when the driver is looking to the far end of the rearview display's side in a similar manner such as described above for the head position change.

Another alternative control may be comprised by controlling virtual reality inputs in combination with hand gesture detection and processing such as like described in U.S. provisional application Ser. No. 61/844,171, filed Jul. 9, 2013, which is hereby incorporated herein by reference in its entirety.

Figure 24:
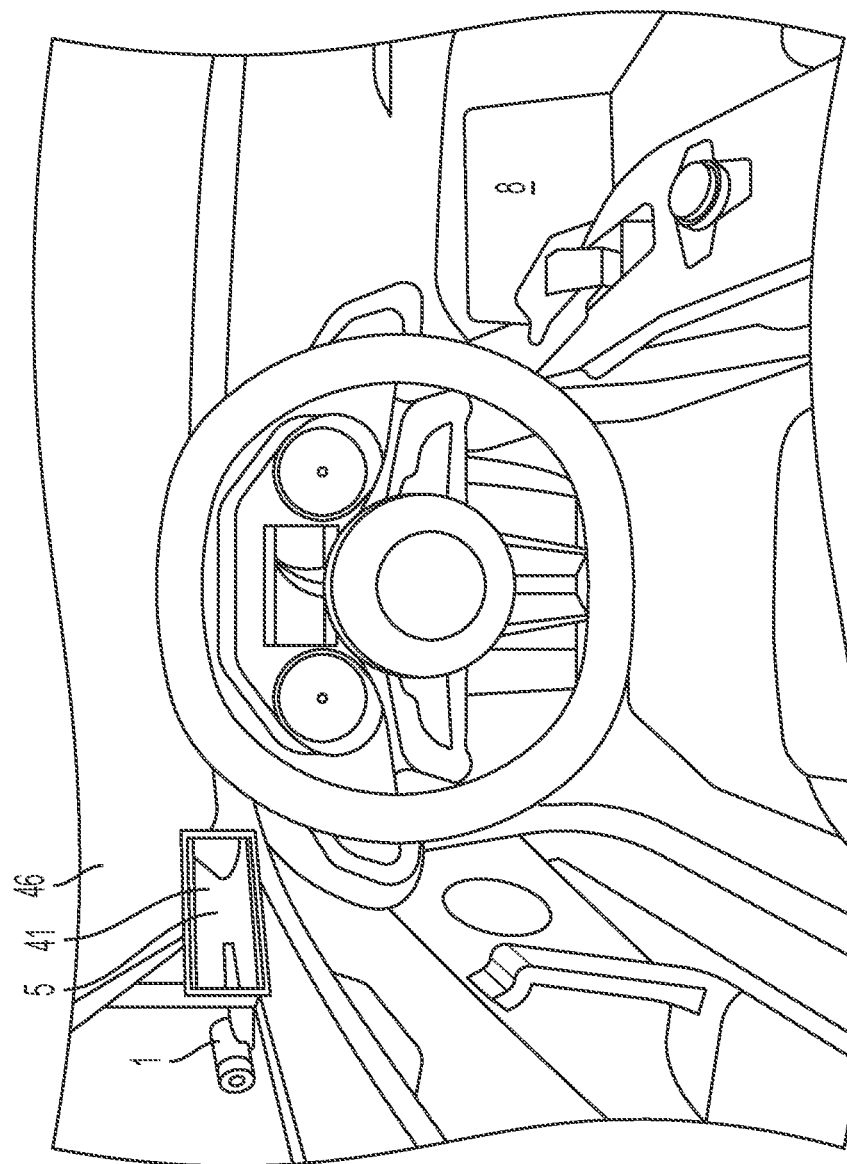
FIG. 24 is view of a vehicle interior, with a display 5 located at an A-pillar of the vehicle, showing the side rear view camera image 41 of a camera 1 in accordance with the present invention.
Figure 25:
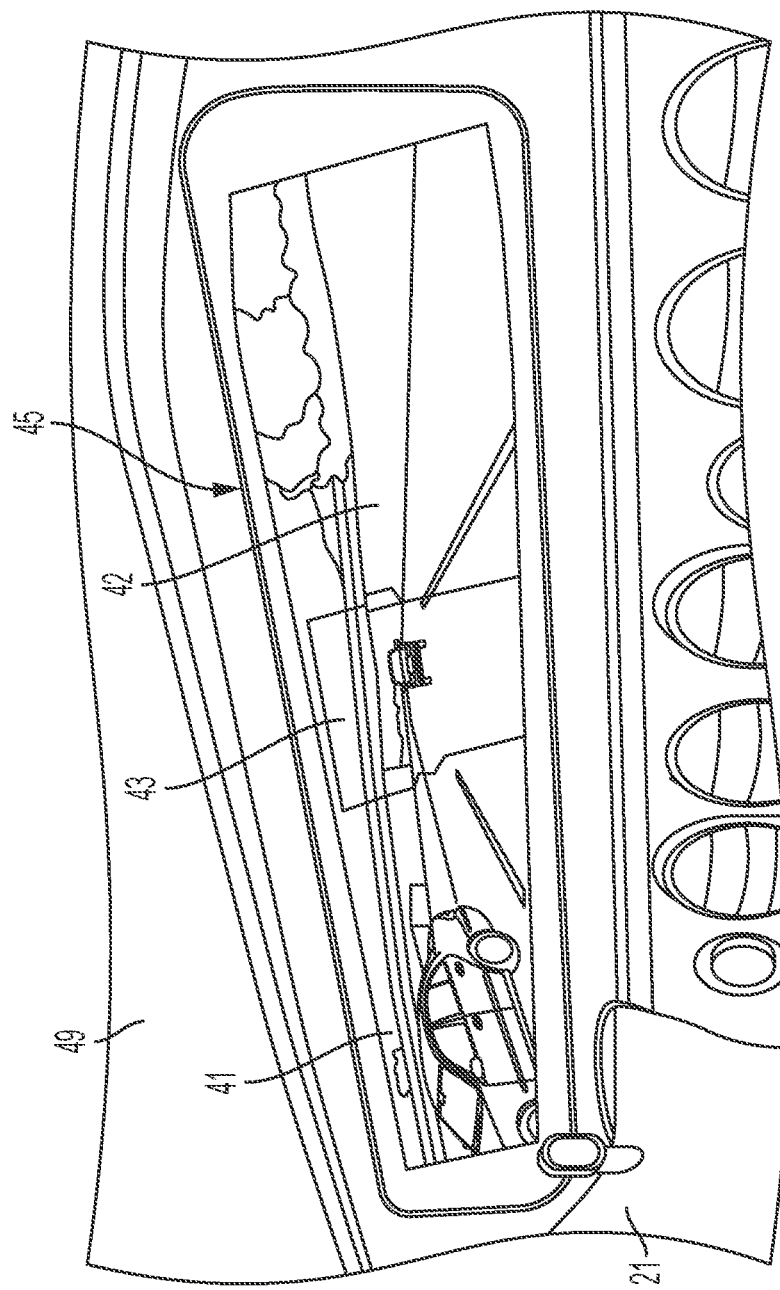
FIG. 25 is a view of a display 45 of the present invention located at the upper region of an instrument panel or dashboard of a vehicle.
Figure 26:
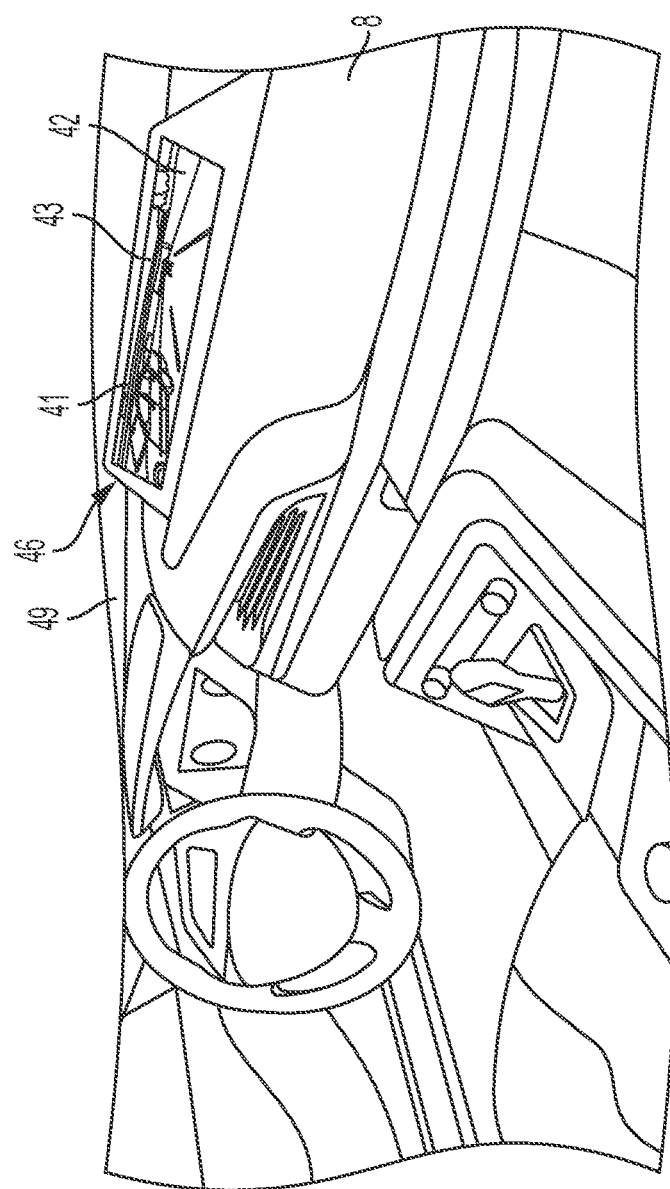
FIG. 26 is a perspective view of a vehicle interior, with a display 46 of the present invention located on top of the dashboard and at a lower region of the windshield.

As an alternative solution, there may be very little or no shifting/altering of the displayed scene necessary (responsive to driver head movement or other input) when it is fitting to a suitable preferably wide display which is preferably in a position that allows the driver to grasp the scene in the CMS in a comfortable and natural way, by that not at an opposite side or such. Suitable positions may be the dashboard. An example of a possible wide screen display integrated into a dashboard is shown in FIG. 25. Known from the ISO 16505 is the A-pillar region (see the example of FIG. 24, and see also International Publication No. WO 2013/067082, which is hereby incorporated herein by reference in its entirety). Due to low space constraints, another suitable location for a display may be on top of the dashboard, such as shown in FIG. 26. Preferably, a cluster display may come into use.

Figure 27:
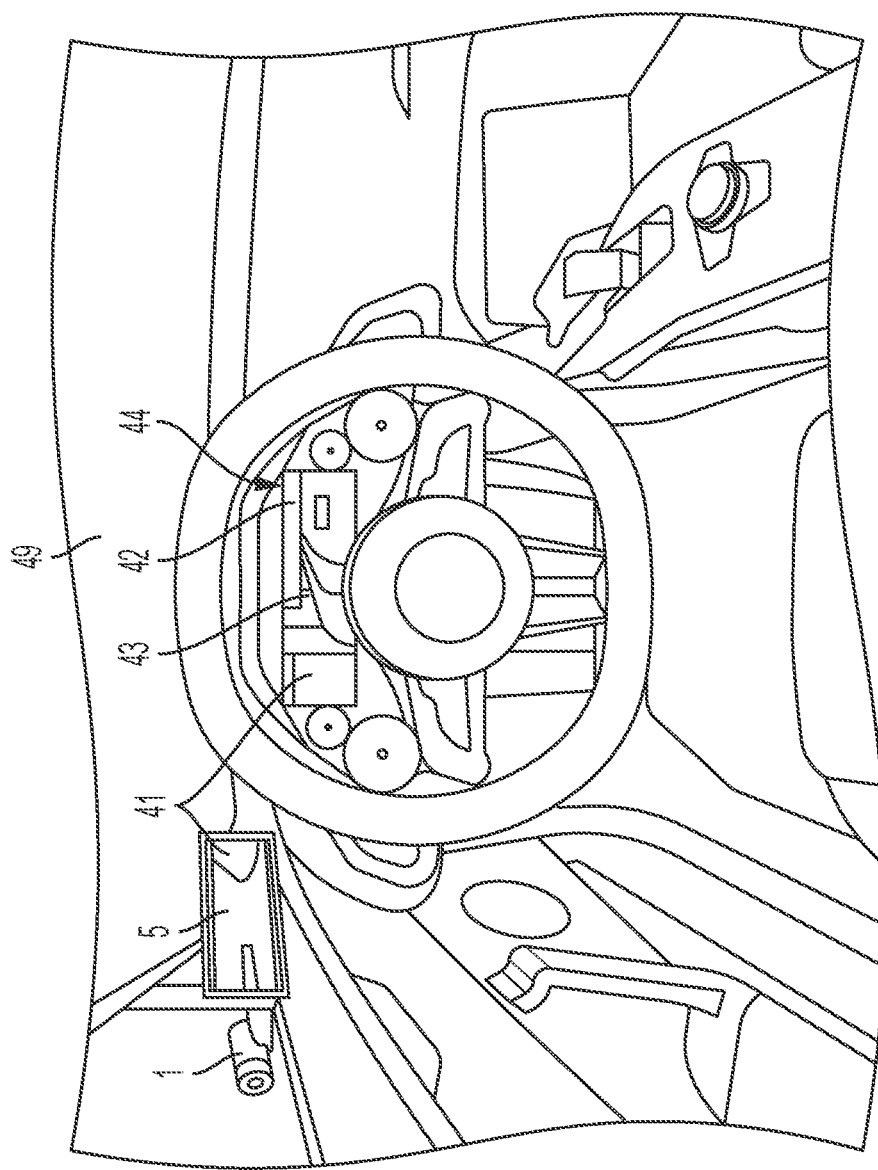
FIG. 27 is a view of a vehicle interior, with a display 44 of the present invention located at the instrument panel of the vehicle, shown with the instruments are at the sides of the display screen, showing a stitched (using a system setup as shown in FIG. 31C using 1, 2 and 50) panorama view and having an A pillar display 5 showing the image 41 of camera 1 alone.
Figure 28:
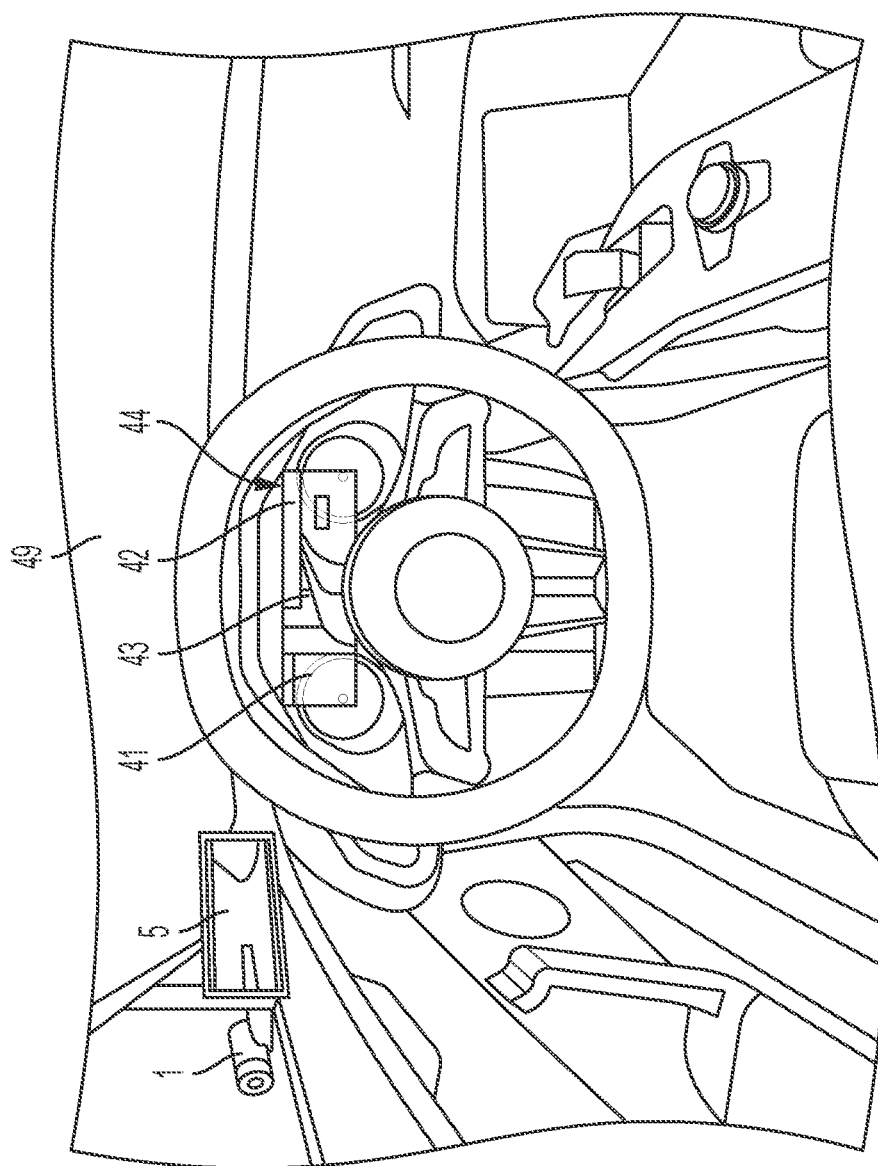
FIG. 28 is a view of a vehicle interior, with a display of the present invention located at the instrument panel of the vehicle, shown with the instruments sharing the space with the display.

Examples of rearview mirror projections in cluster displays in accordance with the present invention are shown in FIGS. 27 and 28. In FIG. 27, the instruments are at the side of the display element. In FIG. 28, the needle instruments share the space with the display. For example, the needles can sweep over the display. The scale may be displayed instead of printed. Optionally, there may be a fully or mostly fully variants of shared display cluster space. The needle instrumentation and lamps may be just animated on the screen. That may be done in a way such as appearing as being real instruments. The illumination density, the glaring, the surface appearance and parallax may be animated virtually by using mapping and shading methods. When using 3D displays as like a MLD® from PUREDEPTH®, the cluster animation is nearly indistinguishable from real instruments. Optionally, the camera images of one camera are shown twice in two different views or display. In the example of FIG. 27, the image 41 of camera 1 is incorporated into the panorama view cluster display 44 providing the left third and secondly shown on the A-pillar display 5.

Figure 29:
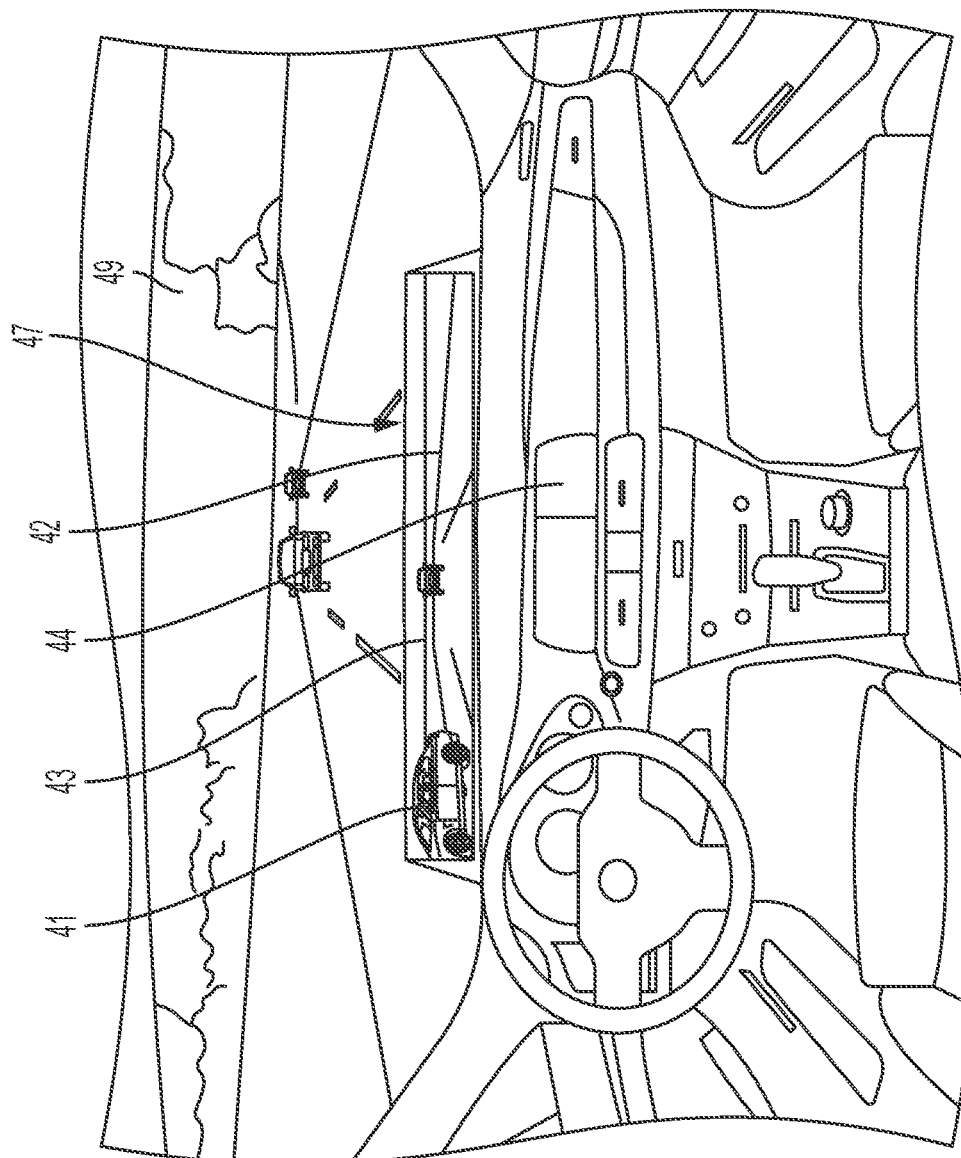
FIG. 29 is a view of a vehicle interior, with a heads up display of the present invention projected at a lower region of the vehicle windshield.
Figure 30:
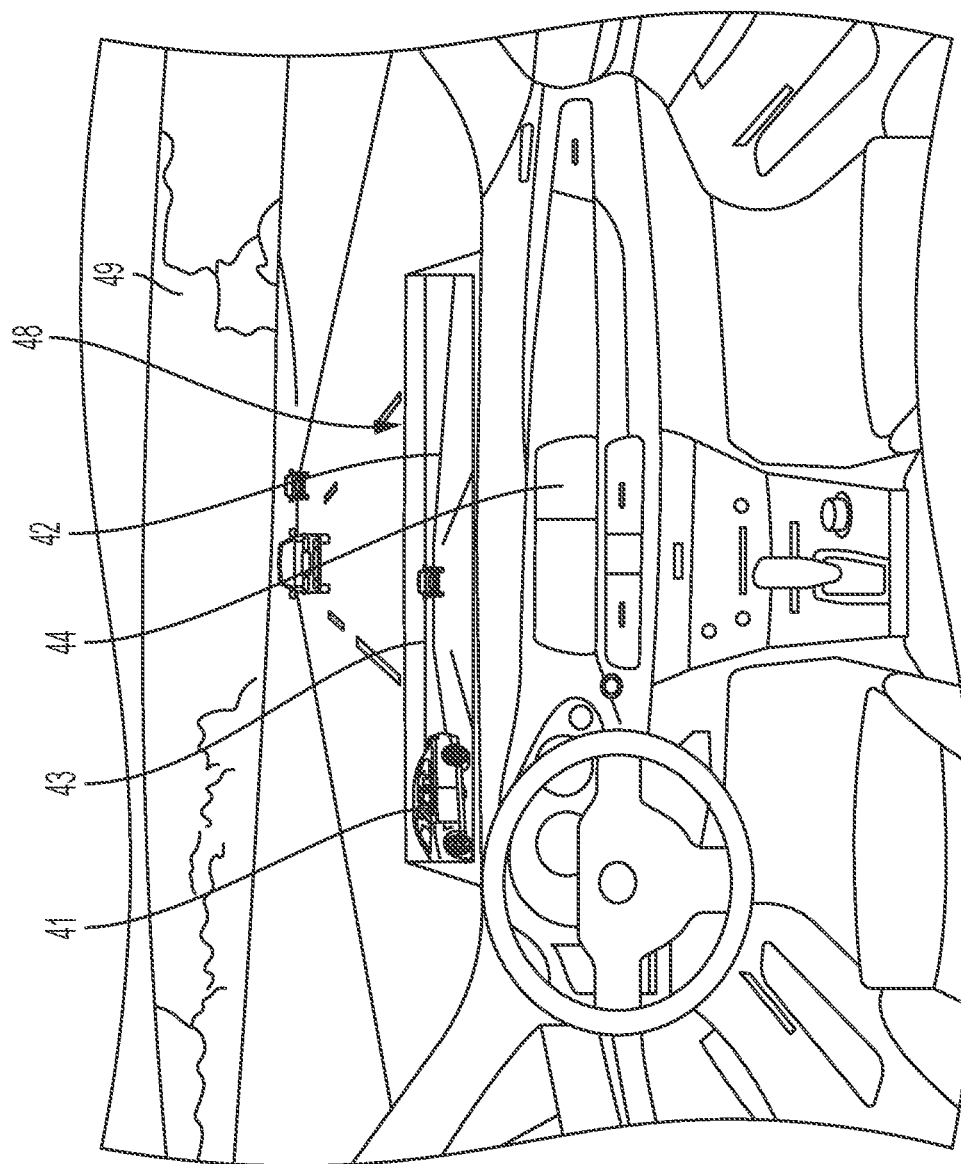
FIG. 30 is a view of a vehicle interior, with a selectively transparent or hidden display of the present invention located at and viewable (when activated) at a lower region of the vehicle windshield.

Cluster displays are naturally comparably wide, by that a side mirror wide field image generated as described above according the invention may fit well. Some cluster displays are curved. The image processing distortion correction may be adapted to the curvature parameters of the display to reproduce an image which allows the driver to estimate distances and speed of other vehicles 30 visible in the CMS correctly. Optionally, and as another suitable spot and new application, the display system of the present invention may project the rear view via a heads up display (HUD) to the lower region of the windshield, such as shown in FIG. 29. In U.S. provisional application Ser. No. 61/941,568, filed Feb. 19, 2014, which is hereby incorporated herein by reference in its entirety, a new type of automotive display is described. The display system described therein possesses the ability to turn into a substantially transparent region or to turn its background to a substantially transparent background or black for providing enhanced contrast for displaying at the foreground visible to the inside of the vehicle. Instead of positioning such a display at the top or upper region of the windshield (such as typical for interior rearview mirrors), such a display may be disposed or located at the lower region of the windshield, such as shown in FIG. 30.

Wherever the display is placed and whichever technology is used and since the display can show anything in any position, optionally a part of other display content, instrumentation or augmentation may fade to colorless or transparent, miniaturize, move away or fully disappear for enabling the displaying of the rear view (camera images) and/or rear view augmentations. Optionally, this may be controlled automatically situational context dependent, or by user control such as speech controlled, gesture controlled, eye gaze controlled or head position controlled or a combination of multiple of these (such as by utilizing aspects of U.S. provisional application Ser. No. 61/941,568, filed Feb. 19, 2014, which is hereby incorporated herein by reference in its entirety. Optionally, an adaption algorithm may adapt to the driver/user preferences or habits, such as by utilizing aspects of the systems described in U.S. provisional application Ser. No. 61/258,710, filed Jul. 9, 2013, which is hereby incorporated herein by reference in its entirety. Optionally, the display content's arrangement may be able to become customized by the user, the OEM, a car dealer, a garage, a supplier or a third party service. This may be possible via on board diagnostics (OBD), or via a smart phone app or via a remote service or communication (such as, for example, wireless LAN or ONSTAR®). The arrangement may underlay local law restrictions. The display arrangement may be adapted automatically to the local or regional requirements (such as via maps and GPS).

Figure 34:
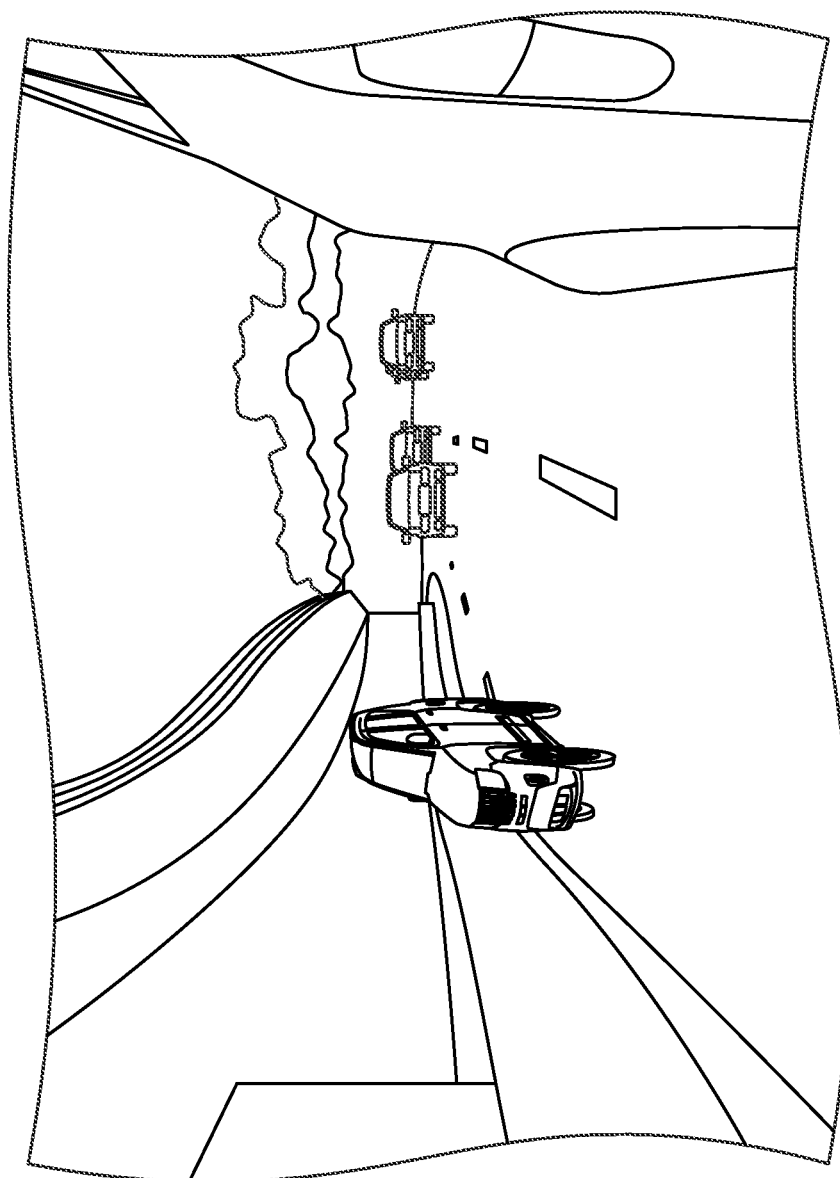
FIG. 34 is an image captured by a left side CMS camera in a mode with legal mirror area and a compressed blind spot area, with a transition region between the two areas similar to the regions shown in FIG. 22, and in the shown scene the subject vehicle is entering a three driving lane, one acceleration lane Autobahn with a vehicle on the fastest lane A, a vehicle on the second fast lane or middle lane B and the first lane being unoccupied.
Figure 35:
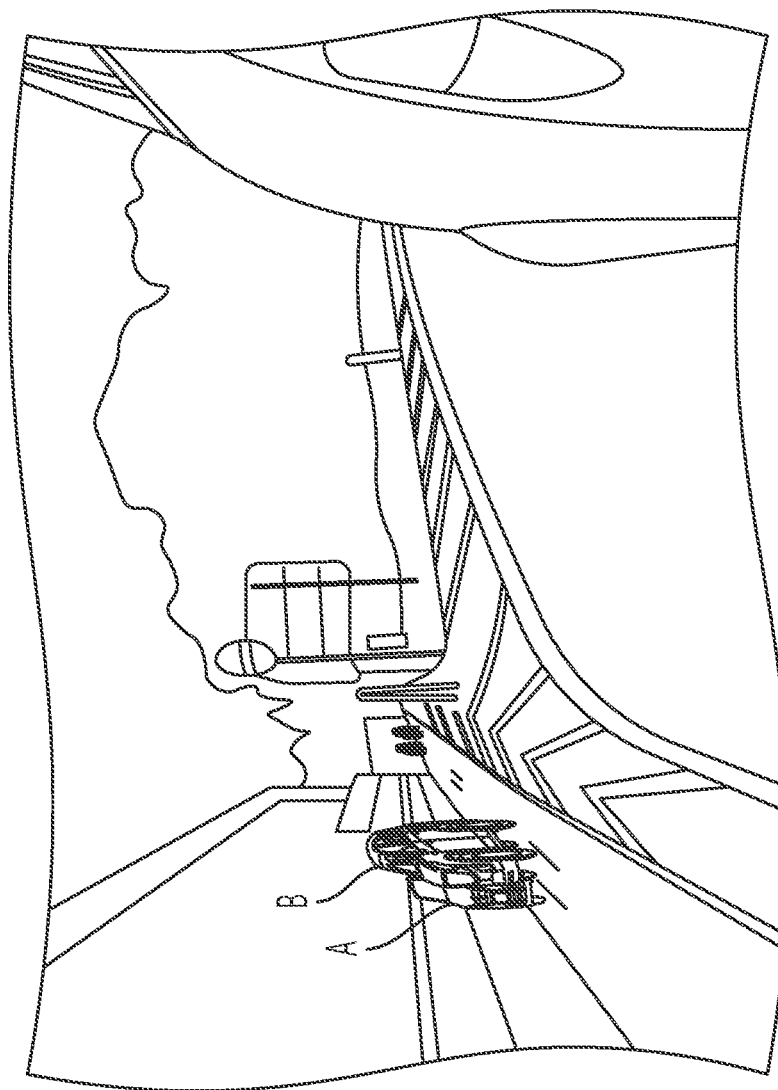
FIGS. 35-37 are additional images captured by the left side CMS camera.

Optionally, and with reference to FIGS. 19-23, a display may provide both a blind spot area and legally required area view for providing a compromise on wide angle viewing for blind spot viewing/monitoring, and being close up enough in the legal normal view of at least about 50 degrees viewing angle or area. The display provides a smooth transition between the normal viewing area and the blind spot area. As can be seen with reference to FIGS. 22, 34 and 35, the viewing angles for different regions in the captured images is determined and the blind spot area is compressed and the principal viewing area is less compressed, and the regions between the two areas or transitionally or gradually compressed to provide a generally smooth transition between the uncompressed images and the compressed blind spot area images. Such a view may be desired for reduced size or smaller displays while providing more than the legally required minimum field of view (at least about 50 degree view). By that, this view is similar as if looking into a vehicle side view mirror with normal 11 aspherical mirror portion 19 as shown in FIG. 10. In the scene of FIG. 35, the benefit of a CMS becomes clear. Both the vehicle on the third lane "A" as well as the vehicle on the second lane "B" is visible. The first lane is free to be entered. The resolution is on the lower borderline acceptable to conceive the approaching cars from a distance (using a 1.5 MP sensor in the example of FIGS. 33A to 37). These would not be when using a normal required view. Though the highly distorted far end region to be seen in FIGS. 22, 34 and 35, distances are hard to determine and straight lines do an unnatural bending.

Figure 36:
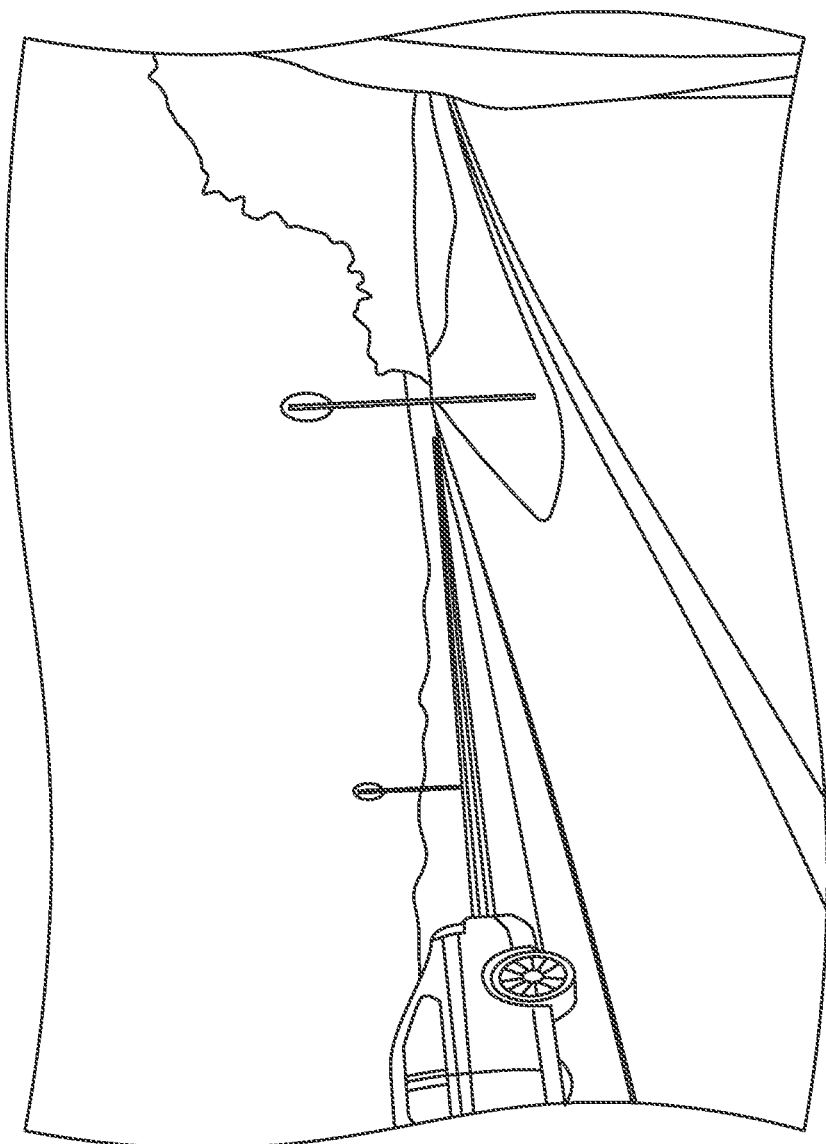
Figure 37:
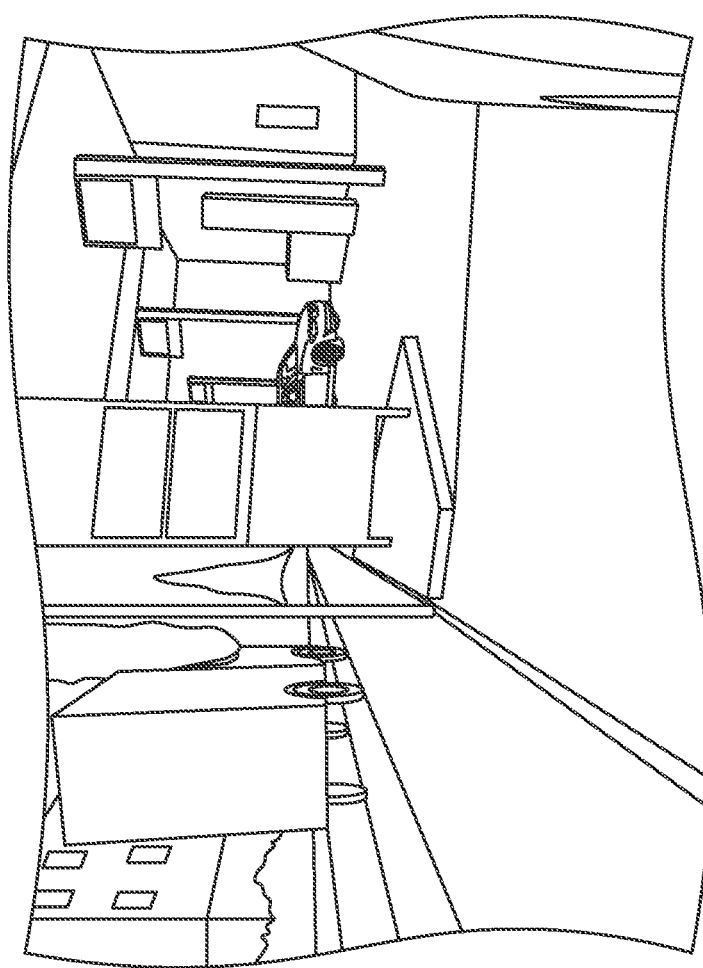

Since there is a higher lateral display space demand when displaying views in which also the blind spot area 17 is shown in a desqueezed or uncompressed manner and the legally required area still in an required size and resolution displays which may be wider than 4:3, 8 inches but 16:9 and larger are to be used. The undistorted images are not just more pleasing for the eye but also allow the driver to grasp the size and distance ratios of the displayed road scenes appear more intuitionally correct, see FIGS. 11D, 23, 33A, 33C, 36 and 37. Especially when the car is entering a road at an angle such as shown in FIGS. 35 36 and 37, the CMS is beneficial and much superior to a radar based blind spot warning or alert system, since it's more informative and natural to grasp for the driver than just getting a warning icon displayed. Optionally, both systems may include an audible alert and may additionally sound a beep.

As another aspect of the present invention, the camera CMS vision processing may provide dynamically and statically overlays within the view for aiding the driver. Preferably, the properties of these overlays may stay within the requirements of ISO 16505. There may be an overlay for indicating the own vehicle's (10) rear end extension within the CMS view. By that the driver may be able to estimate better whether there is space for changing the lane or such. Optionally, the 'rear end indicator' may be adaptable, or there may be a second one, when the own vehicle pulls a trailer. The adaption may happen by driver input or automatically when hooking on a trailer (such as may utilize aspects of the systems described in U.S. Pat. No. 7,005,974, and/or U.S. patent application Ser. No. 13/979,871, filed Jul. 16, 2013, now U.S. Pat. No. 9,085,261, and/or Ser. No. 14/036,723, filed Sep. 25, 2013, now U.S. Pat. No. 9,446, 713, and/or Ser. No. 14/102,981, filed Dec. 11, 2013, now U.S. Pat. No. 9,558,409, and/or U.S. provisional application Ser. No. 61/840,542, filed Jun. 28, 2013, and/or International Publication No. WO 2012/103193, which are all hereby incorporated herein by reference in their entireties. Other static overlays may be distance markers for estimating the distance of closing vehicles within the CMS view.

As another aspect of the present invention, the camera vision system may employ an algorithm to detect distances and speed of foreign objects within the CMS view and beyond. Since a mono camera is in use, these may employ or may be based on back projection, structure from motion plausible size comparison and/or image segmentation/clustering methods (such as described in U.S. provisional application Ser. No. 61/935,055, filed Aug. 12, 2013, which is hereby incorporated herein by reference in its entirety). The system may employ a kind of world reconstruction. The input may be video images of the CMS camera itself. Additionally, video images of other vehicle inherent cameras or sensors may be input as well, as well as like depths detection sensors as like RADAR, LIDAR, TOF (Laser, Flash), structured light (Laser, Flash) and ultrasound. There may be additional video or property input sources transmitted by a car2car communication, a car to x communication (in U.S. patent application Ser. No. 13/660,306, filed Oct. 25, 2012, now U.S. Pat. No. 9,146,898, which is hereby incorporated herein by reference in its entirety, the employment of a vehicle online road context server is suggested, for example, for early road debris warning and collision avoidance planning) or by a trailer inherent system as like a trailer camera, such as by utilizing aspects of the systems described in U.S. patent application Ser. No. 14/102,981, filed Dec. 11, 2013, now U.S. Pat. No. 9,558,409, and/or Ser. No. 14/036, 723, filed Sep. 25, 2013, now U.S. Pat. No. 9,446,713, which are hereby incorporated herein by reference in their entireties.

Figure 12A:
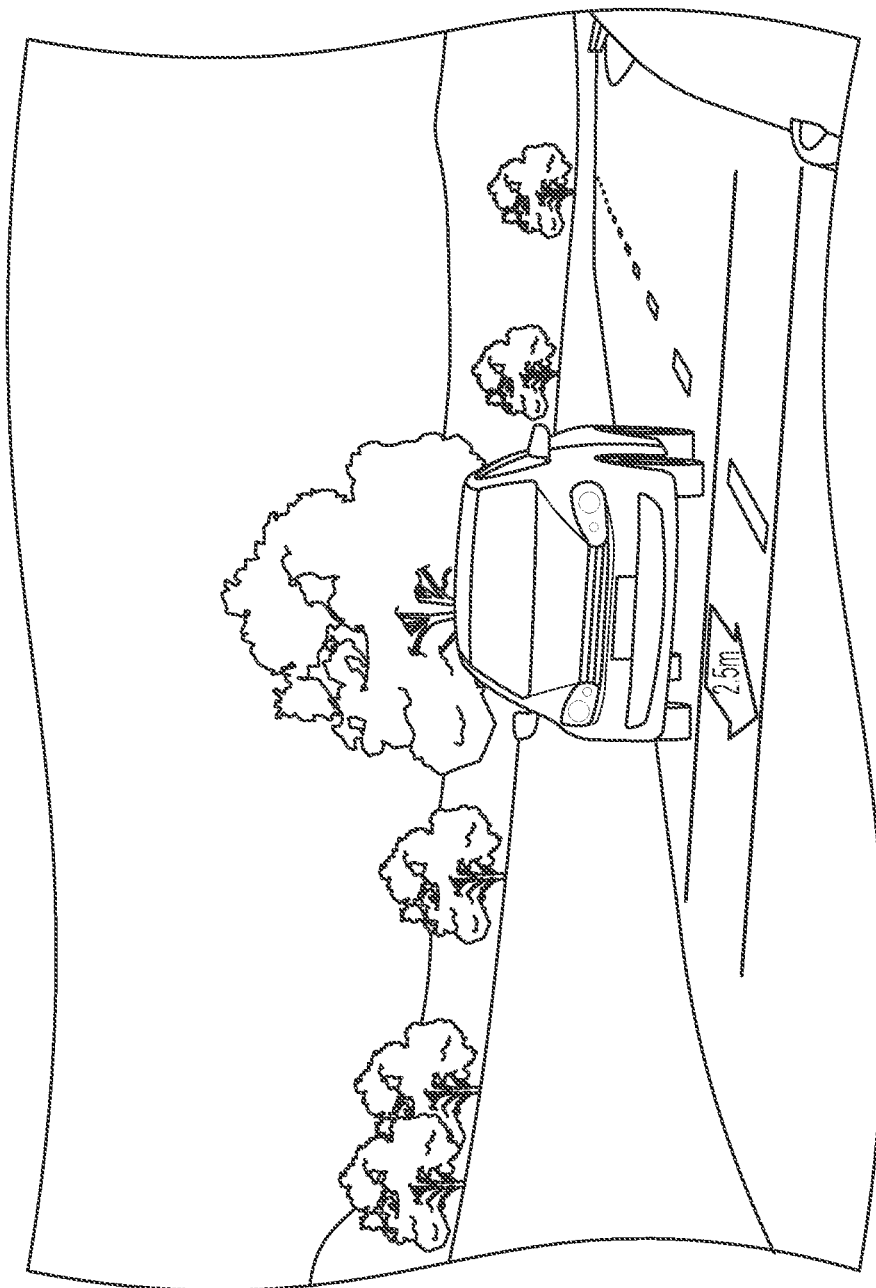
FIG. 12A is a camera image on an in cabin display having an additional (dynamic) overlay which informs about the remaining lateral distance from the own vehicle's rear to a vehicle closing on another lane.
Figure 12B:
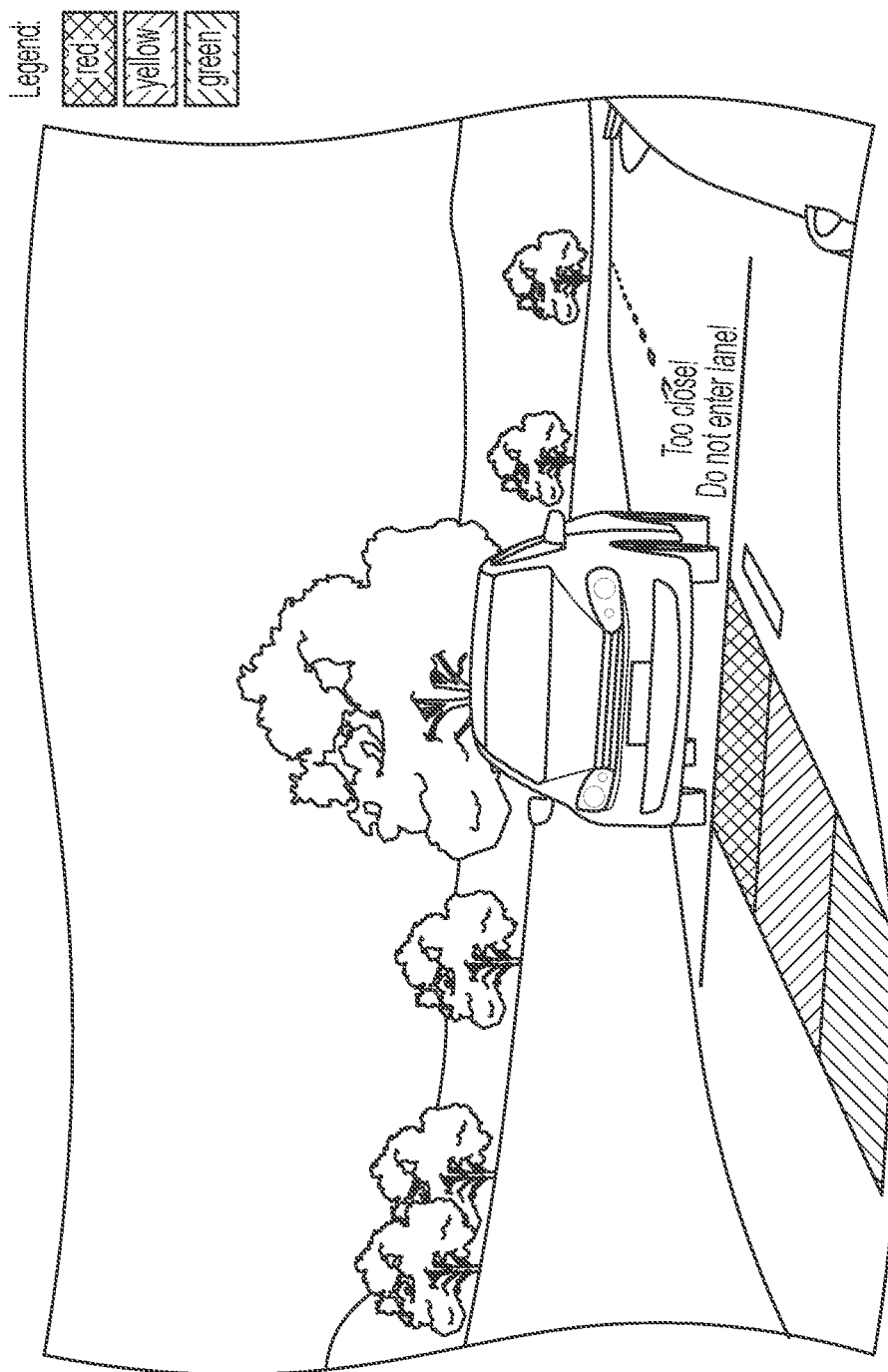
FIG. 12B is a camera image on an in cabin display having an additional (dynamic) overlay which visualizes about the remaining lateral distance from the own vehicle's rear to a vehicle closing on another lane by blocks virtually established at the road's (normal) surface, shown with the blocks being colored such as red (closer), yellow and green (more distant)

The system may employ classification models for world reconstruction and classification models for classifying the foreign objects and lane markings. The system may employ models to presume the other traffic participants' behavior and to generate conflict or collision avoidance strategies (concerning detected objects and road obstacles) as like using an influence mapping model such as described in U.S. patent application Ser. No. 14/016,790, filed Sep. 3, 2013, now U.S. Pat. No. 9,761,142, which is hereby incorporated herein by reference in its entirety. In case the foreign objects are classified as other traffic participants (depart from the street and environment) and additional inherent properties, the image vision system may provide aiding overlays dedicated and responsive to the objects properties within the CMS view. For example, the foreign objects speed may come into use (as an objects property). The system may provide a dynamic overlay for helping the driver to grasp its speed in a glance. There may be an augmented two dimensional (2D) or three dimensional (3D) bar or bars or arrow or arrows projected, overlayed or mapped into or onto the display of the ground in front of the closing object which may be classified as a foreign vehicle, such as shown in FIG. 12A. The distance of the bar(s) to its foreign vehicle or length of the arrow(s) may be adjusted or determined responsive to its relative speed (relative to the ego motion or speed of the subject vehicle) and by that may visualize the remaining time until arriving or hitting the subject vehicle location (distance divided by speed), such as shown in FIG. 12B. By that the driver may be aware he or she cannot enter a lane at which a foreign vehicle is closing when seeing the bar or arrow is already at the height of the own vehicle or even further. To enhance the aiding function, there may be also (or alternatively just only) a text or message or icon displayed that advises the driver as to whether or not it is safe to change lane(s). Optionally, the system may provide similar aid for safely entering a road or stump angle intersection or passing a cyclist lane.

Optionally, and additionally, the system may supervise more than one lane at a side of the vehicle, and may assist the driver or inform the driver as to whether or not a vehicle is in that lane and approaching the vehicle or sideward of the vehicle.

Figure 16:
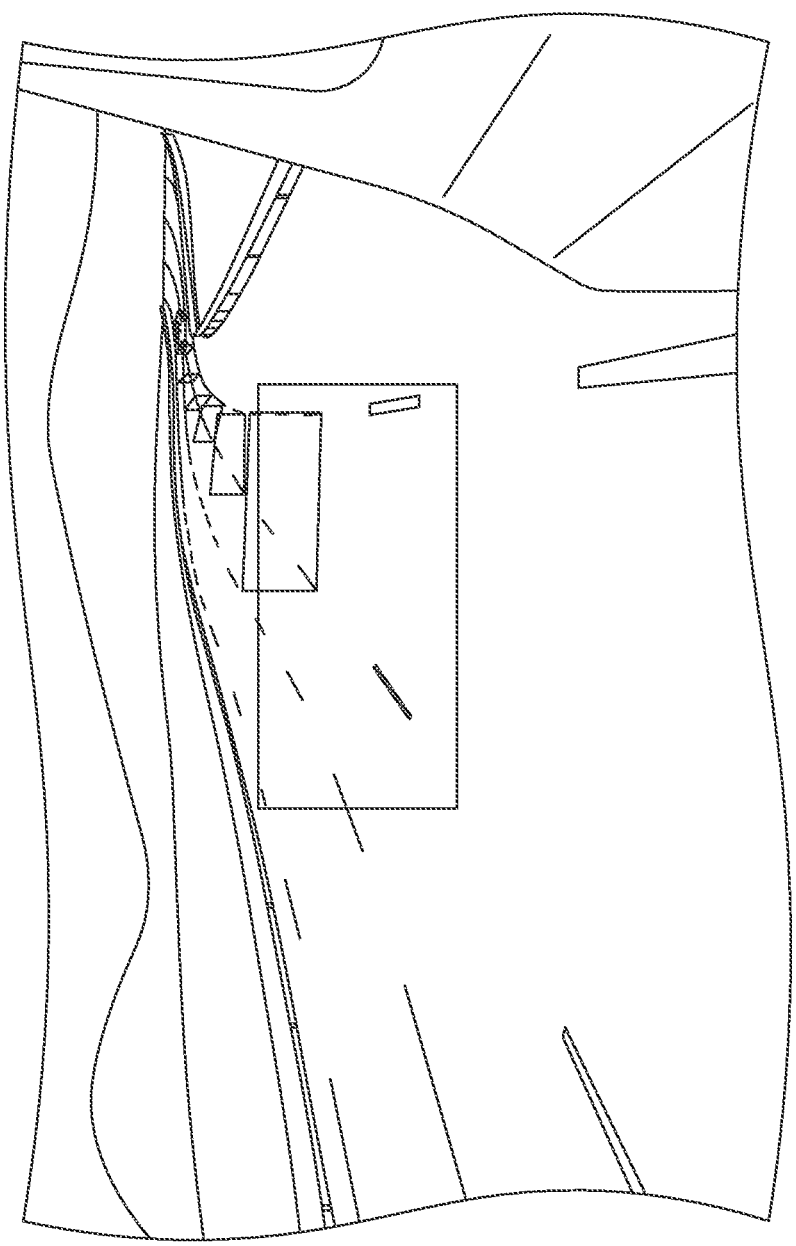
FIGS. 16-18 are perspective views of a four lane highway situation showing overlays (which may be colored, such as with a lighter gray being greenish, while a step darker gray may be yellowish and the darkest gray may be reddish) which follow the 3D topography of the neighbored lane or lanes in a view such as shown in a rearview side mirror replacement camera display in accordance with the present invention.
Figure 17:
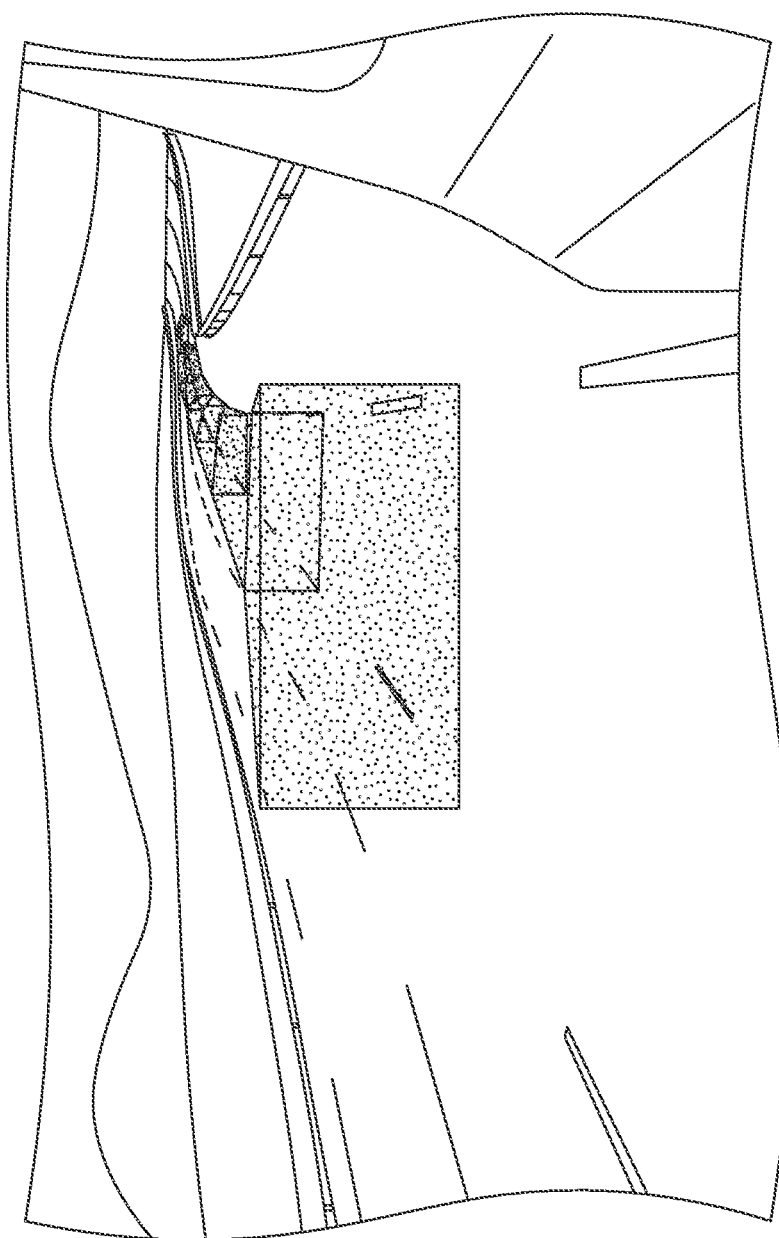
Figure 18:
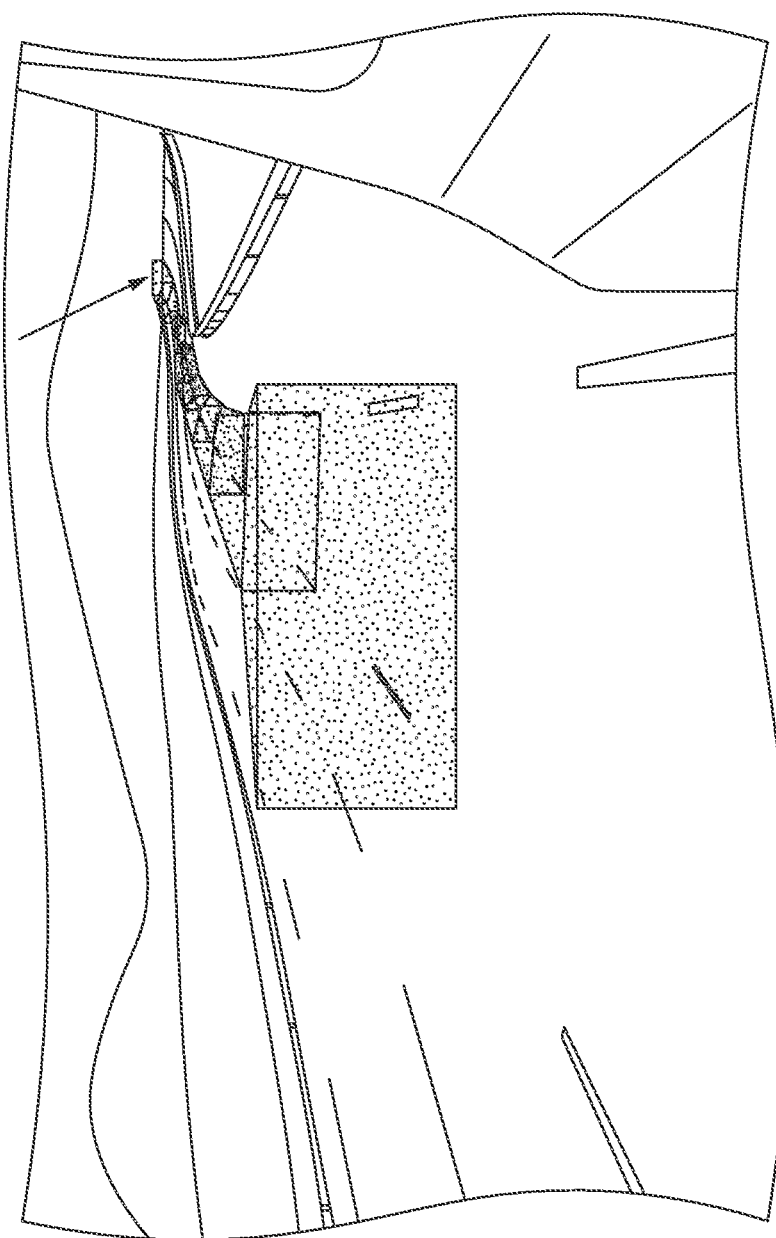
Figure 19:
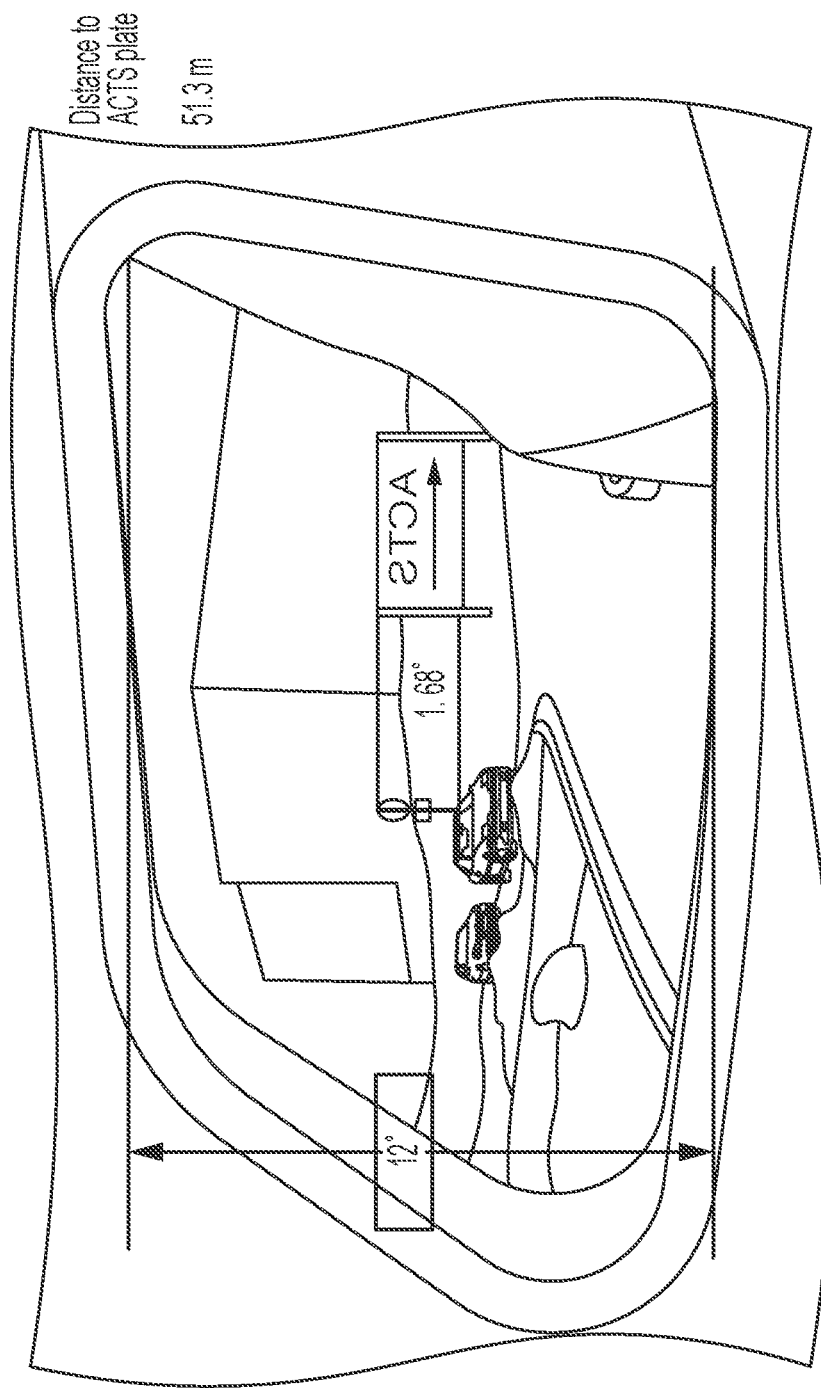
FIG. 19 is a perspective view of an exterior rearview mirror viewing a scene rearward of the vehicle.

Referring now to FIGS. 16-18, perspective views are shown of a four lane highway situation with overlays (which may be colored, such as with a lighter gray being greenish, while a step darker gray may be yellowish and the darkest gray may be reddish) provided in a displayed view such as shown in a rearview side mirror replacement camera display in accordance with the present invention. As shown in FIG. 16, a prospective driving tunnel is provided that follows the topography of the ground of an according lane (the $2^{nd}$) in which a vehicle is driving at (and behind the camera-equipped vehicle). The tunnel or overlay is indicated by a plurality of augmented frames (which may be gray or colored). The same situation is shown in FIG. 17, with the addition that the space segments in between the drive tunnel indicating frames or overlays are semi transparently filled with a signaling color or colors that is/are indicative of the relative closing speed of the rearward vehicle to the equipped vehicle. FIG. 18 shows the same situation as like FIG. 17, with the addition that there are more augmented (first) driving tunnel frames and semi-transparent space segments of an additional vehicle behind and in the $4^{th}$ lane which is approaching the equipped vehicle to pass but is still hidden by the hill in the background.

The overlays may have different colors or may change color or blink or may alter in transparency or in brightness or may be animated such as by torsion, wobbling, vibrating or jumping (such as in a manner as like jelly or the like), such as responsive to the distance to the equipped vehicle's rear, the approaching speed to the equipped vehicle, the possibility or likelihood or hazard of colliding or possible damage threatening to the equipped vehicle or objects as the objects approach the equipped vehicle (or as the equipped vehicle may close to the objects) or the remaining (eventually estimated, by the trajectory in past) time until closing to an object.

Optionally, and in accordance with the present invention, FIG. 16 visualizes that the arrangement of the overlays may reflect the three dimensional topography of a scene, such as by utilizing aspects of the systems described in U.S. patent application Ser. No. 14/191,512, filed Feb. 27, 2014, now U.S. Pat. No. 10,179,543, which are hereby incorporated herein by reference in their entireties. FIGS. 16-18 show perspective views of a freeway situation such as like displayed in a rearview mirror replacement camera display and may be used for visualizing the projected path of a vehicle driving behind the equipped or subject vehicle but in another lane. Thus, due to the overlayed/augmented frames (which may have different highlighting as described above) that follow the prospective projected lane of the following car in a kind of driving tunnel, the equipped vehicle's driver may be able to readily capture at which specific lane the following vehicle is approaching and due to the augmented frames distances may correspond to identical time frames he or she may be able to readily grasp the time until closing or the relative closing speed. In FIG. 17, the space segments between the frames are semi transparently filled with a signaling color for better perception (such as red for closer distances, yellow for intermediate distances and green for further distances rearward of the equipped vehicle). As like in FIG. 12B, further distance, lower relative closing speed or more time until closing may by indicated in less alarming colors than smaller distance, higher relative closing speed or less time until closing. By that, the most distant space segment's colors may be greenish, closer yellowish and the closest may be reddish.

The low latency and correct (detection and) mapping of the scene's structure and the other vehicle's actual position may be helpful to position the augmented overlays correctly. As discussed above, other traffic participants' status, positions, directions and/or speed information may be received by the subject vision processing and driver assistant system of the present invention, such as via any suitable communication system or link or the like. FIG. 18 shows the same situation as like FIG. 17, with the addition that there are additional augmented driving tunnel frames (as indicated by the arrow in FIG. 18) and semi-transparent space segments of an additional vehicle in behind on another lane (such as a third or fourth lane over), which is about to pass but is still hidden by a hill in the background. The other vehicle's position (hidden) may be determined or communicated to the system of the equipped vehicle via a communication from one or more other vehicle or a remote transmitter along the road or highway or the like. The highways lane map may come from a local memory or navigation system or may be received via remote communication. Additionally or alternatively, the subject vehicle's own driving path, especially its steering angle and speed, may be used in order to calculate the trajectory of other (following) vehicles in relation to the lane the subject vehicle traveled along to dedicated neighboring lanes. This may be implemented in conjunction with other (offline or from remote) maps or for calibrating on such maps or the like. When the system is equipped with a rear collision warning and avoidance system, such as described in U.S. patent application Ser. No. 14/248,602, filed Apr. 9, 2014, now U.S. Pat. No. 9,327,693, which is hereby incorporated herein by reference in its entirety, and/or a car2car communication or car-to-road context server application and collision avoidance planning as discussed above, the currently selected evasive driving tunnels of the vehicles around the subject vehicle which may come into potential conflict may be shown as well for providing the driver the best way out of the hazardous condition.

As another aspect of the present invention, a higher sophisticated system may be able to adapt the distance of the bar to its foreign vehicle or length of the arrow not only responsive to the speed but also to the driver's driving style, the driver's attention and condition (as like tiring condition), situational condition (as like whether condition) and vehicle inherent conditions. For example, when the vehicle is driven in rainy or wet conditions, the braking path of an incoming foreign vehicle may be extended in comparison to dry conditions. This applies also for the own or subject vehicle. Also, the "safety distance" may to be increased when the driver is tired. Some drivers with a comparably smooth driving style may like to be aided more conservatively, while comparably sportive or aggressive drivers may like being aided closer at higher thresholds (less safe). The driver's attention and condition may be detected by a head tracking system with self-improving adaption/learning algorithm, such as described in U.S. provisional application Ser. No. 61/845,061, filed Jul. 11, 2013, which is hereby incorporated herein by reference in its entirety.

Figure 31A:
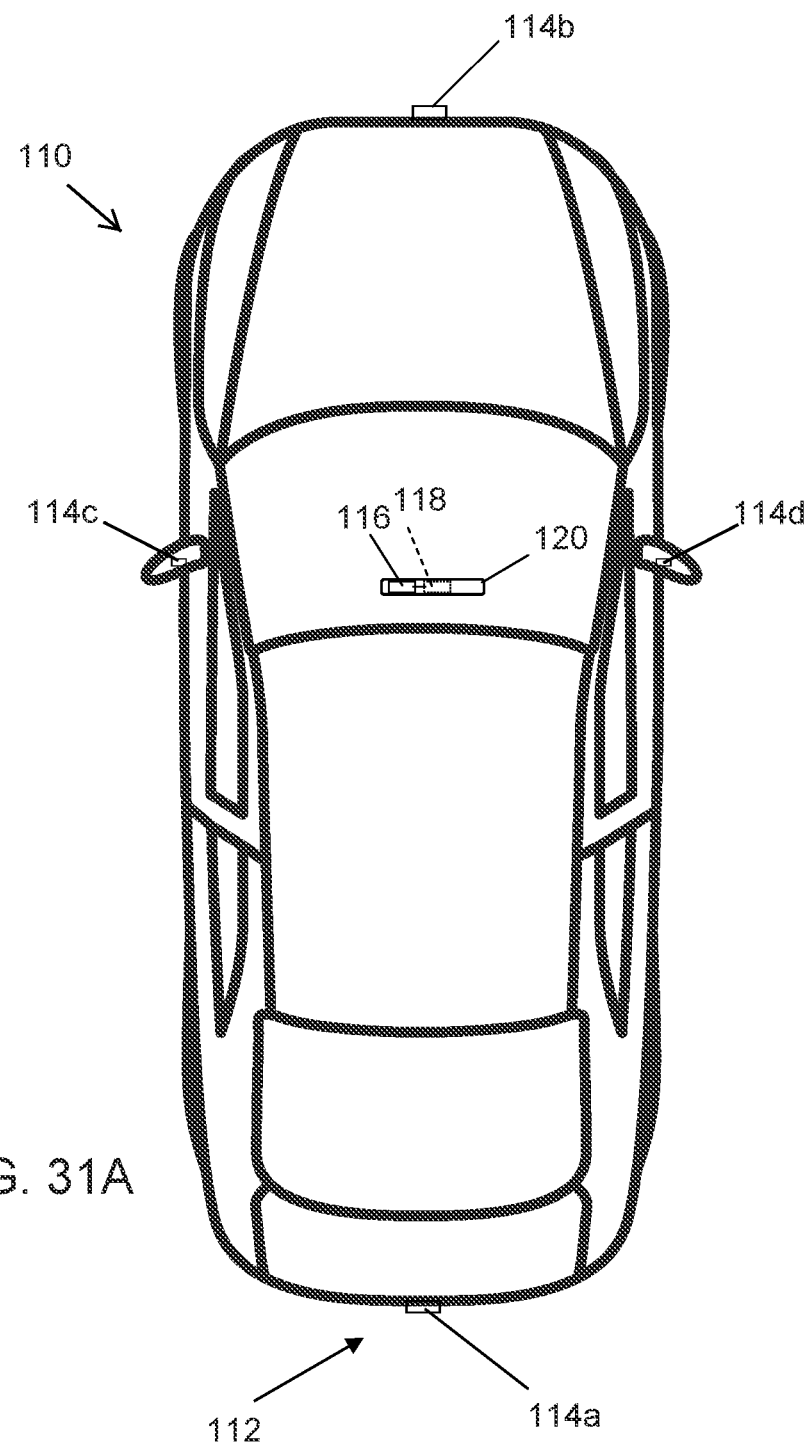
FIG. 31A is a plan view of a vehicle with a vision system that has surround view cameras and an image processor and a display system.
Figure 31B:
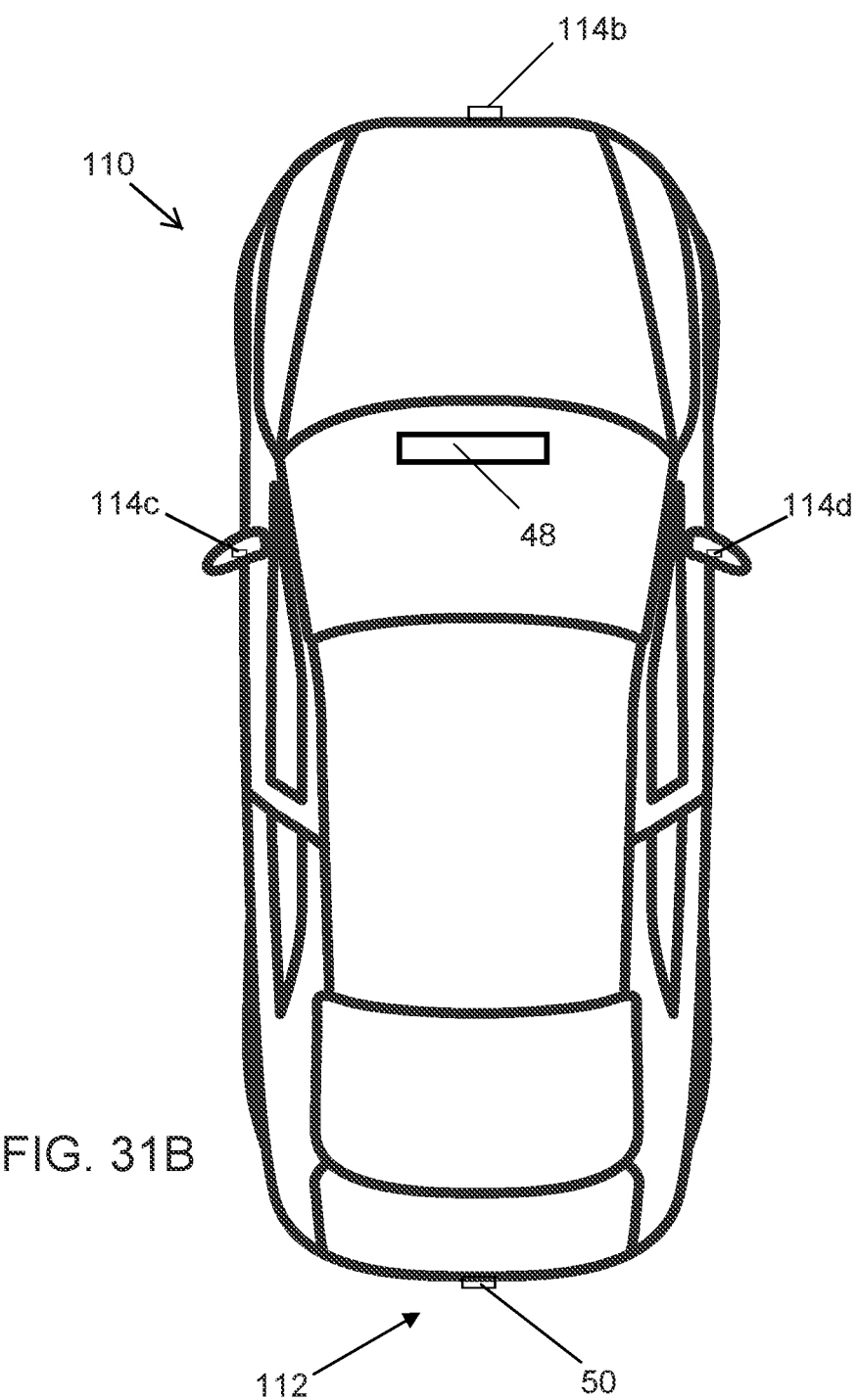
FIG. 31B is a plan view of a vehicle with a vision system that incorporates cameras in accordance with the present invention, such as surround view cameras with high distortion lenses, with a rear view camera 50 having the offset lens and with a switchable display system 48.

Optionally, but not exclusively, a CMS may be realized in combination with a rear view camera or with a surround view camera system. By such a combination, a horizontal oriented view (such as a view that is greater than about 185 degrees, such as a 270 degree view or 'panoramic view' or the like) may be generated. For example, such a view generation is described in U.S. Pat. Publication No. US 2010/0020170, which is hereby incorporated herein by reference in its entirety. As shown in FIGS. 25, 26 and 29, panoramic rear view images may be projected at the rear view displays. These may be generated by stitching images derived from surround view cameras 114b, 114c, 114d and rear cameras 114a (see FIG. 31A), preferably CMS side cameras (1 and 2) according the invention (stitched together) with a rear camera 114a. Higher sophisticated image stitching or blending and image morphing methods may come into use than suggested in U.S. Pat. Publication No. 2010/0020170. It is necessary to compute the virtual view perspective by view transformations, to align the virtual view point such as if being in the same spot for all three cameras by image processing. Aspects of such a stitching solution are described in U.S. provisional application Ser. No. 61/941,568 (incorporated above) as well. Since in a panoramic rear view application the rear side regions are mostly covered by the CMS cameras (1 and 2), the rear camera may use lenses with smaller angles than fish eye cameras such as having an opening angle around 100 degrees or the like.

Figure 8A:
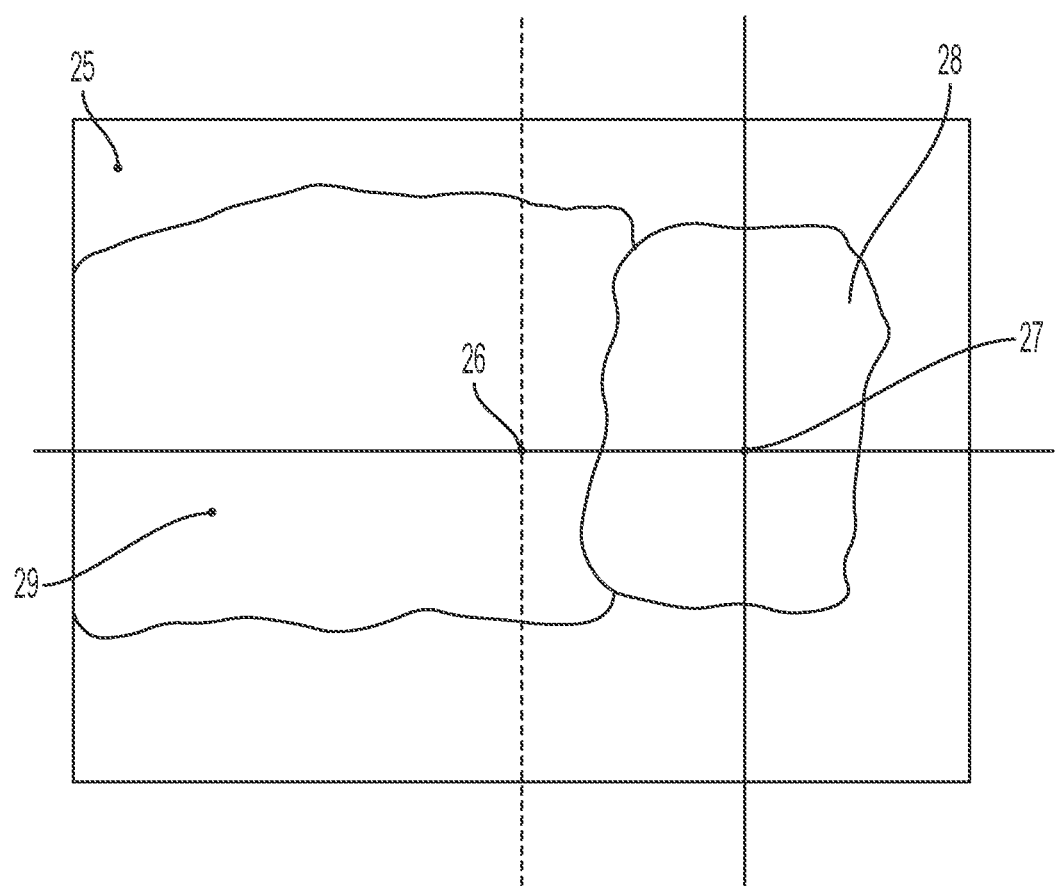
FIG. 8A shows the light sensitive area of the imager of a camera 25, with 26 being the center of the imager, 27 being the center of the optical axis of the used lens, and in a preferred embodiment this point is not at the center of the imager but at the side, 28 being the image range which covers the legally required vision area of the to be replaced mirror, and 29 being the captured image of the blind spot area 17 which shall be seen/displayed in exceptional situations (modified view)
Figure 8B:
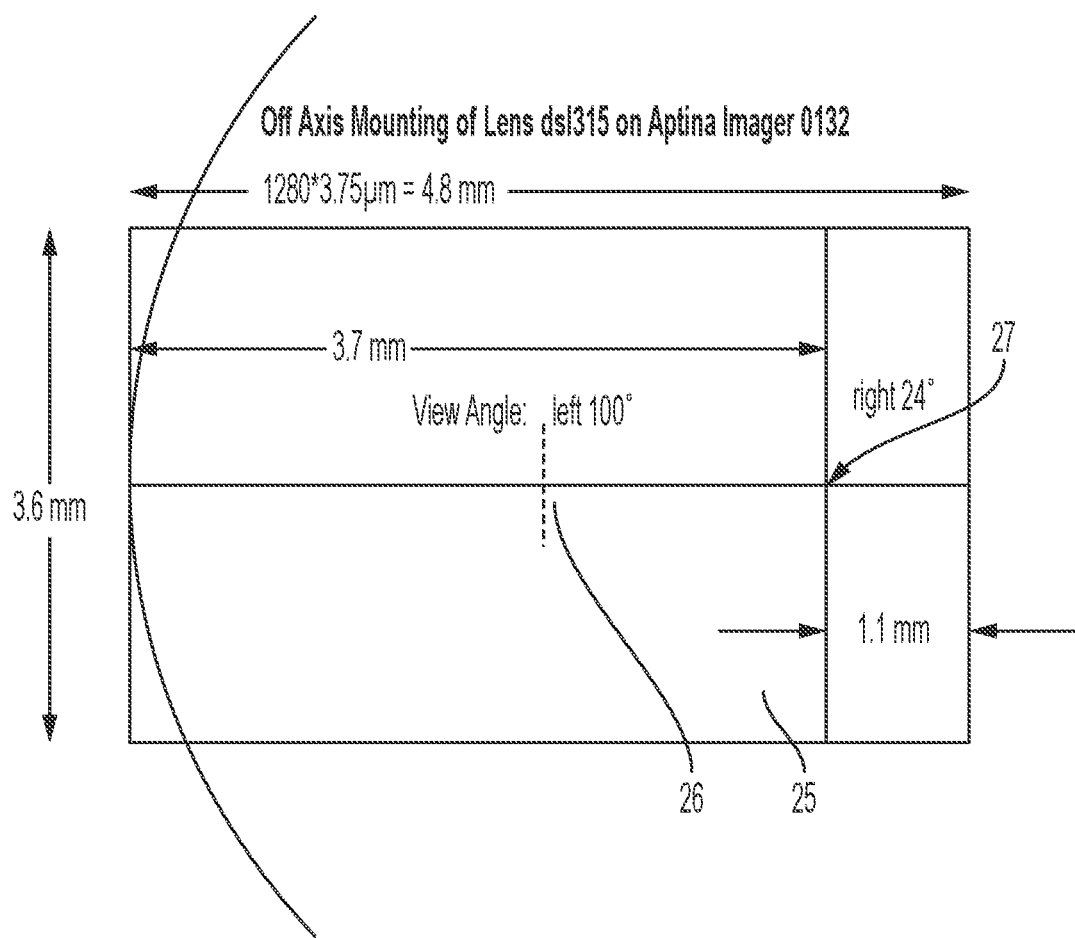
FIG. 8B shows an example of a system of the present invention as shown in FIG. 8A having a light sensitive area of an Aptina AR0132 imager of a camera 25, with 26 being the center of that imager and 27 being the center of the optical axis of a Sunex dsl315 lens.
Figure 8C:
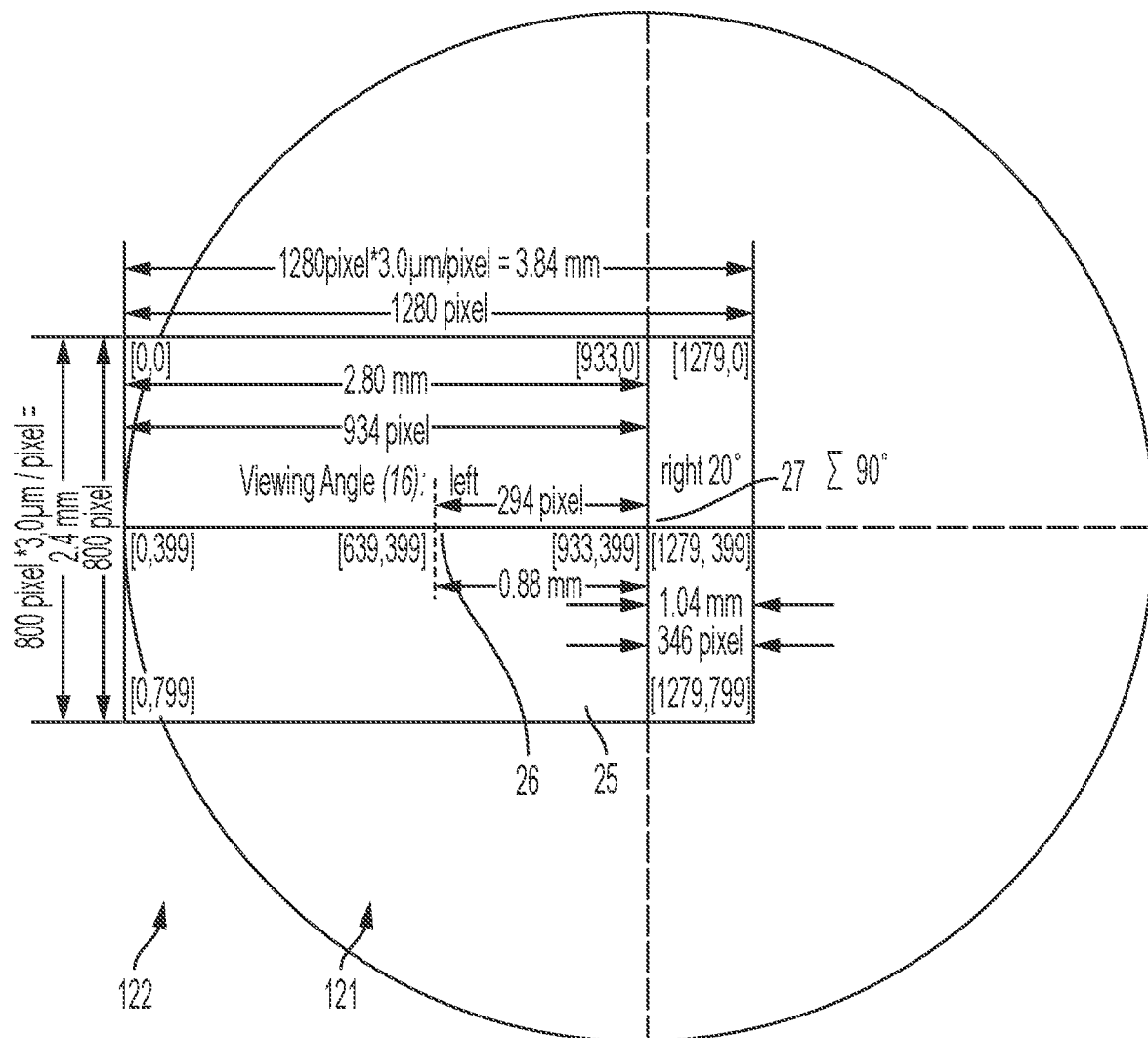
FIG. 8C shows another example of a system according the invention shown in FIG. 8A having a light sensitive area of an Aptina (AR) 0132 imager of a camera 25, with 26 being the center of that imager and 27 being the center of the optical axis of a Sunex dsl213 lens, shown with the full circle of the incoming light projected by the lens system.
Figure 15B:
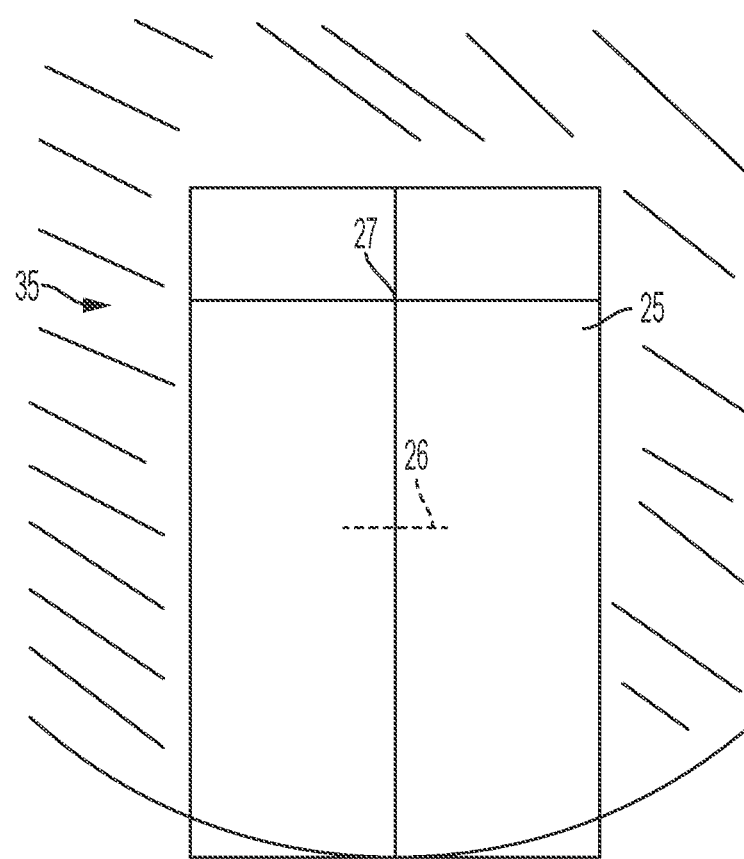
FIG. 15B is a schematic of the setup of FIG. 15A, shown turned by 90 degrees.
Figure 31C:
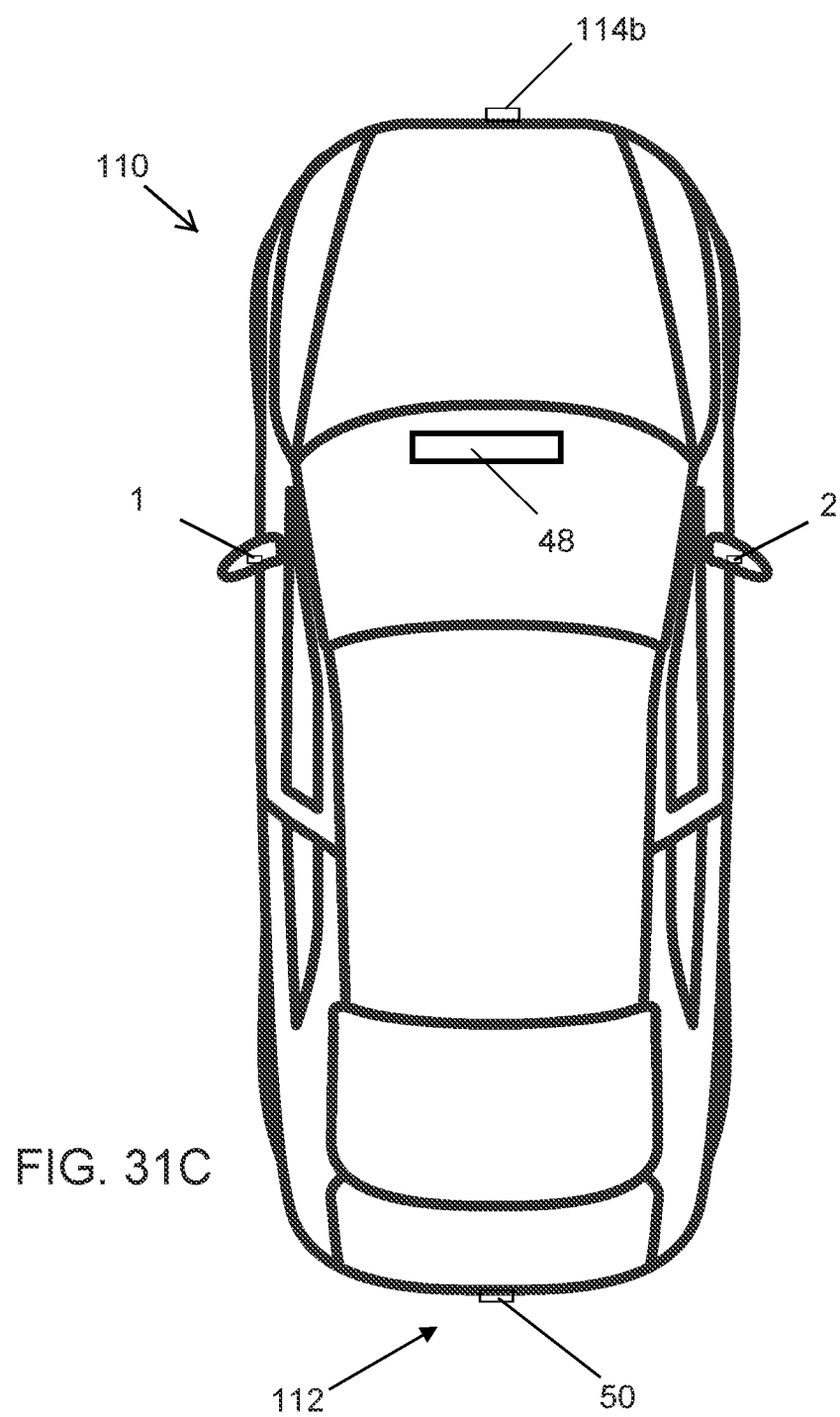
FIG. 31C is a plan view of a vehicle with a vision system that incorporates CMS cameras in accordance with the present invention, a surround front camera and a high distortion lens, imager off center rear view camera 50 and a switchable display system 48.
Figure 31D:
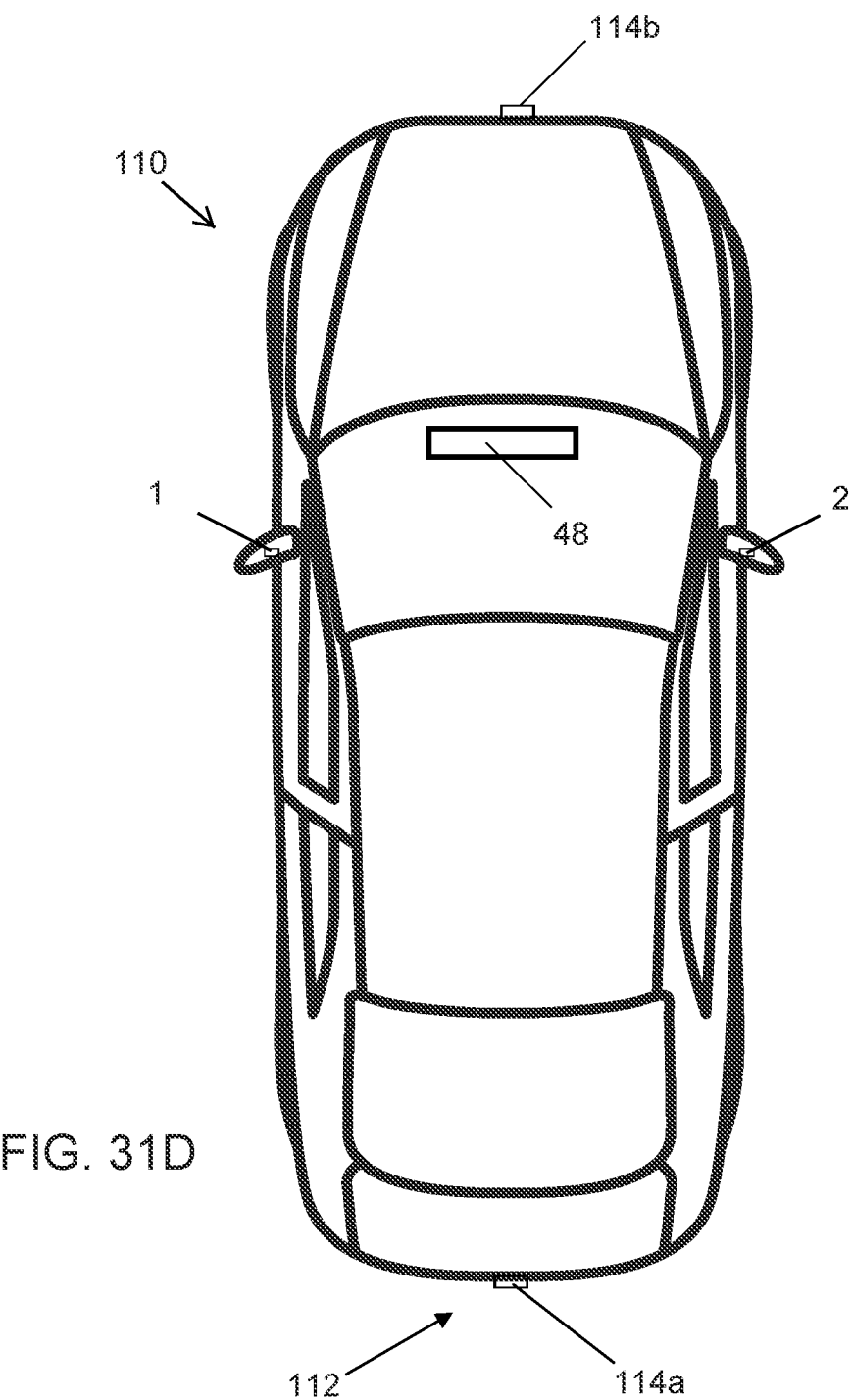
FIG. 31D is a plan view of a vehicle with a vision system that incorporates CMS cameras in accordance with the present invention, with a switchable display system 48.
Figure 32:
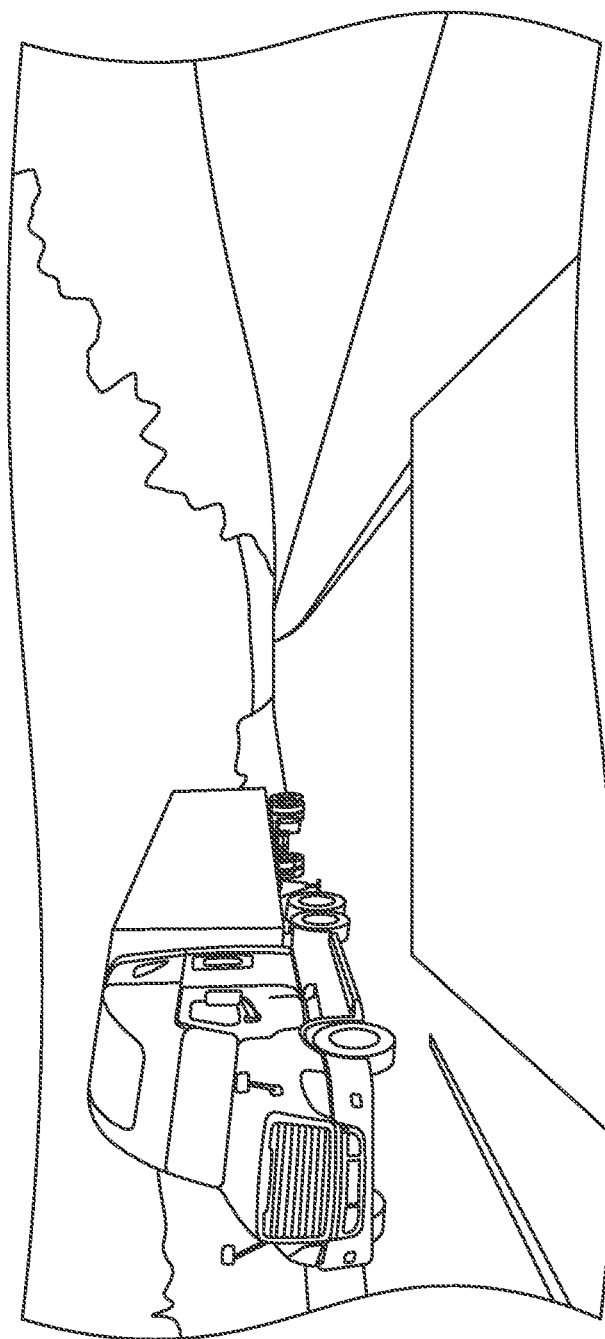
FIG. 32 is an image from a realization of the system in accordance with U.S. Pat. Publication No. US 2010/0020170, using a fish eye rear camera and side cameras viewing rearwardly.
Figure 33A:
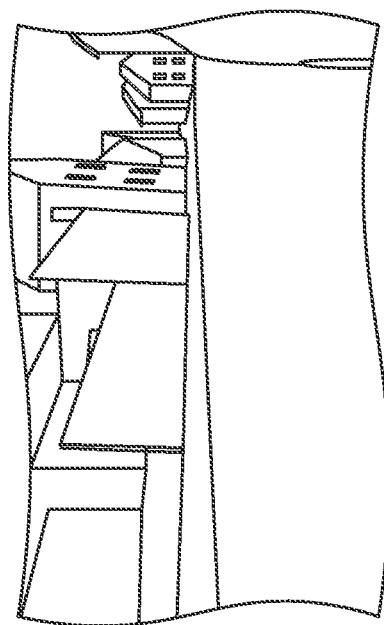
FIGS. 33A and C are images of high distortion lens, imager off center side cameras mounted at respective sides of the vehicle as CMS cameras in accordance with the present invention.
Figure 33B:
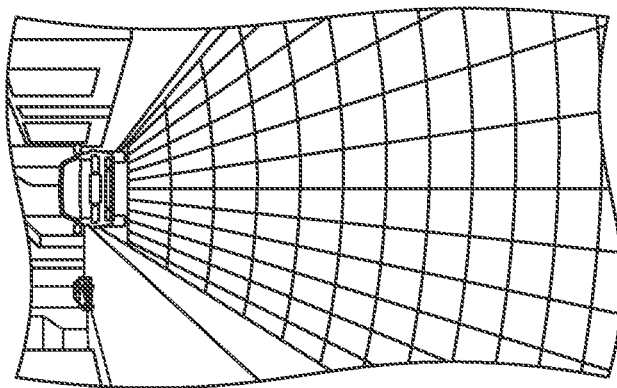
FIG. 33B is an image captured by a rear view camera with high distortion lens, imager off center, turned downwardly with the camera viewing to rear.
Figure 33C:
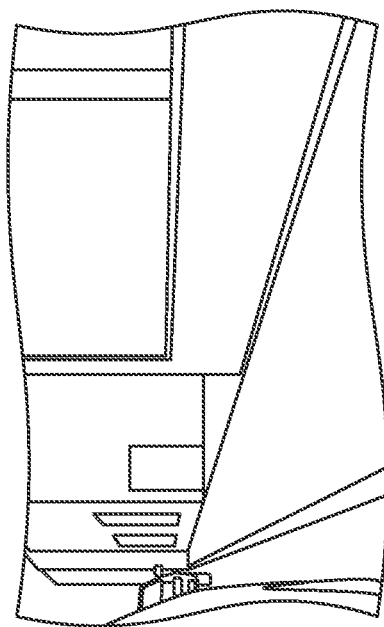

The resolution of distant objects is unacceptably low often, such as when using conventional fish eye lenses such as shown in example of FIG. 32, which is a realization of the system in accordance with U.S. Publication No. US 2010/0020170. To enhance the resolution and size of the traffic at the rear of the vehicle, the rear camera 50 may be equipped with a lens system such as similar to the side mirrors' optics using a high distortion lens 24, which has its optical center 27 shifted off the imager's center 26 such as shown in FIGS. 8A, 8B and 8C and a stray light cover such shown in FIG. 15B. The high distortion end may be installed downwardly to cover the ground area close to the vehicle's rear and, when present, a vehicle's hatch area such as shown in FIG. 33B. Together with the images of the CMS cameras 1 and 2 (with a setup like in FIG. 31C) producing the images shown in FIGS. 33A and 33C, such a rear camera may be suitable for use in 360 degree top view or surround view systems or modes, rear view panoramic systems or modes, trailer hitch finding modes and trailer target capturing or trailer angle detection systems or modes. Optionally, a 360 degree top view or surround view system or mode or a rear view panoramic system or mode may be realized with use of a rear camera of type 50 and conventional surround view fish eye cameras 114c and 114d (lacking the possibility to generate the enhanced blind spot view in accordance with the present invention as discussed above). Optionally, there may be just the rear camera of that type 50 in vehicles with rear camera only. Vision only trailer angle detection systems detecting targets via view transformation are described in U.S. provisional application Ser. No. 61/972,708, filed Mar. 31, 2014, which is hereby incorporated herein by reference in its entirety. Enhanced lens designs and image processing in terms of chromatic aberration compensation may be utilized, such as by utilizing aspects of the systems described in U.S. provisional application Ser. No. 61/836,380, filed Jun. 18, 2013, which is hereby incorporated herein by reference in its entirety.

Rear view and surround view systems' cameras typically have one wide angle lens camera at the front of the vehicle and one wide angle lens camera at the rear of the vehicle and a wide angle lens camera at each side of the vehicle, typically integrated in the side mounted rearview mirror assemblies of the vehicle. When replacing the mirror with a camera, the camera may be in a suitable spot at the side of the vehicle for having an acceptable field of view for generating a surround view and a rearward and/or blind spot view as well. For serving both systems' requirements, the lens system of the camera has to be designed as the best compromise. One example of such a compromise is shown in FIGS. 13A, 13B and 13C, where the viewing area was adjusted by turning the camera rearwardly and/or outwardly.

In the illustrated embodiment of FIG. 13B, the imager orientation of a camera may capture the legally required regime for ISO 16505 as well as the regime at the side for input into a multi-camera system (such as for a four camera top view or surround view system). For that, the center of the imager 26 is shifted with respect to the optical axis 27 of the lens, which is a high distortion lens (see 24 in FIG. 7). The mounting orientation of the long side 36 of the imager is shown and the camera will view the horizon on the rear as well as some overlap area in front of the vehicle. The angle 37 is the angle between the horizon and the optical axis 26 of the imager, and the angle 38 is the angle between the optical axis and the maximal viewing regime in front of the vehicle.

The camera thus may be disposed at a side of a body of the vehicle, with the body of the vehicle having a length dimension along the body side. Preferably, the camera is disposed closer to the front of the vehicle than to the rear of the vehicle. For example, the camera may be disposed about 1 meter to about 1.5 meters from the front of the vehicle and about 1 meter to 1.5 meters above the ground. Optionally, a camera may be disposed at the rear of the vehicle and may have a rearward field of view, with its lens vertically offset from a center region of its imaging array sensor. For example, the lens of the rear camera may be vertically offset downwards to provide enhanced imaging of the ground area immediately rearward of the vehicle. Optionally, a plurality of cameras may be disposed at the vehicle and may be part of a multi-camera surround vision system, with each camera (such as a front camera, a rear camera and opposite side cameras) having an offset lens that is offset in a manner that provides enhanced imaging of the more relevant areas for the particular camera application.

Thus, the vehicular vision system of the present invention includes a camera disposed at a side (and optionally at the rear) of a vehicle and having a field of view exterior of the vehicle and at least rearward of the vehicle. The camera captures image data and comprises a lens and a two dimensional imaging array sensor having a plurality of photosensor elements arranged in rows and columns. The imaging array sensor has a center region and an inboard region closer to the vehicle and an outboard region outboard from the vehicle and further from the side of the vehicle than the inboard region and the center region. The lens is configured to focus light at the imaging array sensor, and the lens has a center axis. The lens is disposed at the imaging array sensor with the center axis of the lens laterally offset from the center region of the imaging array sensor. For example, the center axis of the lens is preferably laterally offset towards the inboard region of the imaging array sensor and towards the side of the vehicle (but the lens could be otherwise offset, such as towards the outboard region of the imaging array sensor or towards an upper region of the imaging array sensor or lower region of the imaging array sensor, such as for a rear mounted, rearward viewing camera). The video display is operable to display video images derived from image data captured by the camera.

The center axis of the lens (which may comprise a wide angle, high distortion lens) is offset relative to the center of the imaging array sensor to provide the center axis of the lens (where there is less distortion) at a portion or region of the imaging array sensor where it is desirable to have less distortion in the captured image data and displayed images. For example, for a driver side mounted sideward and rearward viewing camera, the center axis of the lens may be offset laterally inboard towards the side of the vehicle (so as to be inboard of the center region of the imaging array sensor), so as to provide enhanced or less distortion of the displayed images at the regions of the displayed images sideward from the vehicle and along the side of the vehicle so as to provide enhanced display of the blind spot region at or near the side of the vehicle and rearward of the vehicle.

The two dimensional array of photosensing elements is arranged in columns of photosensing elements and rows of photosensing elements. For example, in a VGA photosensor array, the photosensing elements may be arranged in about 640 columns and 480 rows, and for a one megapixel (MP) imaging array, the photosensing elements may be arranged in about 1200 columns and about 900 rows. The central region of the imaging array coincides generally with those pixels generally at or about the intersection of a middle row and a middle column. The center axis of the lens is offset from this central region in accordance with the present invention. For example, the center axis of the lens may be offset or shifted by at least about 100 pixels (and optionally at least about 200 pixels or more, such as at least about 300 pixels) from the center region and towards one side of the imaging array, such as towards the inboard side of the imaging array sensor and towards the side of the vehicle at which the camera is mounted. The shift or offset preferably may be at least about 5 percent of the number of pixel columns between the center region and the inboard end of the imaging array (for example, for a 640 column array, the shift may be at least about 16 (0.05*320) pixel columns from the center), more preferably at least about 15 percent (and more preferably at least about 25 percent or more, such as, for example, about 50 percent) of the number of pixel columns between the center region and the inboard end of the imaging array. The degree of shift or offset may vary depending on the number of pixels (and number of rows and columns of pixels) of the imaging array sensor and the particular application of the camera and desired displayed images.

Optionally, there may be other requirements of which the field of view is to be covered be the lowest distorted region of the photosensing device (by that the area with the highest resolution on the imager). Such an alternative requirement may be to use the CMS camera as a camera for door open protection. This application is basically an aid for not hitting incoming cyclists and pedestrian when a passenger is about to open his or her vehicle door into the path of a cyclist or pedestrian.

Figure 8D:
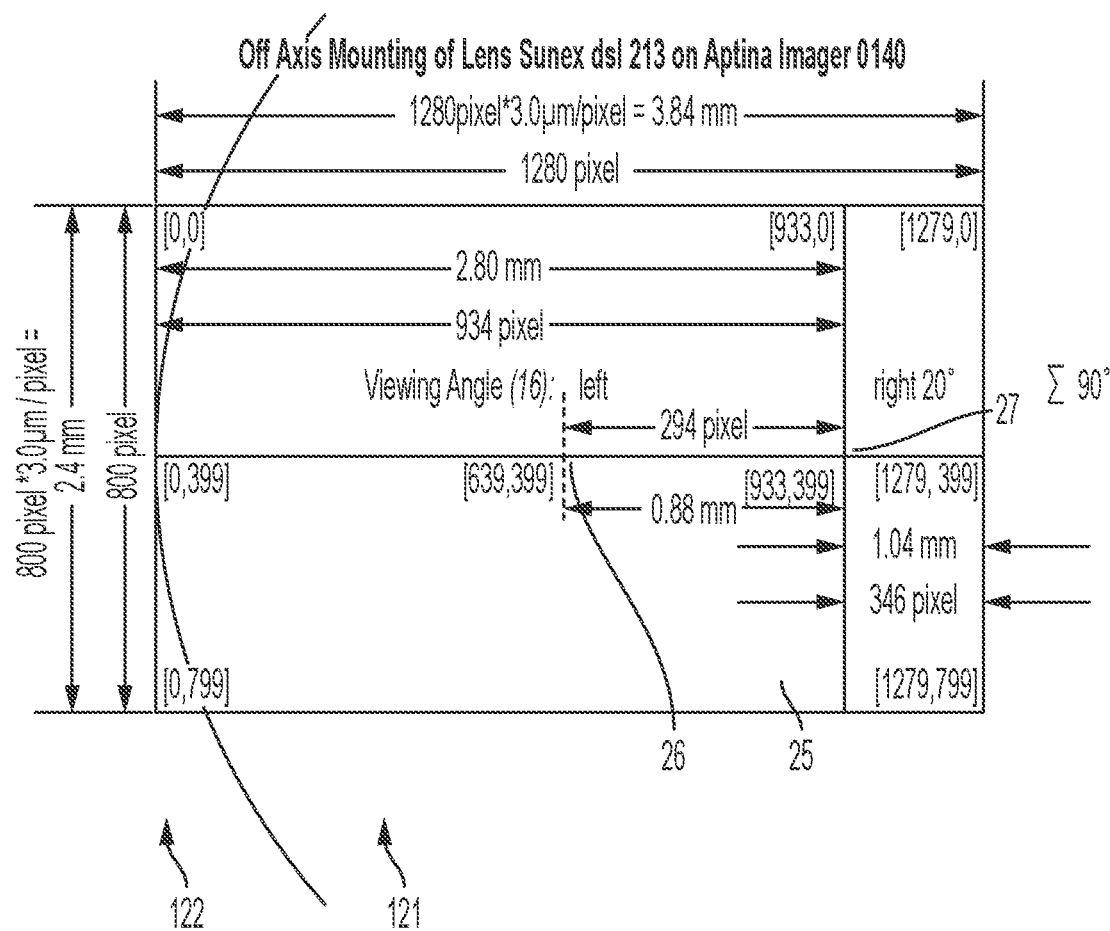
FIG. 8D is an enlarged view of a portion of FIG. 8C, shown with the imager area in close up view and the circle of the incoming light projected by the lens system truncated.

As can be seen in the specific example in FIGS. 8C and 8D, the center axis of the lens is offset from the central region in accordance with the present invention. In this example, using a Sunex dsl213 lens system and the photosensing element or imager Aptina 0140, which has 1280 columns and 800 rows, which equates to a (evenly) sensible square of 3.84 mm by 2.4 mm, the center axis of the lens is offset or shifted by about 294 pixels or about 0.88 mm (or about 46 percent) from the center region and towards one side of the imaging array (when mounted as a CMS camera, the shift direction may point away from the vehicle body, and the optical center may always point to the most significant region of interest while the higher distorted area may be used to have at least some sensing pixel covering it). The according pixel positions of the optical center 27 (or center axis of the lens), the imager's center 26 and its corners are shown as pixel coordinates in FIG. 8C (such as, for example, the coordinates [639, 399] being at the center of the imager having pixel dimensions 1240×800). As can be seen in FIG. 8D, the imager ends on the borderline of the area the optic projects light on 121 (this is an optimized placement, optionally the imager may be more inbound which reduces the high distortion benefit of the area on the far end). In area 122, no direct light (besides maybe stray light) is present. In this example, the lens system has an overall viewing or opening angle 16 of about 90 degrees. FIGS. 33A-C and 34-37 are all captured by this lens system, with FIG. 33B showing a raw image without undistortion processing at all (upright camera, height distortion (shifted) end pointing downwardly), with the far corners unilluminated by the lens system, and with FIGS. 33A, 33B, 36 and 37 being mathematically undistorted and FIGS. 34 and 35 having a view conform to the normal mode ISO standard 16505, since the required area is large enough and undistorted plus a highly distorted area for viewing the blind spot area.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/359,341, filed May 20, 2014, now U.S. Pat. No. 10,071,687; Ser. No. 14/359,340, filed May 20, 2014, now U.S. Pat. No. 10,099,614; Ser. No. 14/282,029, filed May 20, 2014, now U.S. Pat. No. 9,205,776; Ser. No. 14/282,028, filed May 20, 2014, now U.S. Pat. No. 9,563,951; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published on Nov. 6, 2014 as U.S. Publication No. US-2014-0327772; Ser. No. 14/264,443, filed Apr. 29, 2014, now U.S. Pat. No. 10,232,797; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published on Aug. 7, 2014 as U.S. Publication No. US-2014-0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, now U.S. Pat. No. 10,179,543; Ser. No. 14/183,613, filed Feb. 19, 2014, now U.S. Pat. No. 9,445,057; Ser. No. 14/169,329, filed Jan. 31, 2014, and published on Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014, and published on Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published on Jun. 19, 2014 as U.S. Publication No. US-2014-0168437; Ser. No. 14/098,817, filed Dec. 6, 2013, and published on Jun. 19, 2014 as U.S. Publication No. US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Publication No. US-2014-0025240-; Ser. No. 13/942,753, filed Jul. 16, 2013, and published on Jan. 30, 2014 as U.S. Publication No. US-2014-0028852; Ser. No. 13/927,680, filed Jun. 26, 2013, and published on Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, now U.S. Pat. No. 10,457,209; Ser. No. 13/851,378, filed Mar. 27, 2013, now U.S. Pat. No. 9,319,637; Ser. No. 13/848,796, filed Mar. 22, 2012, now U.S. Pat. No. 10,609,335; Ser. No. 13/847,815, filed Mar. 20, 2013, and published on Oct. 21, 2013 as U.S. Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174, 574; and/or Ser. No. 13/534,657, filed Jun. 27, 2012, and published on Jan. 3, 2013 as U.S. Publication No. US-2013-0002873, and/or U.S. provisional applications, Ser. No. 62/001,796, filed May 22, 2014; Ser. No. 62/001,796, filed May 22, 2014; Ser. No. 61/993,736, filed May 15, 2014; Ser. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/879,837, filed Sep. 19, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/845,061, filed Jul. 11, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; and/or Ser. No. 61/830,377, filed Jun. 3, 2013, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US-2010-0020170, and/or U.S. patent application Ser. No. 13/534,657, filed Jun. 27, 2012, and published on Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a camera disposed at a side of a body of a vehicle equipped with the vehicular vision system and having a field of view exterior of the equipped vehicle and at least rearward of the equipped vehicle;

wherein the camera comprises a lens and a two-dimensional imaging array sensor having at least one million photosensing elements arranged in an array of rows of photosensing elements and columns of photosensing elements;

wherein the array of the imaging array sensor of the camera has a center;

wherein the lens of the camera comprises a center axis region and a peripheral region around the center axis region;

wherein a center axis of the lens passes through the center axis region of the lens;

wherein the center axis of the lens is laterally offset at least 100 columns of photosensing elements from the center of the array of the imaging array sensor;

wherein the camera captures image data;

wherein image data captured by the camera that is associated with light imaged at the imaging array sensor of the camera that has passed through the center axis region of the lens of the camera has less distortion than image data captured by the camera that is associated with light imaged at the imaging array sensor of the camera that has passed through the peripheral region of the lens of the camera;

wherein, with the camera disposed at the side of the body of the equipped vehicle, the center axis of the lens of the camera is laterally offset from the center of the array of the imaging array sensor of the camera towards an inboard side of the array of the imaging array sensor of the camera that is laterally closer to the side of the body of the equipped vehicle than the center of the array of the imaging array sensor of the camera;

a video display disposed in the equipped vehicle and viewable by a driver of the equipped vehicle when the driver is normally operating the equipped vehicle, wherein the video display is operable to display video images derived from image data captured by the camera;

wherein the displayed video images derived from image data captured by the camera have (i) less distortion at displayed image portions representative of a region laterally closer to the side of the body of the vehicle and (ii) greater distortion at displayed image portions representative of a region further laterally outboard from the side of the body of the vehicle; and a head tracking system operable to determine movement of the driver's head, and wherein, responsive to a determined movement of the driver's head, the vehicular vision system adjusts the rearward view displayed to the driver of the equipped vehicle by the video display.

2. The vehicular vision system of claim 1, wherein the array of the imaging array sensor has a width dimension and a height dimension, and wherein the center axis of the lens is offset along the width dimension of the array of the imaging array sensor.

3. The vehicular vision system of claim 2, wherein the center axis of the lens is offset by at least a quarter of the width dimension of the array of the imaging array sensor.

4. The vehicular vision system of claim 1, comprising a filtering element that reduces stray light entering the lens from interfering with the imaging array sensor.

5. The vehicular vision system of claim 1, wherein the lens exhibits f-theta distortion.

6. The vehicular vision system of claim 1, wherein the array of the imaging array sensor has a higher density of photosensing elements at a first portion of the array of the imaging array sensor and a lower density of photosensing elements at a second portion of the array of the imaging array sensor, and wherein light that passes through the center axis region of the lens is imaged at the first portion of the array of the imaging array sensor.

7. The vehicular vision system of claim 1, comprising an image processor that processes image data captured by the camera, wherein the image processor at least partially corrects distortion in captured image data via processing of captured image data.

8. The vehicular vision system of claim 1, wherein the array of the imaging array sensor comprises at least 800 rows of photosensing elements and at least 1200 columns of photosensing elements.

9. The vehicular vision system of claim 8, wherein the center axis of the lens is laterally offset at least 200 columns of photosensing elements from the center of the array of the imaging array sensor.

10. The vehicular vision system of claim 1, wherein the displayed video images are adjustable responsive to actuation of a user input.

11. The vehicular vision system of claim 1, wherein the video display is operable to display pseudo three-dimensional image information for viewing by the driver of the equipped vehicle.

12. The vehicular vision system of claim 11, wherein the pseudo three-dimensional image information is used to shift the display of nearer objects more than the display of farther objects.

13. The vehicular vision system of claim 1, wherein, responsive to a determined movement of the driver's head, the vehicular vision system adjusts the displayed video images to provide a wider view display for viewing by the driver of the equipped vehicle.

14. The vehicular vision system of claim 1, comprising an image processor that processes image data captured by the camera, wherein the vehicular vision system, responsive to processing of captured image data by the image processor, is operable to determine a position and relative speed of another vehicle that is at least one selected from the group consisting of (i) rearward of the equipped vehicle and (ii) sideward of the equipped vehicle.

15. The vehicular vision system of claim 14, wherein, at least responsive to the driver of the equipped vehicle initiating a lane change to a traffic lane adjacent to a traffic lane along which the equipped vehicle is traveling, the vehicular vision system generates an overlay at the displayed video images to alert the driver of the equipped vehicle that the adjacent traffic lane is occupied by the determined other vehicle.

16. The vehicular vision system of claim 1, wherein, at least responsive to the driver of the equipped vehicle maneuvering the equipped vehicle to enter a road, the vehicular vision system generates an overlay at the displayed video images to indicate at least one selected from the group consisting (i) presence of another vehicle on the road and (ii) presence of a pedestrian on the road.

17. The vehicular vision system of claim 1, wherein the camera is disposed within an exterior rearview mirror assembly at the side of the body of the equipped vehicle.

18. A vehicular vision system, the vehicular vision system comprising:

a camera disposed at a side of a body of a vehicle equipped with the vehicular vision system and having a field of view exterior of the equipped vehicle and at least rearward of the equipped vehicle;

wherein the camera comprises a lens and a two-dimensional imaging array sensor having at least one million photosensing elements arranged in an array of rows of photosensing elements and columns of photosensing elements;

wherein the array of the imaging array sensor comprises at least 800 rows of photosensing elements and at least 1200 columns of photosensing elements;

wherein the array of the imaging array sensor of the camera has a center;

wherein the lens of the camera comprises a center axis region and a peripheral region around the center axis region;

wherein a center axis of the lens passes through the center axis region of the lens;

wherein the center axis of the lens is laterally offset at least 100 columns of photosensing elements from the center of the array of the imaging array sensor;

wherein the camera captures image data;

wherein image data captured by the camera that is associated with light imaged at the imaging array sensor of the camera that has passed through the center axis region of the lens of the camera has less distortion than image data captured by the camera that is associated with light imaged at the imaging array sensor of the camera that has passed through the peripheral region of the lens of the camera;

wherein, with the camera disposed at the side of the body of the equipped vehicle, the center axis of the lens of the camera is laterally offset from the center of the array of the imaging array sensor of the camera towards an inboard side of the array of the imaging array sensor of the camera that is laterally closer to the side of the body of the equipped vehicle than the center of the array of the imaging array sensor of the camera;

an image processor that processes image data captured by the camera, wherein the image processor at least partially corrects distortion in captured image data via processing of captured image data;

a video display disposed in the equipped vehicle and viewable by a driver of the equipped vehicle when the driver is normally operating the equipped vehicle, wherein the video display is operable to display video images derived from image data captured by the camera;

wherein the displayed video images derived from image data captured by the camera have (i) less distortion at displayed image portions representative of a region laterally closer to the side of the body of the vehicle and (ii) greater distortion at displayed image portions representative of a region further laterally outboard from the side of the body of the vehicle; and a head tracking system operable to determine movement of the driver's head, and wherein, responsive to a determined movement of the driver's head, the vehicular vision system adjusts the rearward view displayed to the driver of the equipped vehicle by the video display.

19. The vehicular vision system of claim 18, wherein the array of the imaging array sensor has a width dimension and a height dimension, and wherein the center axis of the lens is offset along the width dimension of the array of the imaging array sensor.

20. The vehicular vision system of claim 19, wherein the center axis of the lens is offset by at least a quarter of the width dimension of the array of the imaging array sensor.

21. The vehicular vision system of claim 18, wherein the array of the imaging array sensor has a higher density of photosensing elements at a first portion of the array of the imaging array sensor and a lower density of photosensing elements at a second portion of the array of the imaging array sensor, and wherein light that passes through the center axis region of the lens is imaged at the first portion of the array of the imaging array sensor.

22. The vehicular vision system of claim 18, wherein the video display is operable to display pseudo three-dimensional image information for viewing by the driver of the equipped vehicle.

23. The vehicular vision system of claim 22, wherein the pseudo three-dimensional image information is used to shift the display of nearer objects more than the display of farther objects.

24. The vehicular vision system of claim 18, wherein, responsive to a determined movement of the driver's head, the vehicular vision system adjusts the displayed video images to provide a wider view display for viewing by the driver of the equipped vehicle.

25. The vehicular vision system of claim 18, wherein the vehicular vision system, responsive to processing of captured image data by the image processor, is operable to determine a position and relative speed of another vehicle that is at least one selected from the group consisting of (i) rearward of the equipped vehicle and (ii) sideward of the equipped vehicle.

26. The vehicular vision system of claim 25, wherein, at least responsive to the driver of the equipped vehicle initiating a lane change to a traffic lane adjacent to a traffic lane along which the equipped vehicle is traveling, the vehicular vision system generates an overlay at the displayed video images to alert the driver of the equipped vehicle that the adjacent traffic lane is occupied by the determined other vehicle.

27. The vehicular vision system of claim 18, wherein, at least responsive to the driver of the equipped vehicle maneuvering the equipped vehicle to enter a road, the vehicular vision system generates an overlay at the displayed video images to indicate at least one selected from the group consisting (i) presence of another vehicle on the road and (ii) presence of a pedestrian on the road.

28. The vehicular vision system of claim 18, wherein the camera is disposed within an exterior rearview mirror assembly at the side of the body of the equipped vehicle.

29. A vehicular vision system, the vehicular vision system comprising:
a camera disposed at a side of a body of a vehicle equipped with the vehicular vision system and having a field of view exterior of the equipped vehicle and at least rearward of the equipped vehicle;

wherein the camera is disposed within an exterior rearview mirror assembly at the side of the body of the equipped vehicle;

wherein the camera comprises a lens and a two-dimensional imaging array sensor having at least one million photosensing elements arranged in an array of rows of photosensing elements and columns of photosensing elements;

wherein the array of the imaging array sensor comprises at least 800 rows of photosensing elements and at least 1200 columns of photosensing elements;

wherein the array of the imaging array sensor of the camera has a center;

wherein the lens of the camera comprises a center axis region and a peripheral region around the center axis region;

wherein a center axis of the lens passes through the center axis region of the lens;

wherein the center axis of the lens is laterally offset at least 200 columns of photosensing elements from the center of the array of the imaging array sensor;

wherein the camera captures image data;

wherein image data captured by the camera that is associated with light imaged at the imaging array sensor of the camera that has passed through the center axis region of the lens of the camera has less distortion than image data captured by the camera that is associated with light imaged at the imaging array sensor of the camera that has passed through the peripheral region of the lens of the camera;

wherein, with the camera disposed at the side of the body of the equipped vehicle, the center axis of the lens of the camera is laterally offset from the center of the array of the imaging array sensor of the camera towards an inboard side of the array of the imaging array sensor of the camera that is laterally closer to the side of the body of the equipped vehicle than the center of the array of the imaging array sensor of the camera;

a video display disposed in the equipped vehicle and viewable by a driver of the equipped vehicle when the driver is normally operating the equipped vehicle, wherein the video display is operable to display video images derived from image data captured by the camera;

wherein the displayed video images derived from image data captured by the camera have (i) less distortion at displayed image portions representative of a region laterally closer to the side of the body of the vehicle and (ii) greater distortion at displayed image portions representative of a region further laterally outboard from the side of the body of the vehicle; and a head tracking system operable to determine movement of the driver's head, and wherein, responsive to a determined movement of the driver's head, the vehicular vision system adjusts the rearward view displayed to the driver of the equipped vehicle by the video display.

30. The vehicular vision system of claim 29, wherein the array of the imaging array sensor has a width dimension and a height dimension, and wherein the center axis of the lens is offset along the width dimension of the array of the imaging array sensor.

31. The vehicular vision system of claim 29, wherein the video display is operable to display pseudo three-dimensional image information for viewing by the driver of the equipped vehicle.

32. The vehicular vision system of claim 31, wherein the pseudo three-dimensional image information is used to shift the display of nearer objects more than the display of farther objects.

33. The vehicular vision system of claim 29, wherein, responsive to a determined movement of the driver's head, the vehicular vision system adjusts the displayed video images to provide a wider view display for viewing by the driver of the equipped vehicle.

34. The vehicular vision system of claim 29, comprising an image processor that processes image data captured by the camera, wherein the vehicular vision system, responsive to processing of captured image data by the image processor, is operable to determine a position and relative speed of another vehicle that is at least one selected from the group consisting of (i) rearward of the equipped vehicle and (ii) sideward of the equipped vehicle.

35. The vehicular vision system of claim 34, wherein, at least responsive to the driver of the equipped vehicle initiating a lane change to a traffic lane adjacent to a traffic lane along which the equipped vehicle is traveling, the vehicular vision system generates an overlay at the displayed video images to alert the driver of the equipped vehicle that the adjacent traffic lane is occupied by the determined other vehicle.

36. The vehicular vision system of claim 29, wherein, at least responsive to the driver of the equipped vehicle maneuvering the equipped vehicle to enter a road, the vehicular vision system generates an overlay at the displayed video images to indicate at least one selected from the group consisting (i) presence of another vehicle on the road and (ii) presence of a pedestrian on the road.

* * * * *